(12) United States Patent
Tsuji et al.

(10) Patent No.: US 10,919,540 B2
(45) Date of Patent: Feb. 16, 2021

(54) DRIVING ASSISTANCE METHOD, AND DRIVING ASSISTANCE DEVICE, DRIVING CONTROL DEVICE, VEHICLE, AND RECORDING MEDIUM USING SAID METHOD

(71) Applicant: Panasonic Intellectual Property Management Co., Ltd., Osaka (JP)

(72) Inventors: Masanaga Tsuji, Osaka (JP); Toshiya Mori, Osaka (JP); Koichi Emura, Kanagawa (JP); Wataru Nakai, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 373 days.

(21) Appl. No.: 15/564,702

(22) PCT Filed: Apr. 15, 2016

(86) PCT No.: PCT/JP2016/002048
§ 371 (c)(1),
(2) Date: Oct. 5, 2017

(87) PCT Pub. No.: WO2016/170763
PCT Pub. Date: Oct. 27, 2016

(65) Prior Publication Data
US 2018/0074497 A1 Mar. 15, 2018

(30) Foreign Application Priority Data

Apr. 21, 2015 (JP) .................................. 2015-087069
May 14, 2015 (JP) .................................. 2015-099474
(Continued)

(51) Int. Cl.
*B60W 50/08* (2020.01)
*B60W 50/10* (2012.01)
(Continued)

(52) U.S. Cl.
CPC ............. *B60W 50/10* (2013.01); *B60K 35/00* (2013.01); *B60K 37/06* (2013.01); *B60R 16/02* (2013.01);
(Continued)

(58) Field of Classification Search
USPC ...................................................... 701/23–28
See application file for complete search history.

(56) References Cited

U.S. PATENT DOCUMENTS 6,161,071 A * 12/2000 Shuman ................. B60K 28/06
340/436
9,147,353 B1 * 9/2015 Slusar .................. G08G 1/0129
(Continued)

FOREIGN PATENT DOCUMENTS

CN 103171439 A 6/2013
CN 103221665 A 7/2013
(Continued)

OTHER PUBLICATIONS

International Search Report of PCT application No. PCT/JP2016/002048 dated Jul. 5, 2016.
(Continued)

*Primary Examiner* — Jonathan L Sample
(74) *Attorney, Agent, or Firm* — Seed IP Law Group LLP

(57) ABSTRACT

Provided is a technology for improving accuracy in determining the next action. Travel history generator generates, for each driver, a travel history associating an environmental parameter indicating a travel environment through which a vehicle has previously traveled with an action selected by the driver in response to the environmental parameter. Acquisition unit acquires a travel history similar to a travel history of a current driver from among travel histories generated by travel history generator. Driver model generator generates a driver model based on the travel history
(Continued)

acquired by acquisition unit. Determination unit determines the next action based on the driver model generated by driver model generator) and an environmental parameter indicating a current travel environment of the vehicle.

13 Claims, 41 Drawing Sheets

(30) Foreign Application Priority Data

Jun. 12, 2015 (JP) ................................. 2015-119139
Dec. 24, 2015 (JP) ................................. 2015-252667

(51) Int. Cl.

| | |
|---|---|
| *B60W 50/14* | (2020.01) |
| *B60K 35/00* | (2006.01) |
| *B60K 37/06* | (2006.01) |
| *B60R 16/02* | (2006.01) |
| *G01C 21/36* | (2006.01) |
| *B60W 40/09* | (2012.01) |
| *G06K 9/00* | (2006.01) |
| *G08G 1/0962* | (2006.01) |
| *G01C 21/34* | (2006.01) |
| *G05D 1/00* | (2006.01) |
| *G05D 1/02* | (2020.01) |
| *G08G 1/0968* | (2006.01) |
| *B60W 30/18* | (2012.01) |
| *B60W 30/09* | (2012.01) |
| *B60W 30/182* | (2020.01) |
| *G06F 3/048* | (2013.01) |
| *B60W 50/00* | (2006.01) |

(52) U.S. Cl.
CPC .......... *B60W 30/09* (2013.01); *B60W 30/182* (2013.01); *B60W 30/18163* (2013.01); *B60W 40/09* (2013.01); *B60W 50/08* (2013.01); *B60W 50/085* (2013.01); *B60W 50/14* (2013.01); *G01C 21/3484* (2013.01); *G01C 21/3605* (2013.01); *G01C 21/3617* (2013.01); *G05D 1/0061* (2013.01); *G05D 1/0088* (2013.01); *G05D 1/0223* (2013.01); *G05D 1/0257* (2013.01); *G06F 3/048* (2013.01); *G06K 9/00288* (2013.01); *G06K 9/00671* (2013.01); *G06K 9/00791* (2013.01); *G06K 9/00832* (2013.01); *G08G 1/0962* (2013.01); *G08G 1/096888* (2013.01); *B60K 2370/166* (2019.05); *B60K 2370/167* (2019.05); *B60K 2370/175* (2019.05); *B60K 2370/179* (2019.05); *B60K 2370/193* (2019.05); *B60W 2050/0079* (2013.01); *B60W 2050/0089* (2013.01); *B60W 2050/146* (2013.01); *B60W 2520/10* (2013.01); *B60W 2540/10* (2013.01); *B60W 2540/12* (2013.01); *B60W 2540/18* (2013.01); *B60W 2540/20* (2013.01); *B60W 2540/215* (2020.02); *B60W 2554/00* (2020.02); *B60W 2720/10* (2013.01); *G05D 2201/0213* (2013.01)

(56) References Cited

U.S. PATENT DOCUMENTS

| | | | |
|---|---|---|---|
| 2007/0027583 A1* | 2/2007 | Tamir ..................... | G08G 1/164 701/1 |
| 2009/0234552 A1 | 9/2009 | Takeda et al. | |
| 2011/0210867 A1* | 9/2011 | Benedikt .......... | G08G 1/096725 340/905 |
| 2013/0179023 A1* | 7/2013 | Schmidt ................ | B60W 50/14 701/23 |
| 2013/0302756 A1* | 11/2013 | Takeuchi ............... | B60W 30/18 434/64 |
| 2014/0113619 A1* | 4/2014 | Tibbitts .................. | B60W 40/09 455/419 |
| 2014/0129132 A1* | 5/2014 | Yoshizu ............. | G06Q 30/0266 701/400 |
| 2014/0309806 A1* | 10/2014 | Ricci ...................... | G06Q 10/20 701/1 |
| 2014/0309870 A1* | 10/2014 | Ricci ................... | G05D 23/1917 701/36 |
| 2015/0092056 A1* | 4/2015 | Rau .......................... | B60R 1/02 348/148 |
| 2015/0219464 A1* | 8/2015 | Beaurepaire ....... | G01C 21/3438 701/538 |
| 2016/0231743 A1* | 8/2016 | Bendewald ........... | B60W 30/16 |
| 2017/0021830 A1* | 1/2017 | Feldman ............. | B60W 30/182 |
| 2017/0113686 A1* | 4/2017 | Horita ................... | B60W 30/09 |
| 2018/0074497 A1* | 3/2018 | Tsuji ..................... | G05D 1/0257 |
| 2018/0093676 A1* | 4/2018 | Emura ................... | B60W 30/09 |

FOREIGN PATENT DOCUMENTS

| | | |
|---|---|---|
| DE | 102011121948 A1 | 6/2013 |
| EP | 1997705 A1 | 12/2008 |
| EP | 2669109 A1 | 12/2013 |
| EP | 2806411 A1 | 11/2014 |
| JP | 2004-034917 A | 2/2004 |
| JP | 3583873 B2 | 11/2004 |
| JP | 2005-067483 A | 3/2005 |
| JP | 2007-176396 A | 7/2007 |
| JP | 2007-198853 A | 8/2007 |
| JP | 2009-237937 A | 10/2009 |
| JP | 2010-211380 A | 9/2010 |
| JP | 2012-113631 A | 6/2012 |
| JP | 2013-117809 A | 6/2013 |
| JP | 2014-081947 A | 5/2014 |
| JP | 2015-022499 A | 2/2015 |
| JP | 2015-199439 A | 11/2015 |
| JP | 2016-216027 A | 12/2016 |
| JP | 2016-216028 A | 12/2016 |
| WO | 2015/049231 A1 | 4/2015 |

OTHER PUBLICATIONS

Extended European Search Report, dated Mar. 6, 2018, for the related European Patent Application No. 16782788.0.
Extended European Search Report dated, May 9, 2018, for the related European Patent Application No. 16782797.1.
English Translation of Chinese Search Report dated Jun. 4, 2019 for the related Chinese Patent Application No. 201680021986.8.
English Translation of the First Office Action dated Jun. 4, 2019 for the related Chinese Patent Application No. 201680021986.8.
Extended European Search Report, dated May 28, 2018, for the related European Patent Application No. 16782787.2.
Japanese Office Action dated Jan. 7, 2020 for the related Japanese Patent Application No. 2015-252667.
English Translation of Chinese Search Report dated Oct. 9, 2019 for the related Chinese Patent Application No. 201680034900.5.
English Translation of the First Office Action dated Oct. 9, 2019 for the related Chinese Patent Application No. 201680034900.5.

* cited by examiner

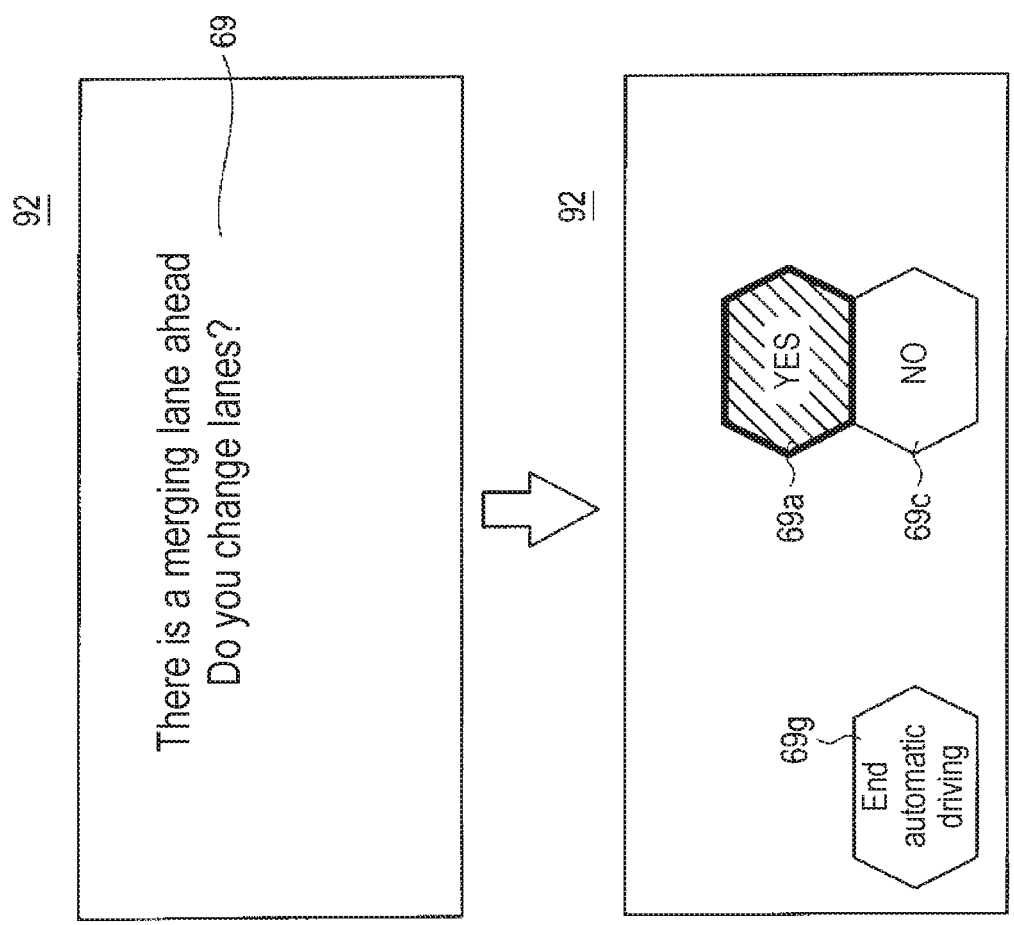
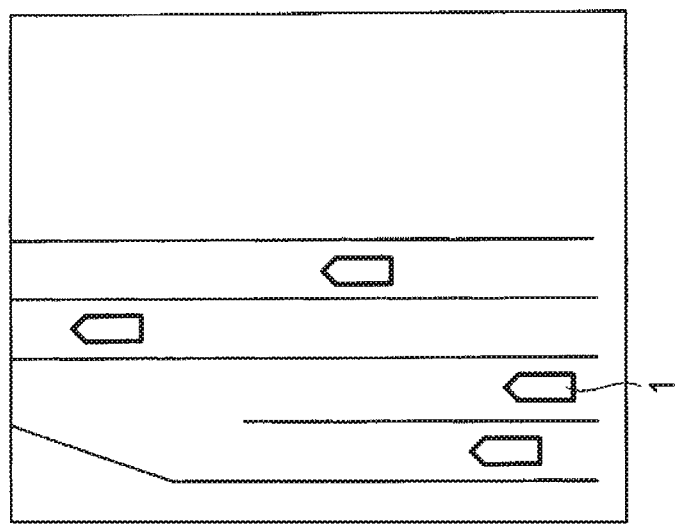

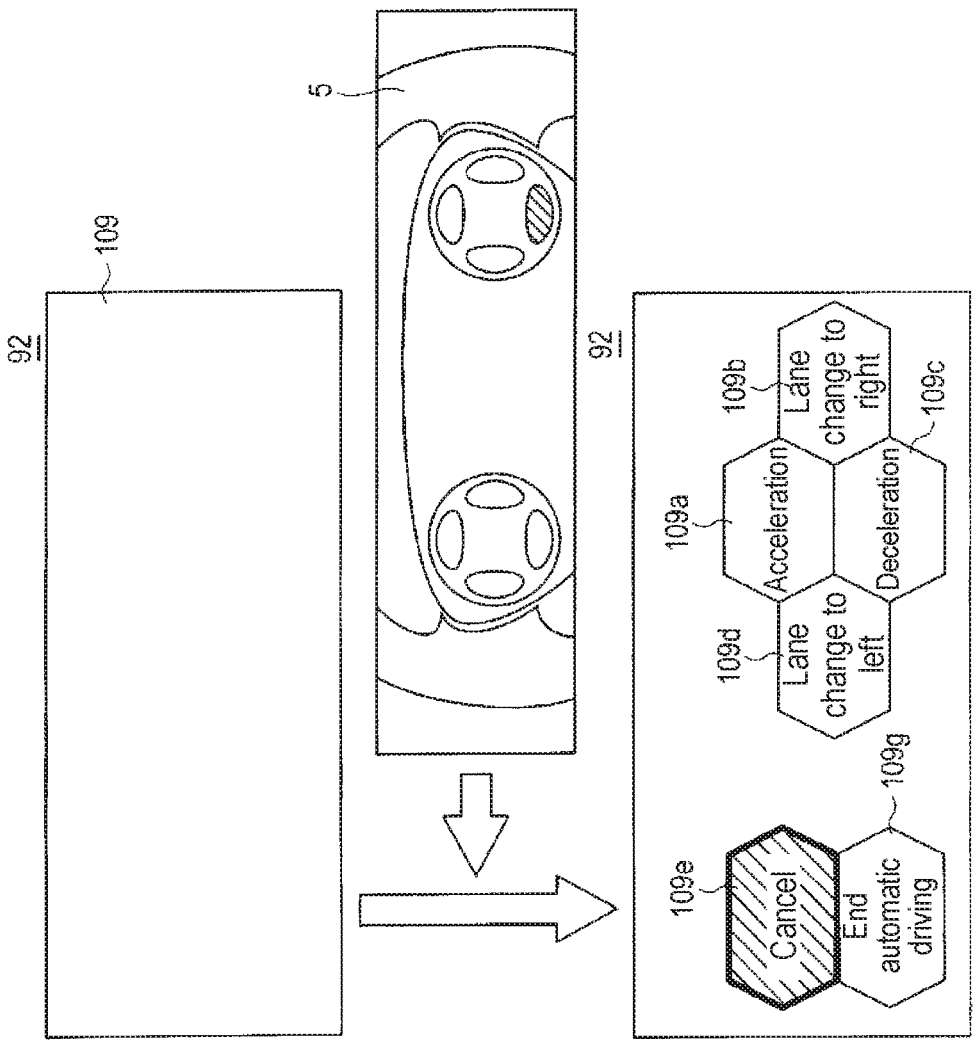
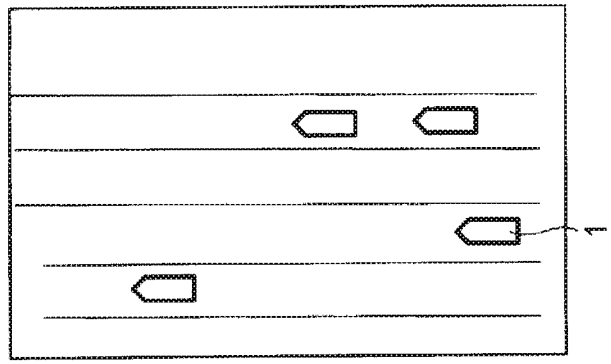
FIG. 10A
FIG. 10B

FIG. 16

| Travel environment | Approaching to merging lane | | | There is low-speed vehicle ahead | | | ... |
|---|---|---|---|---|---|---|---|
| Behavior | Deceleration | Acceleration | Lane change | Follow | Overtake | Lane change | ... |
| Driver x | 3 | 1 | 5 | 2 | 2 | 1 | ... |
| Driver y | 9 | 1 | 2 | 0 | 0 | 0 | ... |

FIG. 17

| | Travel environment | Approaching to merging lane | | | There is low-speed vehicle ahead | | | ... |
|---|---|---|---|---|---|---|---|---|
| | Behavior | Deceleration | Acceleration | Lane change | Follow | Overtake | Lane change | ... |
| Model A | Driver a | 3 | 1 | 5 | 1 | 1 | 5 | ... |
| Model A | Driver b | 4 | 2 | 7 | 2 | 0 | 3 | ... |
| Model A | Driver c | 3 | 2 | 2 | 1 | 2 | 8 | ... |
| Model B | Driver d | 5 | 2 | 2 | 5 | 2 | 2 | ... |
| Model B | Driver e | 7 | 2 | 2 | 5 | 0 | 3 | ... |
| Model B | Driver f | 5 | 2 | 5 | 4 | 1 | 1 | ... |
| | ... | ... | ... | ... | ... | ... | ... | ... |

FIG. 18

| Travel environment | Approaching to merging lane | | | There is low-speed vehicle ahead | | | ... |
|---|---|---|---|---|---|---|---|
| Behavior | Deceleration | Acceleration | Lane change | Follow | Overtake | Lane change | ... |
| Model A | 3.3 | 1.7 | 4.6 | 1.3 | 1 | 5.3 | ... |
| Model B | 5.7 | 2 | 3 | 4.7 | 1 | 2 | ... |

FIG. 19

| Travel environment | Approaching to merging lane | There is low-speed vehicle ahead | ... |
|---|---|---|---|
| Model A | Lane change | Lane change | ... |
| Model B | Deceleration | Follow | ... |

FIG. 20

| Travel environment | Approaching to merging lane | | | There is low-speed vehicle ahead | | | ... |
|---|---|---|---|---|---|---|---|
| Behavior | Deceleration | Acceleration | Lane change | Follow | Overtake | Lane change | ... |
| Driver a | 3 | 1 | 5 | 1 | 1 | 5 | ... |
| Driver b | 4 | 2 | 7 | 2 | 0 | 3 | ... |
| Driver c | 3 | 2 | 2 | 1 | 2 | 8 | ... |
| Driver d | 5 | 2 | 2 | 5 | 2 | 2 | ... |
| Driver e | 7 | 2 | 2 | 5 | 0 | 3 | ... |
| Driver f | 5 | 2 | 5 | 4 | 1 | 1 | ... |
| ... | ... | ... | ... | ... | ... | ... | ... |

Model of driver y ⇐

FIG. 21

| Travel environment | Approaching to merging lane | | | There is low-speed vehicle ahead | | | ... |
|---|---|---|---|---|---|---|---|
| Behavior | Deceleration | Acceleration | Lane change | Follow | Overtake | Lane change | ... |
| Model of driver y | 5 | 2 | 2 | 3.7 | 1.3 | 4.3 | ... |

FIG. 22

| Behavior | | Fellow passenger | Speed | Steering | Brake | Accelerator | ... | Number of times |
|---|---|---|---|---|---|---|---|---|
| Driver x | Lane change | None | 8 | 4 | 6 | 8 | ... | 80 |
| | | 1 adult and 2 children | 3 | 3 | 4 | 3 | ... | 40 |
| | Overtake | 1 adult | 5 | 7 | 5 | 5 | ... | 60 |
| | ... | ... | ... | ... | ... | ... | ... | ... |
| Driver y | Lane change | ... | ... | ... | ... | ... | ... | ... |
| | Overtake | ... | ... | ... | ... | ... | ... | ... |
| | ... | ... | ... | ... | ... | ... | ... | ... |
| | ... | ... | ... | ... | ... | ... | ... | ... |

FIG. 27

Driver x

| History | | Host vehicle information | Leading vehicle information | | | Adjacent lane information | | | | | | | Merging lane information | | | Location information | | |
|---|---|---|---|---|---|---|---|---|---|---|---|---|---|---|---|---|---|---|
| | | | | | | Adjacent following vehicle | | | Adjacent leading vehicle | | | | | | | | | |
| | Behavior | Va | Vba | DRba | RSb | Vca | Dca | Rca | Vda | Dda | Rda | DRda | Vma | Dma | Rma | Travel lane | Distance to merging point | ... |
| (a) | Deceleration | 4 | 1 | 2 | 5 | 4 | 2 | 2 | 3 | 3 | 1 | 3 | 0 | 0 | 0 | 2 | 0 | ... |
| (b) | Lane change | 3 | 2 | 5 | 4 | 2 | 2 | 1 | 0 | 0 | 0 | 10 | 1 | 2 | 3 | 1 | 4 | ... |
| (c) | Deceleration | 3 | 2 | 5 | 4 | 3 | 1 | 3 | 3 | 1 | 3 | 2 | 2 | 2 | 2 | 1 | 4 | ... |
| ... | ... | ... | ... | ... | ... | ... | ... | ... | ... | ... | ... | ... | ... | ... | ... | ... | ... | ... |

Environmental parameters

FIG. 28A

| Behavior | Environmental parameters | | | | | | | | | | |
|---|---|---|---|---|---|---|---|---|---|---|---|
| | Host vehicle information | Leading vehicle information | | | Adjacent lane information | | | | | Merging lane information | Location information |
| | | | | | Adjacent following vehicle | | | Adjacent leading vehicle | | | |
| | Va | Vba | DRba | RSb | Vca | Dca | Rca | Vda | Dda | Rda | DRda | Vma | Dma | Rma | Travel lane | Distance to merging point |
| ??? | 3 | 3 | 5 | 4 | 1 | 2 | 1 | 0 | 0 | 0 | 9 | 1 | 2 | 3 | 1 | 4 |

FIG. 28B

| History | Behavior | Environmental parameters | | | | | | | | | | |
|---|---|---|---|---|---|---|---|---|---|---|---|---|
| | | Host vehicle information | Leading vehicle information | | | Adjacent lane information | | | | | Merging lane information | Location information |
| | | | | | | Adjacent following vehicle | | | Adjacent leading vehicle | | | |
| | | Va | Vba | DRba | RSb | Vca | Dca | Rca | Vda | Dda | Rda | DRda | Vma | Dma | Rma | Travel lane | Distance to merging point |
| (d) | Deceleration | 4 | 1 | 2 | 5 | 4 | 2 | 2 | 3 | 3 | 1 | 3 | 0 | 0 | 0 | 1 | 0 |
| (e) | Lane change | 3 | 2 | 5 | 4 | 2 | 2 | 1 | 0 | 0 | 0 | 10 | 1 | 2 | 3 | 1 | 4 |
| (f) | Deceleration | 3 | 2 | 5 | 4 | 3 | 1 | 3 | 3 | 1 | 3 | 2 | 2 | 2 | 2 | 1 | 4 |

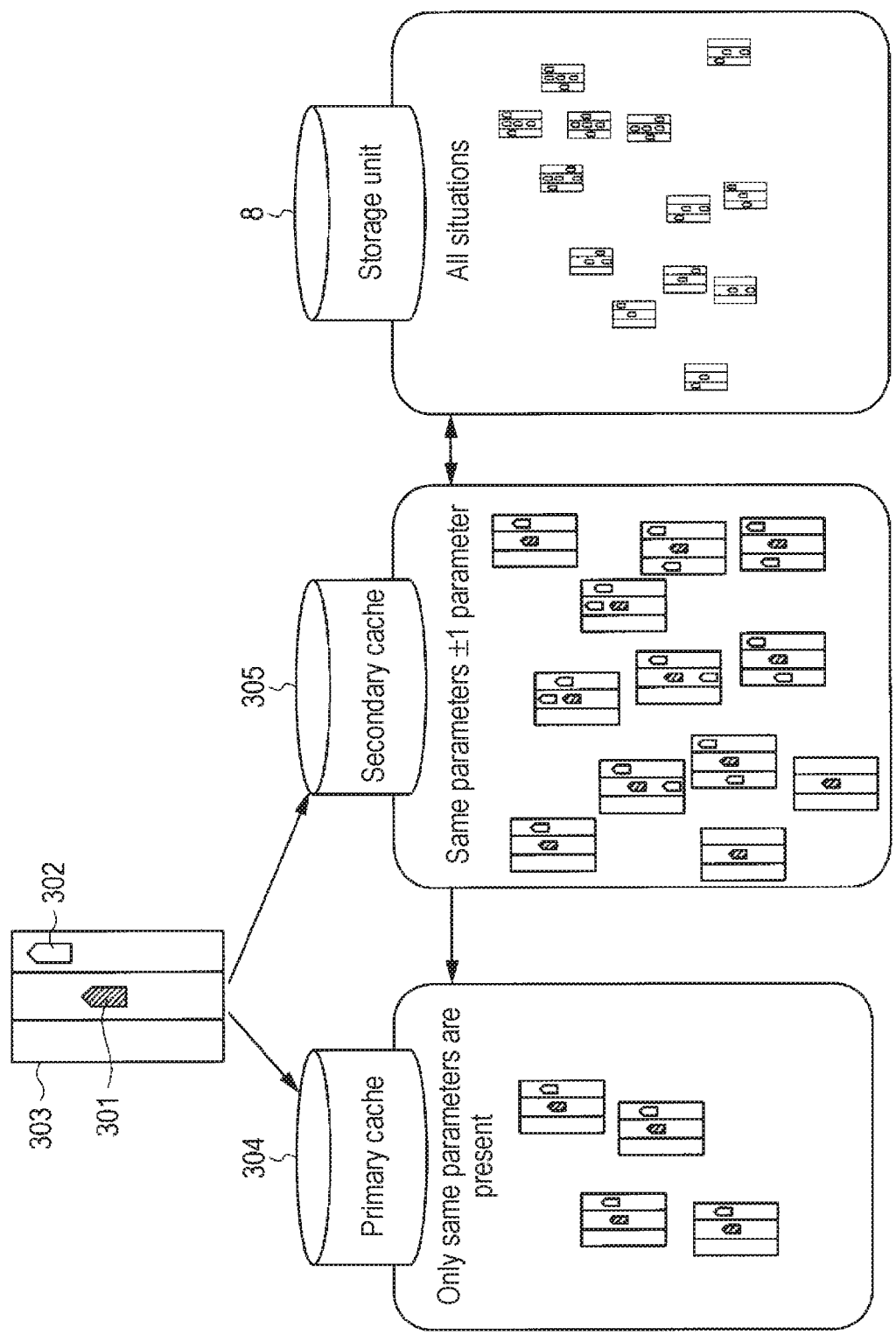

|  | ① | ② | ③ | ④ | ⑤ | ⑥ | ⑦ | ⑧ | ⑨ | ... |
|---|---|---|---|---|---|---|---|---|---|---|
| Acceleration | 0 | 0 | 3 | 1 | 5 | 1 | 2 | 1 | 1 | 1 |
| Deceleration | 2 | 1 | 0 | 1 | 3 | 5 | 3 | 1 | 0 | 0 |
| Lane change | 0 | 0 | 0 | 2 | 3 | 2 | 0 | 0 | 0 | 0 |
| Overtake | 0 | 0 | 0 | 0 | 0 | 0 | 2 | 3 | 5 | 3 |

FIG. 36A

| Driver | Passenger seat | Rear seat | Environmental parameters | | | | | | | | Action |
|---|---|---|---|---|---|---|---|---|---|---|---|
| | | | Va | Vba | DRba | RSb | Vca | Dca | Rca | ... | |
| A | × | 0 | 0.1 | 0.2 | 0.5 | 0.0 | 1.0 | 0.0 | 0.3 | ... | Deceleration |
| A | ○ | 0 | 0.5 | 0.1 | 0.4 | 0.1 | 0.2 | 0.5 | 0.0 | ... | Acceleration |
| A | ○ | 1 | 1.0 | 0.5 | 0.0 | 0.0 | 0.0 | 0.1 | 0.7 | ... | Travel at constant speed |
| A | ○ | 1 | 1.0 | 1.0 | 0.1 | 0.2 | 0.5 | 0.0 | 0.1 | ... | Travel at constant speed |
| A | ○ | 1 | 0.0 | 1.0 | 0.0 | 0.9 | 0.8 | 1.0 | 0.3 | ... | Lane change to right |
| A | ○ | 1 | 0.0 | 0.0 | 1.0 | 0.1 | 0.2 | 0.5 | 0.0 | ... | Deceleration |
| B | × | 0 | 0.5 | 0.0 | 0.0 | 0.1 | 1.0 | 0.1 | 1.0 | ... | Travel at constant speed |

| Driver | Fellow passenger (age/sex) | Environmental parameters | | | | | | | | Action |
|---|---|---|---|---|---|---|---|---|---|---|
| | | Va | Vba | DRba | RSb | Vca | Dca | Rca | ... | |
| A | – | 0.1 | 0.2 | 0.5 | 0.0 | 1.0 | 0.0 | 0.3 | ... | Deceleration |
| A | Woman in 30's | 0.5 | 0.1 | 0.4 | 0.1 | 0.2 | 0.5 | 0.0 | ... | Acceleration |
| A | Woman in 30's/boy | 1.0 | 0.5 | 0.0 | 0.0 | 0.0 | 0.1 | 0.7 | ... | Travel at constant speed |
| A | Woman in 30's/boy | 1.0 | 1.0 | 0.1 | 0.2 | 0.5 | 0.0 | 0.1 | ... | Travel at constant speed |
| A | Boy | 0.0 | 1.0 | 0.0 | 0.9 | 0.8 | 1.0 | 0.3 | ... | Lane change to right |
| A | Boy | 0.0 | 0.0 | 1.0 | 0.1 | 0.2 | 0.5 | 0.0 | ... | Deceleration |
| B | – | 0.5 | 0.0 | 0.0 | 0.1 | 1.0 | 0.1 | 1.0 | ... | Travel at constant speed |

| Driver | Passenger seat | Rear seat | Environmental parameters ||||||||| Action |
|---|---|---|---|---|---|---|---|---|---|---|---|
| | | | Va | Vba | DRba | RSb | Vca | Dca | Rca | ... | |
| A | – | 0 | 0.1 | 0.2 | 0.5 | 0.0 | 1.0 | 0.0 | 0.3 | ... | Deceleration |
| A | B | 0 | 0.5 | 0.1 | 0.4 | 0.1 | 0.2 | 0.5 | 0.0 | ... | Acceleration |
| A | B | C | 1.0 | 0.5 | 0.0 | 0.0 | 0.0 | 0.1 | 0.7 | ... | Travel at constant speed |
| A | B | C | 1.0 | 1.0 | 0.1 | 0.2 | 0.5 | 0.0 | 0.1 | ... | Travel at constant speed |
| A | C | D | 0.0 | 1.0 | 0.0 | 0.9 | 0.8 | 0.0 | 0.3 | ... | Lane change to right |
| A | C | C,D | 0.0 | 0.0 | 1.0 | 0.1 | 0.2 | 0.5 | 0.0 | ... | Deceleration |
| B | – | – | 0.5 | 0.0 | 0.0 | 0.1 | 1.0 | 0.1 | 1.0 | ... | Travel at constant speed |

| Driver | Passenger seat | State | Environmental parameters ||||||||| Action |
|---|---|---|---|---|---|---|---|---|---|---|---|
| | | | Va | Vba | DRba | RSb | Vca | Dca | Rca | ... | |
| A | – | – | 0.1 | 0.2 | 0.5 | 0.0 | 1.0 | 0.0 | 0.3 | ... | Deceleration |
| A | ○ | Ordinary | 0.5 | 0.1 | 0.4 | 0.1 | 0.2 | 0.5 | 0.0 | ... | Acceleration |
| A | ○ | Sleeping | 1.0 | 0.5 | 0.0 | 0.0 | 0.0 | 0.1 | 0.7 | ... | Travel at constant speed |
| A | ○ | Sleeping | 1.0 | 1.0 | 0.1 | 0.2 | 0.5 | 0.0 | 0.1 | ... | Travel at constant speed |
| A | ○ | Carsick | 0.0 | 1.0 | 0.0 | 0.9 | 0.8 | 1.0 | 0.3 | ... | Lane change to right |
| A | ○ | Carsick | 0.0 | 0.0 | 1.0 | 0.1 | 0.2 | 0.5 | 0.0 | ... | Deceleration |
| B | – | – | 0.5 | 0.0 | 0.0 | 0.1 | 1.0 | 0.1 | 1.0 | ... | Travel at constant speed |

| Driver | Passenger seat | Rear seat | Environmental parameters ||||||||| Action |
|---|---|---|---|---|---|---|---|---|---|---|---|
| | | | Va | Vba | DRba | RSb | Vca | Dca | Rca | ... | |
| A | × | 0 | 0.1 | 0.2 | 0.5 | 0.0 | 1.0 | 0.0 | 0.3 | ... | Deceleration |
| A | ○ | 0 | 0.5 | 0.1 | 0.4 | 0.1 | 0.2 | 0.5 | 0.0 | ... | Acceleration |
| A | ○ | 1 | 1.0 | 0.5 | 0.0 | 0.0 | 0.0 | 0.1 | 0.7 | ... | Travel at constant speed |
| A | ○ | 1 | 1.0 | 1.0 | 0.1 | 0.2 | 0.5 | 0.0 | 0.1 | ... | Travel at constant speed |
| A | ○ | 1 | 0.0 | 1.0 | 0.0 | 0.9 | 0.8 | 1.0 | 0.3 | ... | Lane change to right |
| A | ○ | 1 | 0.0 | 0.0 | 1.0 | 0.1 | 0.2 | 0.5 | 0.0 | ... | Deceleration |
| B | × | 0 | 0.5 | 0.0 | 0.0 | 0.1 | 1.0 | 0.1 | 1.0 | ... | Travel at constant speed |

| Driver | Passenger seat | Rear seat | ID |
|---|---|---|---|
| A | × | 0 | 0001 |
| A | ○ | 0 | 0002 |
| A | ○ | 1 | 0003 |
| B | × | 0 | Not registered ← 0004 |

| ID | Environmental parameters | | | | | | | | Action |
|---|---|---|---|---|---|---|---|---|---|
| | Va | Vba | DRba | RSb | Vca | Dca | Rca | ... | |
| 0001 | 0.1 | 0.2 | 0.5 | 0.0 | 1.0 | 0.0 | 0.3 | ... | Deceleration |
| 0002 | 0.5 | 0.1 | 0.4 | 0.1 | 0.2 | 0.5 | 0.0 | ... | Acceleration |
| 0003 | 1.0 | 0.5 | 0.0 | 0.0 | 0.0 | 0.1 | 0.7 | ... | Travel at constant speed |
| 0003 | 1.0 | 1.0 | 0.1 | 0.2 | 0.5 | 0.0 | 0.1 | ... | Travel at constant speed |
| 0003 | 0.0 | 1.0 | 0.0 | 0.9 | 0.8 | 1.0 | 0.3 | ... | Lane change to right |
| 0003 | 0.0 | 0.0 | 1.0 | 0.1 | 0.2 | 0.5 | 0.0 | ... | Deceleration |
| 0004 | 0.5 | 0.0 | 0.0 | 0.1 | 1.0 | 0.1 | 1.0 | ... | Travel at constant speed |

| Driver | Passenger seat | Rear seat | Environmental parameters | | | | | | | | Action |
|---|---|---|---|---|---|---|---|---|---|---|---|
| | | | Va | Vba | DRba | RSb | Vca | Dca | Rca | ... | |
| A | × | 0 | 0.1 | 0.2 | 0.5 | 0.0 | 1.0 | 0.0 | 0.3 | ... | Deceleration |
| A | ○ | 0 | 0.5 | 0.1 | 0.4 | 0.1 | 0.2 | 0.5 | 0.0 | ... | Acceleration |
| A | ○ | 1 | 1.0 | 0.5 | 0.0 | 0.0 | 0.0 | 0.1 | 0.7 | ... | Travel at constant speed |
| A | ○ | 1 | 1.0 | 1.0 | 0.1 | 0.2 | 0.5 | 0.0 | 0.1 | ... | Travel at constant speed |
| A | ○ | 1 | 0.0 | 1.0 | 0.0 | 0.9 | 0.8 | 1.0 | 0.3 | ... | Lane change to right |
| A | ○ | 1 | 0.0 | 0.0 | 1.0 | 0.1 | 0.2 | 0.5 | 0.0 | ... | Deceleration |
| B | × | 0 | 0.5 | 0.0 | 0.0 | 0.1 | 1.0 | 0.1 | 1.0 | ... | Travel at constant speed |

| Driver | Passenger seat | Rear seat | Environmental parameters | | | | | | | | Action |
|---|---|---|---|---|---|---|---|---|---|---|---|
| | | | Va | Vba | DRba | RSb | Vca | Dca | Rca | ... | |
| A | ○ | 1 | 1.0 | 0.5 | 0.0 | 0.0 | 0.0 | 0.1 | 0.7 | ... | Travel at constant speed |
| A | ○ | 1 | 1.0 | 1.0 | 0.1 | 0.2 | 0.5 | 0.0 | 0.1 | ... | Travel at constant speed |
| A | ○ | 1 | 0.0 | 1.0 | 0.0 | 0.9 | 0.8 | 1.0 | 0.3 | ... | Lane change to right |
| A | ○ | 1 | 0.0 | 0.0 | 1.0 | 0.1 | 0.2 | 0.5 | 0.0 | ... | Deceleration |

1106

| ID | Environmental parameters | | | | | | | | Action |
|---|---|---|---|---|---|---|---|---|---|
| | Va | Vba | DRba | RSb | Vca | Dca | Rca | ... | |
| 1010 | 1.1 | 0.6 | 0.0 | 0.0 | 0.0 | 0.2 | 0.8 | ... | Travel at constant speed |
| 1010 | 0.0 | 1.1 | 0.0 | 0.9 | 0.8 | 1.1 | 1.3 | ... | Lane change to right |
| 2015 | 1.1 | 1.1 | 0.1 | 0.2 | 0.5 | 0.1 | 0.2 | ... | Travel at constant speed |
| 2015 | 0.1 | 0.1 | 1.0 | 0.1 | 0.2 | 0.6 | 0.1 | ... | Deceleration |
| ⋮ | ⋮ | ⋮ | ⋮ | ⋮ | ⋮ | ⋮ | ⋮ | ⋮ | ⋮ |
| — | 1.0 | 0.5 | 0.0 | 0.0 | 0.0 | 0.1 | 0.7 | ... | Travel at constant speed |
| — | 1.0 | 1.0 | 0.1 | 0.2 | 0.5 | 0.0 | 0.1 | ... | Travel at constant speed |
| — | 0.0 | 1.0 | 0.0 | 0.9 | 0.8 | 1.0 | 0.3 | ... | Lane change to right |
| — | 0.0 | 0.0 | 1.0 | 0.1 | 0.2 | 0.5 | 0.0 | ... | Deceleration |

1110

1116

DRIVING ASSISTANCE METHOD, AND DRIVING ASSISTANCE DEVICE, DRIVING CONTROL DEVICE, VEHICLE, AND RECORDING MEDIUM USING SAID METHOD

This application is a U.S. national stage application of the PCT International Application No. PCT/JP2016/002048 filed on Apr. 15, 2016, which claims the benefit of foreign priority of Japanese patent application No. 2015-087069, 2015-099474, 2015-119139, 2015-252667 filed on Apr. 21, 2015, May 14, 2015, Jun. 12, 2015, Dec. 24, 2015, the contents all of which are incorporated herein by reference.

TECHNICAL FIELD

The present invention relates to a vehicle, a driving assistance method applied to the vehicle, and a driving assistance device, a driving control device, and a driving assistance program using the driving assistance method.

BACKGROUND ART

Recently, there have been proposed various technologies relating to a vehicle which can be driven in a manual driving mode in which a driver oneself drives the vehicle or in an autonomous driving mode in which a portion of or all of driving operations are autonomously performed, or technologies relating to a fully automated self-driving vehicle, based on a surrounding situation of the vehicle or a travel state (for example, the speed of the vehicle or control information such as steering, acceleration, braking, turn signal indicator, or actuator) of the vehicle, and these technologies have been put into practical use.

For example, PTL 1 discloses a travel control device configured to, when performing, on a host vehicle, autonomous steering control or autonomous acceleration/deceleration control, allow a driver to visually recognize the operating state of the autonomous steering control or the autonomous acceleration/deceleration control.

CITATION LIST

Patent Literature

PTL 1: Unexamined Japanese Patent Publication No. 2005-67483

SUMMARY OF THE INVENTION

The present invention provides a driving assistance method capable of solving at least one of the foregoing problems during full autonomous driving or limited autonomous driving, and a driving assistance device, an autonomous driving control device, a vehicle, and a driving assistance program using the driving assistance method.

A driving assistance device according to one aspect of the present invention includes a travel history generator that generates, for each of drivers, a travel history associating an environmental parameter indicating a travel environment through which a vehicle has previously traveled with an action selected by each of the drivers in response to the environmental parameter. This driving assistance device also includes an acquisition unit that acquires a travel history similar to a travel history of a current driver from among travel histories generated by the travel history generator. This driving assistance device also includes a driver model generator that generates a driver model based on the travel history acquired by the acquisition unit, and a determination unit that determines a next action based on the driver model generated by the driver model generator and an environmental parameter indicating the current travel environment of the vehicle.

Another aspect of the present invention provides an autonomous driving control device. This device includes a travel history generator that generates, for each of drivers, a travel history associating an environmental parameter indicating a travel environment through which a vehicle has previously traveled with an action selected by each of the drivers in response to the environmental parameter. This autonomous driving control device also includes an acquisition unit that acquires a travel history similar to a travel history of a current driver from among travel histories generated by the travel history generator. This autonomous driving control device also includes a driver model generator that generates a driver model based on the travel history acquired by the acquisition unit, a determination unit that determines a next action based on the driver model generated by the driver model generator and an environmental parameter indicating the current travel environment of the vehicle, and an autonomous driving controller that controls autonomous driving of the vehicle based on the next action determined by the determination unit.

Still another aspect of the present invention provides a vehicle. This vehicle is provided with a driving assistance device. The driving assistance device includes a travel history generator that generates, for each of drivers, a travel history associating an environmental parameter indicating a travel environment through which the vehicle has previously traveled with an action selected by each of the drivers in response to the environmental parameter. The driving assistance device also includes an acquisition unit that acquires a travel history similar to a travel history of a current driver from among travel histories generated by the travel history generator. This driving assistance device also includes a driver model generator that generates a driver model based on the travel history acquired by the acquisition unit, and a determination unit that determines a next action based on the driver model generated by the driver model generator and an environmental parameter indicating the current travel environment of the vehicle.

Yet another aspect of the present invention provides a driving assistance method. This method includes generating, for each of drivers, a travel history associating an environmental parameter indicating a travel environment through which a vehicle has previously traveled with an action selected by each of the drivers in response to the environmental parameter, and acquiring a travel history similar to a travel history of a current driver from among the generated travel histories. This driving assistance method also includes generating a driver model based on the acquired travel history, and determining a next action based on the generated driver model and an environmental parameter indicating a current travel environment of the vehicle.

Any desired combinations of the above described components and modifications of the features of the present invention in devices, systems, methods, computer programs, a non-transitory computer-readable recording media containing the computer programs, a vehicle having mounted thereto the present device, or other entities are still effective as other aspects of the present invention.

According to the present invention, information can appropriately be transmitted to an occupant from a vehicle so as to enable comfortable autonomous driving in which a vehicle operation and a driver's operation are difficult to be incompatible with each other in full autonomous driving or limited autonomous driving.

BRIEF DESCRIPTION OF DRAWINGS

FIG. 6A is a view for describing the first example of a travel environment according to the first exemplary embodiment.

FIG. 6B is a view for describing another display control for the first example of a travel environment according to the first exemplary embodiment.

FIG. 10A is a view for describing a fifth example of a travel environment according to the first exemplary embodiment.

FIG. 10B is a view for describing display control for the fifth example of a travel environment according to the first exemplary embodiment.

FIG. 16 is a diagram for describing one example of a travel history according to a fourth exemplary embodiment.

FIG. 17 is a diagram illustrating a method for constructing a clustering-type driver model according to the fourth exemplary embodiment.

FIG. 18 is a diagram illustrating one example of the constructed clustering-type driver model according to the fourth exemplary embodiment.

FIG. 19 is a diagram illustrating another example of the constructed clustering-type driver model according to the fourth exemplary embodiment.

FIG. 20 is a diagram illustrating a method for constructing an individually-adapted-type driver model according to the fourth exemplary embodiment.

FIG. 21 is a diagram illustrating one example of the constructed individually-adapted-type driver model according to the fourth exemplary embodiment.

FIG. 22 is a diagram for describing one example of a driving characteristic model according to the fourth exemplary embodiment.

FIG. 27 is a diagram for describing one example of a travel history according to the fourth exemplary embodiment.

FIG. 28A is a diagram illustrating a method for using a driver model in a modification of the driver model according to the fourth exemplary embodiment.

FIG. 28B is a diagram illustrating a method for using a driver model in the modification of the driver model according to the fourth exemplary embodiment.

FIG. 30 is a diagram illustrating one example of a method for generating a cache in the modification of the driver model according to the fourth exemplary embodiment.

FIG. 36A is a diagram illustrating a data structure of a travel history generated by a travel history generator in FIG. 35.

FIG. 36B is a diagram illustrating a data structure of a travel history generated by the travel history generator in FIG. 35.

FIG. 37A is a diagram illustrating another data structure of a travel history generated by the travel history generator in FIG. 35.

FIG. 37B is a diagram illustrating another data structure of a travel history generated by the travel history generator in FIG. 35.

FIG. 38A is a diagram illustrating an outline of a process performed by a transmitter in FIG. 35.

FIG. 38B is a diagram illustrating an outline of a process performed by the transmitter in FIG. 35.

FIG. 39 is a diagram illustrating an outline of another process performed by the transmitter in FIG. 35.

FIG. 40A is a diagram illustrating an outline of a process performed by an inquiry unit in FIG. 35.

FIG. 40B is a diagram illustrating an outline of a process performed by the inquiry unit in FIG. 35.

DESCRIPTION OF EMBODIMENTS

Prior to describing exemplary embodiments of the present invention, problems of a conventional device will be briefly described. During autonomous driving (including both full autonomous driving and limited autonomous driving), a driver relies on a vehicle to autonomously drive, so that a trust relationship between the vehicle and the driver is significantly important, and it is necessary to transmit appropriate information between the vehicle and the driver (occupant). In PTL 1, a driver is notified of only a current operating state.

There arises a first problem in which the driver has a large amount of anxiety, if he/she is notified of only a current behavior (operating state or control content) of the vehicle and not notified of a behavior that the vehicle is about to perform (for example, a control content, such as a lane change, acceleration, or deceleration, which is about to be performed by the vehicle particularly before merging, before entering an intersection, when an emergency vehicle is close to the vehicle, or when nearby vehicles around the vehicle are about to do or have done a certain action), during autonomous driving.

In addition, there is a second problem as follows. During full autonomous driving, it is highly likely that the driver takes actions other than monitoring driving. Therefore, even when only the current operating state is suddenly displayed, the driver is unable to recognize the current surrounding situation of the vehicle or the travel state of the vehicle, and even if the driver tries to issue a driving instruction by his/her own will, he/she is unable to promptly respond, and he/she cannot smoothly give an instruction to the vehicle.

There is also a third problem in which the driver is notified of only the current operating state, and even if the driver tries to directly and manually drive the vehicle, the driving mode is not promptly switched from the autonomous driving to the manual driving.

In addition, there is a fourth problem as follows. Even if the vehicle takes the same action by the driver or an occupant, a timing of the action or an operation amount is different for each person, and it is likely to be deviated from a sense of the driver when the driver actually manually drives the vehicle. In the worst case, an unnecessary intervention performed by the driver may be induced during autonomous driving.

Hereinafter, exemplary embodiments of the present invention will be described in detail with reference to the drawings. Note that each of the exemplary embodiments described below is only illustrative, and does not limit the present invention.

First Exemplary Embodiment

Figure 1:
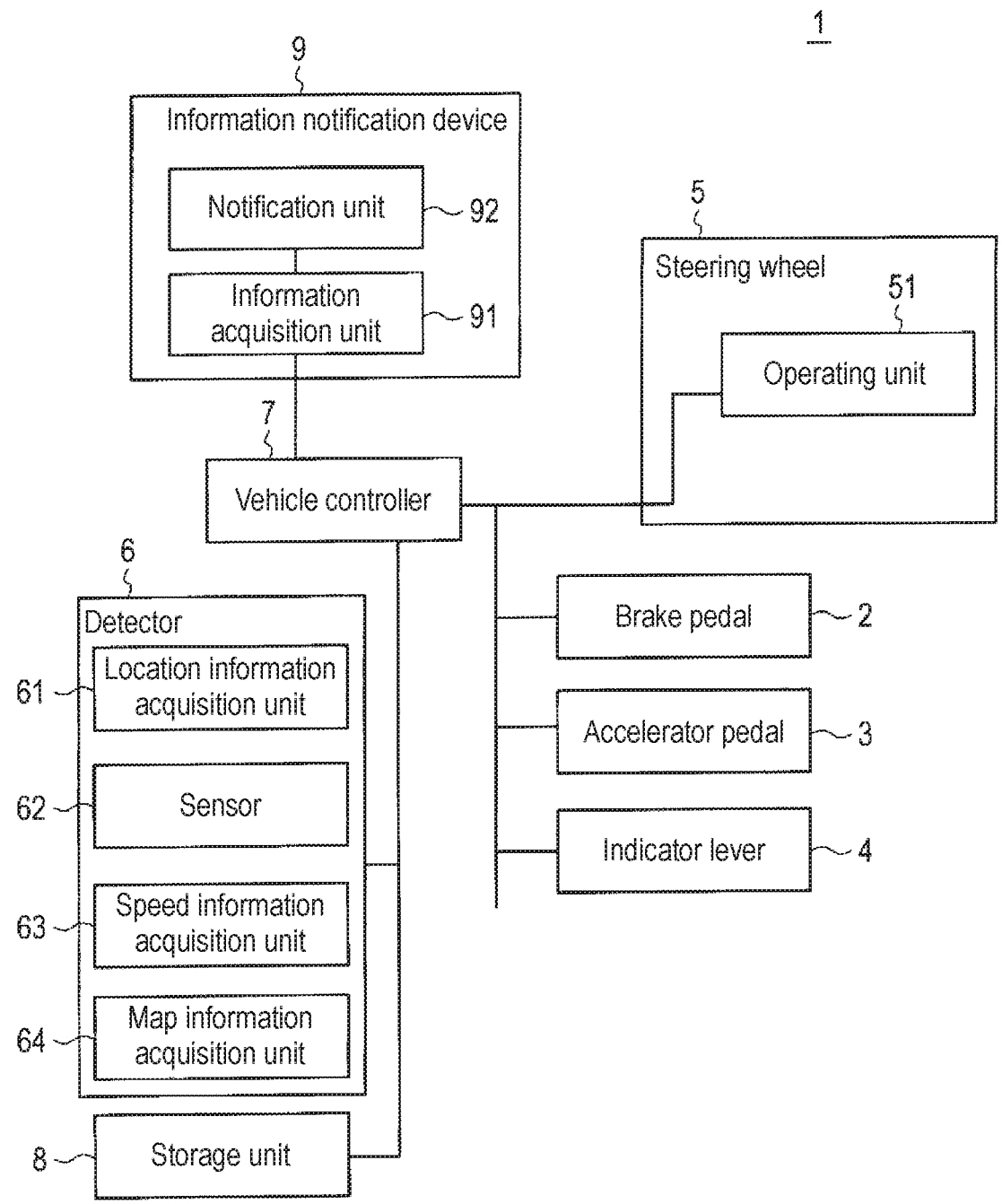
FIG. 1 is a block diagram illustrating a configuration of a main part of a vehicle including an information notification device according to a first exemplary embodiment of the present invention.

FIG. 1 is a block diagram illustrating a configuration of a main part of vehicle 1 including an information notification device according to the first exemplary embodiment of the present invention. Vehicle 1 enables all of or a portion of driving control autonomously without requiring an operation by a driver.

Vehicle 1 includes brake pedal 2, accelerator pedal 3, indicator lever 4, steering wheel 5, detector 6, vehicle controller 7, storage unit 8, and information notification device 9.

Brake pedal 2 receives a brake operation performed by the driver to decelerate vehicle 1. Brake pedal 2 may also receive a result of control performed by vehicle controller 7, and vary in an amount corresponding to the degree of deceleration of vehicle 1. Accelerator pedal 3 receives an acceleration operation performed by the driver to accelerate vehicle 1. Accelerator pedal 3 may also receive a control result by vehicle controller 7, and vary in an amount corresponding to the degree of acceleration of vehicle 1. Indicator lever 4 receives a lever operation performed by the driver to turn on an unillustrated turn indicator of vehicle 1. Indicator lever 4 may also receive a result of control performed by vehicle controller 7 to bring indicator lever 4 into a state corresponding to the indicated direction of vehicle 1 and turn on the unillustrated turn indicator of vehicle 1.

Steering wheel 5 receives a steering operation performed by the driver to change the travel direction of vehicle 1. Steering wheel 5 may also receive a result of control performed by vehicle controller 7, and vary in an amount corresponding to the change in the travel direction of vehicle 1. Steering wheel 5 is provided with operating unit 51.

Operating unit 51 is provided on a front face (face facing the driver) of steering wheel 5, and receives an input operation from the driver. Operating unit 51 is a device such as a button, a touch panel, or a grip sensor, for example. Operating unit 51 outputs the information about the input operation received from the driver to vehicle controller 7.

Detector 6 detects a travel state of vehicle 1 and a surrounding situation of vehicle 1. Then, detector 6 outputs information about the detected travel state and the surrounding situation to vehicle controller 7.

Detector 6 includes location information acquisition unit 61, sensor 62, speed information acquisition unit 63, and map information acquisition unit 64.

Location information acquisition unit 61 acquires, as the information about the travel state, information about the location of vehicle 1 by a global positioning system (GPS) or the like.

Sensor 62 detects the surrounding situation of vehicle 1, that is, the location of a nearby vehicle present around vehicle 1 and the determination of whether the other vehicle is a leading vehicle or not from information about the location of this vehicle and lane position information, a time to collision (TTC) from the speed of the nearby vehicle and the speed of vehicle 1, or an obstacle present around vehicle 1.

Speed information acquisition unit 63 acquires, as information about the travel state, information about the speed or the travel direction of vehicle 1 by an unillustrated speed sensor or the like.

Map information acquisition unit 64 acquires, as information about the surrounding situation of vehicle 1, map information around vehicle 1 such as the road on which vehicle 1 is traveling, a merging point with a nearby vehicle on the road, the lane in which vehicle 1 is currently traveling, a position of an intersection, or the like.

Note that sensor 62 includes a millimeter-wave radar, a laser radar, a camera, or a combination thereof.

Storage unit 8 is a storage device such as a read only memory (ROM), a random access memory (RAM), a hard disk drive, or a solid state drive (SSD), and stores a correspondence between the travel environment at present and a candidate of a behavior that can be performed next (after a lapse of a first predetermined time).

The travel environment at present is an environment determined based on the location of vehicle 1, the road on which vehicle 1 is traveling, the location and speed of a nearby vehicle present around vehicle 1, for example. Notably, for example, whether vehicle 1 is now accelerating or decelerating, and in addition, even a possibility of collision with a nearby vehicle after one second because of the nearby vehicle cutting in front of vehicle 1 may also be determined, according to the location or speed of the nearby vehicle, based on not only momentary data but also data before and after the moment. Thus, the action of the nearby vehicle can be predicted, whereby the travel environment can be recognized in more detail with higher accuracy. The behavior candidate is a candidate of a behavior that can be performed next by vehicle 1 (after a lapse of the first predetermined time) in response to the travel environment at present.

For example, storage unit 8 stores in advance three behavior candidates which are acceleration of vehicle 1, deceleration of vehicle 1, and lane change of vehicle 1 to the right, in association with a travel environment in which there is a merging lane ahead on the lane in which vehicle 1 is traveling, there is a vehicle merging from the left side of the lane, and it is possible to change lanes to the right relative to the lane in which vehicle 1 is traveling.

Storage unit 8 also stores in advance, in association with a travel environment in which a vehicle traveling in front of vehicle 1 in the same lane of vehicle 1 (hereinafter such a vehicle will be referred to as a "leading vehicle") is traveling with the speed lower than the speed of vehicle 1, and it is possible to change the lane to the adjacent lane, three behavior candidates which are a travel mode for overtaking the leading vehicle, a travel mode for changing the lane to the adjacent lane, and a travel mode for decelerating vehicle 1 to follow the leading vehicle.

In addition, storage unit 8 may store the priority order of each of the behavior candidates. For example, storage unit 8 may store the number of times each behavior has been actually used for the same previous travel environment, and may store such that the most frequently used behavior has a higher priority order.

Vehicle controller 7 can be implemented as a part of a large scale integration (LSI) circuit or an electronic control unit (ECU) controlling the vehicle, for example. Vehicle controller 7 controls the vehicle based on information about the travel state and the surrounding situation acquired from detector 6, and controls brake pedal 2, accelerator pedal 3, indicator lever 4, and information notification device 9 according to the result of the vehicle control. Note that the target to be controlled by vehicle controller 7 is not limited to those described above.

Firstly, vehicle controller 7 determines the travel environment at present based on the information about the travel state and the surrounding situation. Conventionally proposed various methods can be used for this determination.

For example, vehicle controller 7 determines the travel environment at present to be "a travel environment in which there is a merging lane ahead on the lane in which vehicle 1 is traveling, there is a vehicle merging from the left side of the lane, and it is possible to change the lane to the right relative to the lane in which vehicle 1 is traveling", based on the information about the travel state and the surrounding situation.

Further, vehicle controller 7 determines, for example, that the time sequence of the travel environment is a "travel environment in which a vehicle traveling in front of vehicle 1 in the same lane of vehicle 1 is traveling with the speed lower than the speed of vehicle 1, and it is possible to change the lane to the adjacent lane", based on the information about the travel state and the surrounding situation.

Vehicle controller 7 causes notification unit 92 of information notification device 9 to provide notification regarding information pertaining to the travel environment indicating the travel state and the surrounding situation. Vehicle controller 7 also reads, from storage unit 8, behavior candidates that can be performed next by vehicle 1 (after a lapse of the first predetermined time) in response to the determined travel environment.

Vehicle controller 7 determines which is the most suitable for the current travel environment from among the read behavior candidates, and sets the behavior most suitable for the current travel environment as a first behavior. Notably, the first behavior may be the same as the behavior the vehicle 1 is currently doing, that is, vehicle 1 may continue the current behavior. Then, vehicle controller 7 sets, as a second behavior (different from the behavior to be performed), the behavior candidate executable by the driver other than the first behavior in the current travel environment.

For example, vehicle controller 7 may set the most suitable behavior as the first behavior using a conventional technology for determining the most suitable behavior based on the information about the travel state and the surrounding situation.

Alternatively, vehicle controller 7 may set, from among a plurality of behavior candidates, a predefined behavior as the most suitable behavior, or vehicle controller 7 may store in storage unit 8 the information about the last selected behavior, and determine this behavior as the most suitable behavior. Alternatively, vehicle controller 7 may store in storage unit 8 the number of times each behavior has been previously selected, and determine the most frequently selected behavior as the most suitable behavior.

Then, vehicle controller 7 causes notification unit 92 of information notification device 9 to provide notification regarding the information about the first behavior and the second behavior. Note that, when vehicle controller 7 determines that there is no second behavior, vehicle controller 7 causes notification unit 92 to provide notification regarding only the first behavior.

It is to be noted that vehicle controller 7 may cause notification unit 92 to simultaneously provide notifications regarding the information about the first behavior and the second behavior and the information about the travel state and the surrounding situation.

In addition, vehicle controller 7 acquires information about the operation received by operating unit 51 from the driver. Vehicle controller 7 determines whether or not operating unit 51 has received an operation within a second predetermined time after the notification regarding the first behavior and the second behavior. This operation corresponds to an operation for selecting one of behaviors included in the second behavior, for example.

When operating unit 51 has not received an operation within the second predetermined time, vehicle controller 7 controls the vehicle such that the vehicle executes the first behavior, and controls brake pedal 2, accelerator pedal 3, and indicator lever 4 according to the vehicle control result.

When operating unit 51 has received an operation within the second predetermined time, vehicle controller 7 performs the control corresponding to the received operation.

Information notification device 9 acquires various information items pertaining to travel of vehicle 1 from vehicle controller 7, and provides notification regarding the acquired information. Information notification device 9 includes information acquisition unit 91 and notification unit 92.

Information acquisition unit 91 acquires various information items pertaining to travel of vehicle 1 from vehicle controller 7. For example, when determining that vehicle controller 7 may update the behavior of vehicle 1, information acquisition unit 91 acquires the information about the first behavior and the second behavior from vehicle controller 7.

Then, information acquisition unit 91 temporarily stores the acquired information in an unillustrated storage unit, and reads the stored information from the storage unit and outputs the read information to notification unit 92 as needed.

Notification unit 92 notifies the driver of the information pertaining to travel of vehicle 1. Notification unit 92 may be a display for displaying information, such as a light emitting element, e.g., a light emitting diode (LED), provided on a car navigation system, a head-up display, a center display, steering wheel 5, or a pillar in the vehicle interior. Notification unit 92 may be a speaker for notifying the driver of information by converting the information into a sound. Notification unit 92 may be a vibrator provided on a position (for example, a seat for the driver, steering wheel 5, and the like) where the driver can sense the vibration. In addition, notification unit 92 may be a combination of these elements.

In the following description, notification unit 92 is described as a notification device.

In this case, notification unit 92 is a head up display (HUD), a liquid crystal display (LCD), a head-mounted display or a helmet-mounted display (HMD), smart glasses, and other exclusive displays. HUD may be a windshield of vehicle 1, or a glass surface or a plastic surface (for example, combiner) separately provided, for example. Further, the windshield may be a front windscreen, or a side windscreen, or a rear windscreen of vehicle 1, for example.

In addition, the HUD may be a transmissive display provided on the surface or the inside of the windshield. Herein, the transmissive display is a transmissive organic electroluminescence (EL) display or a transparent display using a glass that emits light when being irradiated with light of a specific wavelength. The driver can visually recognize the display on the transmissive display while viewing a background. As described above, notification unit 92 may be a display medium that transmits light. In any case, an image is displayed on notification unit 92.

Notification unit 92 notifies the driver of the information pertaining to travel acquired from vehicle controller 7 through information acquisition unit 91. For example, notification unit 92 notifies the driver of the information about the first behavior and the second behavior acquired from vehicle controller 7.

Hereinafter, a specific display content and an operation performed on operating unit 51 will be described.

Figure 2B:
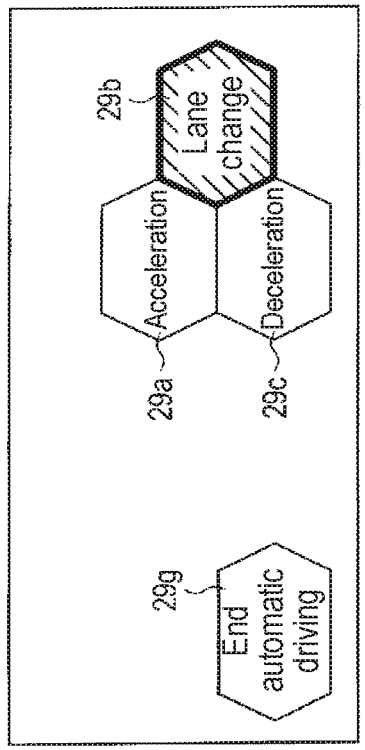
FIG. 2B is a view for describing a display on a notification unit relative to the first example of a travel environment according to the first exemplary embodiment.
Figure 2C:
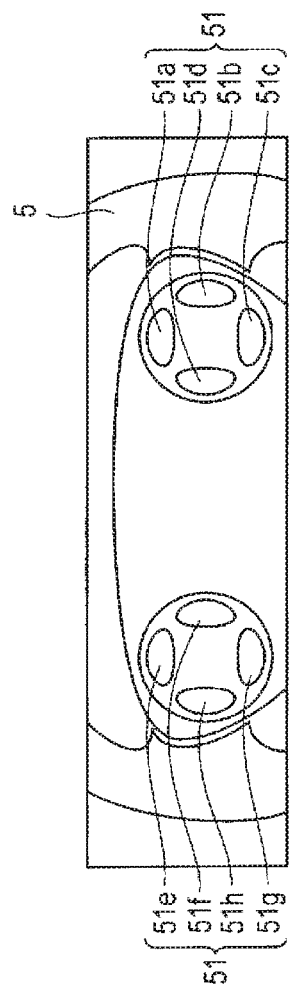
FIG. 2C is a view for describing an operation on an operating unit relative to the first example of a travel environment according to the first exemplary embodiment.
Figure 2A:
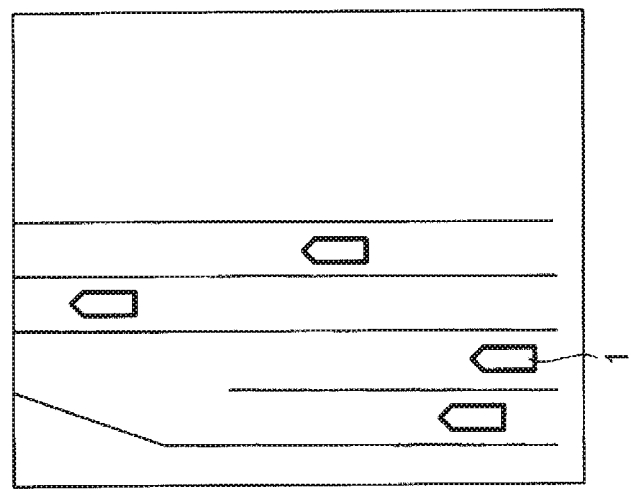
FIG. 2A is a view for describing a first example of a travel environment according to the first exemplary embodiment.

FIGS. 2A to 2C are views for describing a first example of a travel environment, a display on notification unit 92 for the first example, and an operation to operating unit 51.

FIG. 2A is an overhead view illustrating the travel environment of vehicle 1. Specifically, FIG. 2A illustrates a travel environment in which there is a merging lane ahead on the lane in which vehicle 1 is traveling, there is a vehicle merging from the left side of the lane, and it is possible to change lanes to the right relative to the lane in which vehicle 1 is traveling.

Vehicle controller 7 determines that the travel environment is the one illustrated in FIG. 2A based on the information about the travel state and the surrounding situation. Note that vehicle controller 7 may generate the overhead view illustrated in FIG. 2A, and may cause notification unit 92 to provide notification regarding the generated overhead view in addition to the information about the first behavior and the second behavior.

FIG. 2B illustrates one example of the display on notification unit 92 in response to the travel environment illustrated in FIG. 2A. In a display range of notification unit 92, options involved with the behavior of vehicle 1 are displayed on the right, and information for switching from autonomous driving to manual driving is displayed on the left.

The first behavior is "lane change" displayed in highlighted display region 29b in display regions 29a to 29c and 29g. The second behavior is "acceleration" and "deceleration" respectively displayed in display regions 29a and 29c. In addition, "end autonomous driving" indicating that the driving mode is switched from autonomous driving to manual driving is displayed in display region 29g.

FIG. 2C illustrates one example of operating unit 51 provided on steering wheel 5. Operating unit 51 includes operation buttons 51a to 51d provided on the right side of steering wheel 5 and operation buttons 51e to 51h provided on the left side of steering wheel 5. Note that the number, shape, and other conditions of operating units 51 provided to steering wheel 5 are not limited to those described above.

In the present exemplary embodiment, display regions 29a to 29c illustrated in FIG. 2B correspond to operation buttons 51a to 51c, respectively, and display region 29g corresponds to operation button 51g.

In this configuration, when selecting any one of contents displayed in each display region, the driver presses the operation button corresponding to each display region. For example, to select the behavior of "acceleration" displayed in display region 29a, the driver presses operation button 51a.

Although only character information is displayed in each display region in FIG. 2B, a symbol or an icon involved with drive of the vehicle may be displayed as described next. According to this configuration, the driver can recognize the display content at a glance.

Figure 3:
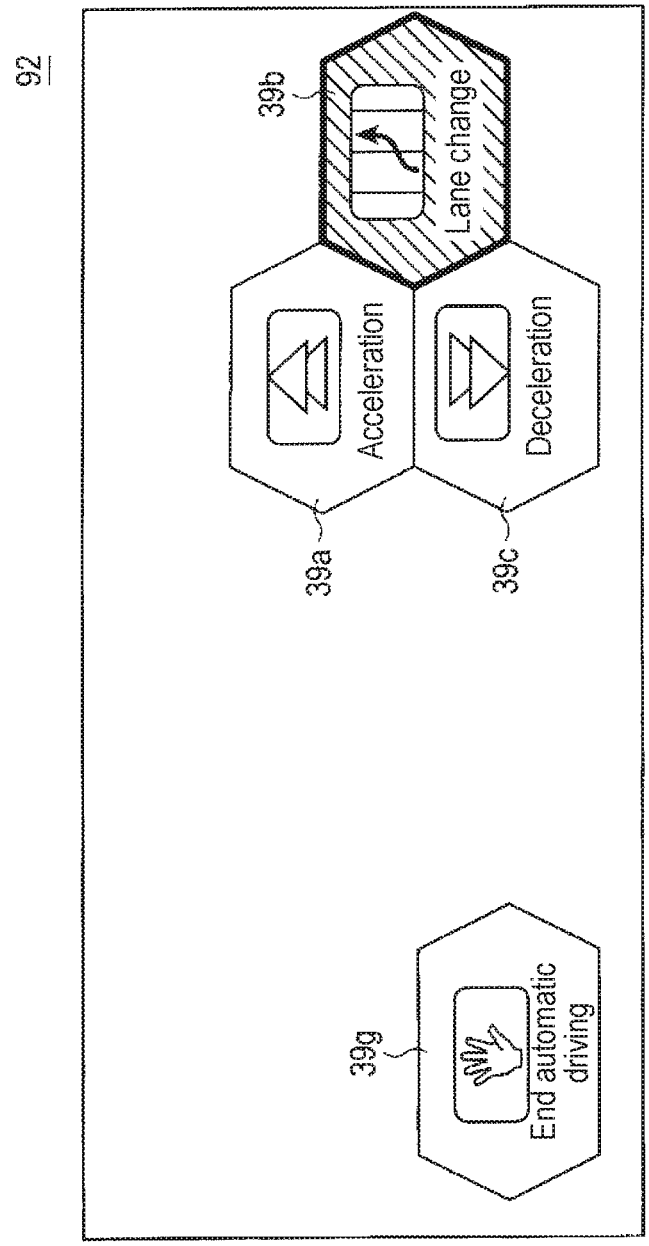
FIG. 3 is a view illustrating another example of a display on the notification unit according to the first exemplary embodiment.

FIG. 3 is a view illustrating another example of a display on notification unit 92. As illustrated in FIG. 3, character information and symbols indicating the information are both displayed in display regions 39a to 39c and 39g. Note that only symbols may be displayed.

Next, a display control flow will be described, using a specific travel environment as one example.

Figure 4:
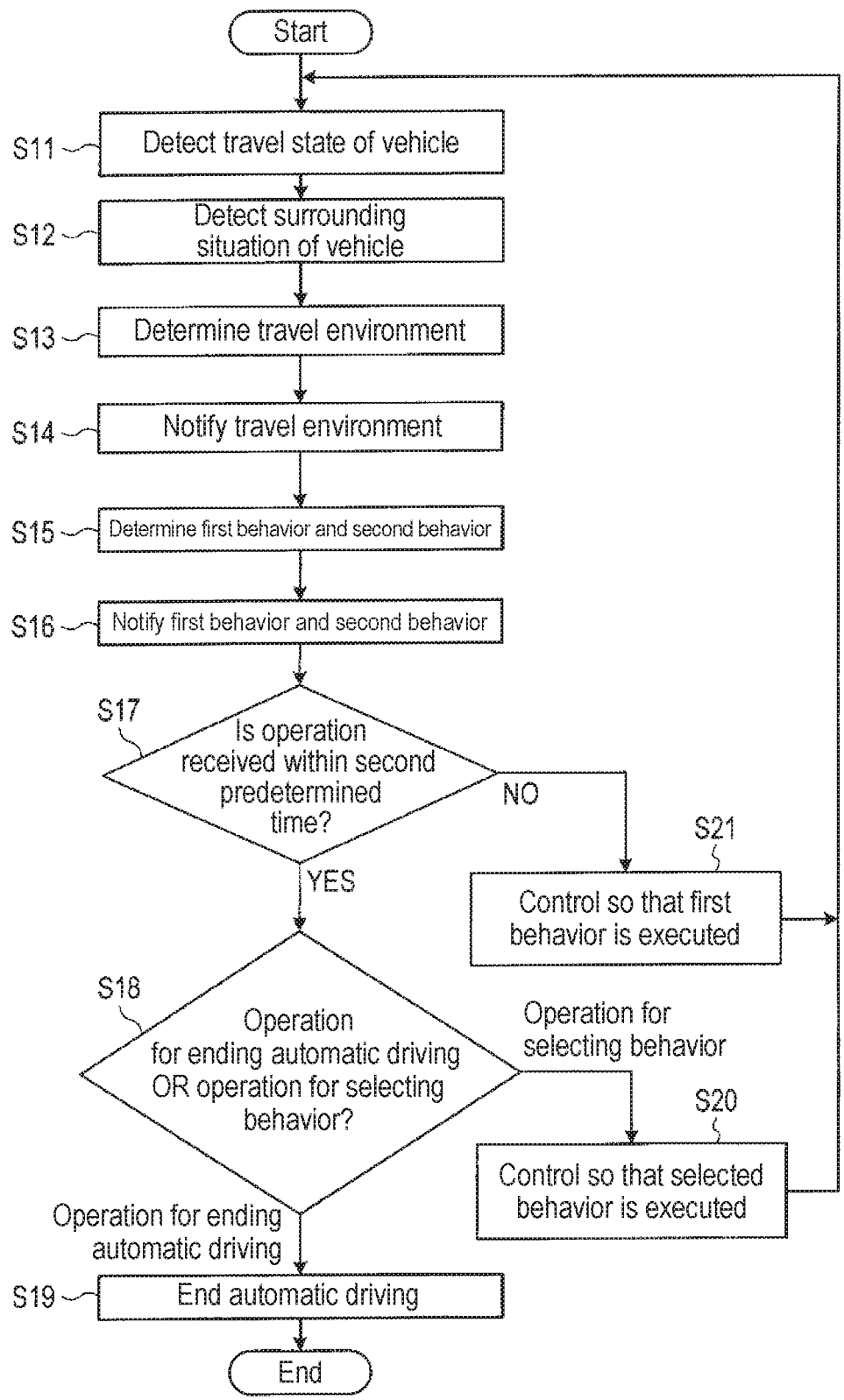
FIG. 4 is a flowchart illustrating a procedure of an information notification process according to the first exemplary embodiment.
Figure 5B:
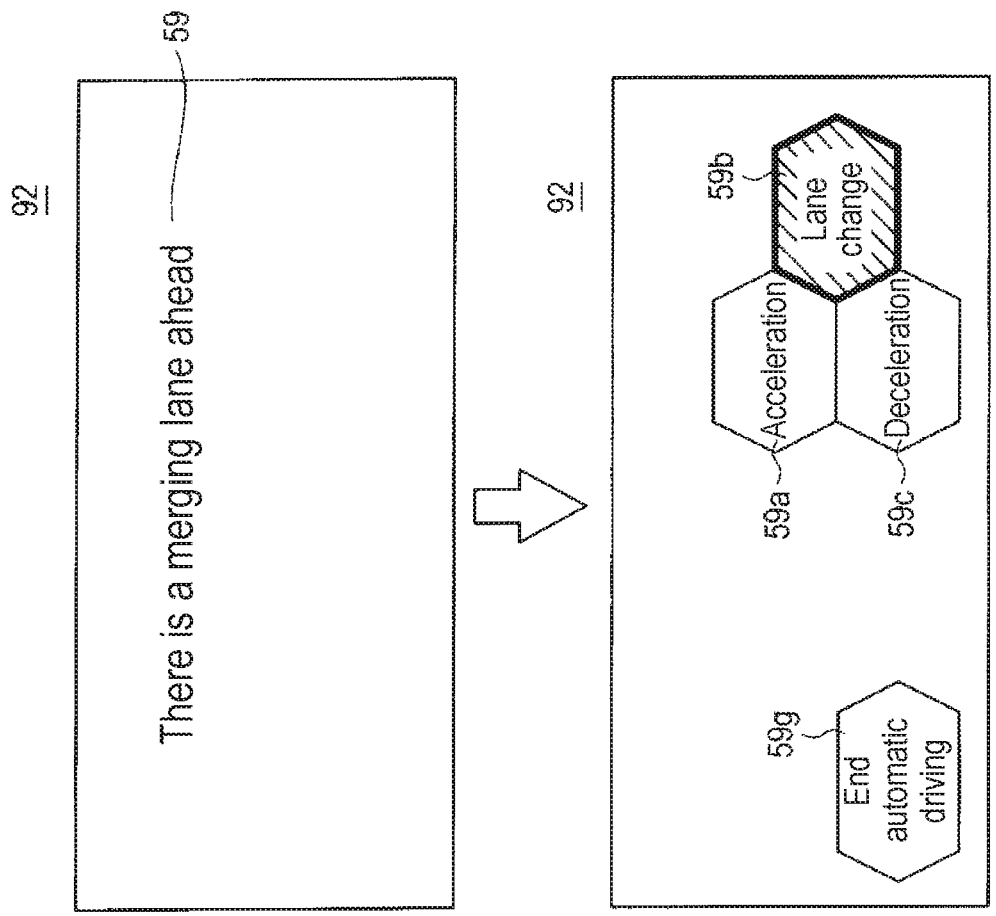
FIG. 5B is a view for describing display control for the first example of a travel environment according to the first exemplary embodiment.
Figure 5A:
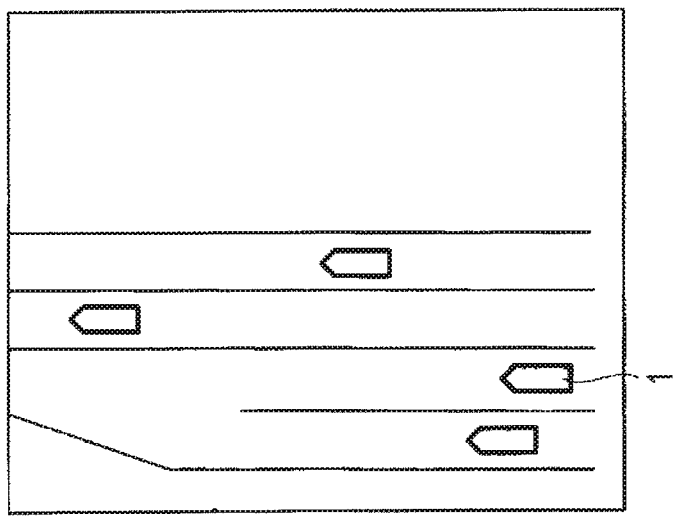
FIG. 5A is a view for describing the first example of a travel environment according to the first exemplary embodiment.

FIG. 4 is a flowchart illustrating a procedure of an information notification process according to the present exemplary embodiment. FIG. 5A is a view illustrating the first example of the travel environment, and FIG. 5B is a view illustrating display control for this environment.

As illustrated in FIG. 4, detector 6 detects the travel state of the vehicle (step S11). Then, detector 6 detects the surrounding situation of the vehicle (step S12). Detector 6 outputs to vehicle controller 7 the information about the travel state of the vehicle and the surrounding situation of the vehicle which have been detected.

Next, vehicle controller 7 determines the travel environment at present based on the information about the travel state and the surrounding situation (step S13). In the example in FIG. 5A, vehicle controller 7 determines the travel environment at present to be "a travel environment in which there is a merging lane ahead on the lane in which vehicle 1 is traveling, there is a vehicle merging from the left side of the lane, and it is possible to change lanes to the right relative to the lane in which vehicle 1 is traveling".

Then, vehicle controller 7 causes notification unit 92 of information notification device 9 to provide notification regarding the information about the determined travel environment (step S14). In the example in FIG. 5B, vehicle controller 7 outputs the information about the determined travel environment to information acquisition unit 91. Notification unit 92 acquires the information about the travel environment from information acquisition unit 91, and displays the acquired information as character information 59. Notably, vehicle controller 7 may cause a speaker or the like to notify the driver, with a voice/sound, of the information about the travel environment, instead of causing notification unit 92 to display the information about the travel environment. Accordingly, the information can reliably be transmitted to the driver, even if the driver does not see or fails to see the display or a monitor.

Next, vehicle controller 7 determines whether or not there is a possibility of updating the behavior for the determined travel environment. When determining that there is a possibility of updating, vehicle controller 7 then determines the first behavior and the second behavior (step S15). Whether or not there is a possibility of updating the behavior for the travel environment is determined based on whether or not the travel environment has been changed. Conceivable behaviors to be executed after the updating include decelerating the vehicle because of a possibility of collision between the vehicle and a nearby vehicle or the like, changing the speed when a leading vehicle disappears in adaptive cruise control (ACC), and changing lanes when the adjacent lane is vacant, for example. Whether or not to perform updating is determined using the conventional technology.

In this case, vehicle controller 7 reads, from storage unit 8, the behavior candidates that can be performed next by vehicle 1 (after a lapse of the first predetermined time) in response to the determined travel environment. Then, vehicle controller 7 determines which is the most suitable for the current travel environment from among the read behavior candidates, and sets the behavior most suitable for the current travel environment as a first behavior. Thereafter, vehicle controller 7 sets the behavior candidates excluding the first behavior as the second behavior.

In the example in FIG. 5B, vehicle controller 7 reads, from storage unit 8, three behavior candidates which are acceleration of vehicle 1, deceleration of vehicle 1, and lane change of vehicle 1 to the right. Then, vehicle controller 7 determines that the lane change of vehicle 1 to the right is the most suitable behavior based on the speed of the vehicle merging from the left and the condition of the right lane of vehicle 1, and sets this behavior as the first behavior. Thereafter, vehicle controller 7 sets the behavior candidates excluding the first behavior as the second behavior.

Next, vehicle controller 7 causes notification unit 92 of information notification device 9 to provide notification regarding the first behavior and the second behavior (step S16). In the example in FIG. 5B, notification unit 92 displays character information of "lane change" which is the information about the first behavior in display region 59b in a highlighted manner, and displays "acceleration" and "deceleration", which are the information about the second behavior, in display regions 59a and 59c, respectively.

Next, vehicle controller 7 determines whether or not operating unit 51 receives an operation from the driver within a second predetermined time (step S17).

For example, vehicle controller 7 sets, as the first predetermined time, the time from when vehicle controller 7 determines that the travel environment at present is the one illustrated in FIG. 5A until vehicle 1 reaches the merging point. Vehicle controller 7 then sets a second predetermined time shorter than the first predetermined time as a time in which the operation for the behavior to be executed next before the merging point can be received.

When operating unit 51 has received the operation from the driver within the second predetermined time (YES in step S17), vehicle controller 7 determines whether the received operation is an operation for ending autonomous driving or a behavior selecting (in other words, updating) operation (step S18).

As described with reference to FIG. 2C, each of the display regions of notification unit 92 corresponds to a corresponding one of the operation buttons of operating unit 51. When selecting "end autonomous driving" in FIG. 5B, the driver presses operation button 51g illustrated in FIG. 2C. When performing behavior selection, the driver presses any one of operation buttons 51a to 51c illustrated in FIG. 2C.

When the operation received by operating unit 51 is an operation for ending autonomous driving (that is, when the depression of operation button 51g is detected), vehicle controller 7 ends autonomous driving (step S19). When the operation received by operating unit 51 is the operation for behavior selection (that is, the depression of any one of operation buttons 51a to 51c is detected), vehicle controller 7 controls vehicle 1 such that vehicle 1 performs the behavior corresponding to the depressed operation button (step S20).

When operating unit 51 has not received any operation performed by the driver within the second predetermined time (NO in step S17), vehicle controller 7 controls vehicle 1 such that vehicle 1 performs the first behavior (step S21).

FIG. 6A is a view illustrating the first example of the travel environment, and FIG. 6B is a view illustrating another display control for this environment. FIG. 6A is similar to FIG. 5A, but the display control in FIG. 6B is different from the display control in FIG. 5B.

As in the case described with reference to FIG. 5B, vehicle controller 7 reads, from storage unit 8, three behavior candidates which are acceleration of vehicle 1, deceleration of vehicle 1, and lane change of vehicle 1 to the right, in response to the travel environment illustrated in FIG. 6A. In this case, it is supposed that storage unit 8 stores the lane change of vehicle 1 to the right as the behavior with the highest priority.

In this case, vehicle controller 7 causes notification unit 92 to provide notification regarding the information about the travel environment and the information about the first behavior. In FIG. 6B, vehicle controller 7 creates character information 69 indicating the information about the travel environment and the information about the first behavior, and causes notification unit 92 to display character information 69.

Then, vehicle controller 7 displays, in display regions 69a and 69c, displays for encouraging the driver to determine whether to use the first behavior. Vehicle controller 7 also displays, in display region 69g, the display of "end autonomous driving" indicating that the driving is switchable from autonomous driving to manual driving.

In this case, vehicle controller 7 displays "YES" corresponding to using the first behavior in a highlighted manner. Which one of "YES" and "NO" is displayed in a highlighted manner may be set in advance, the last selected option may be displayed in a highlighted manner, or storage unit 8 may store the number of times each behavior has been previously selected and notification unit 92 may display the most frequently selected behavior in a highlighted manner.

By learning the previously selected behavior in this way, vehicle controller 7 can appropriately notify the driver of information. In addition, the display to be displayed on notification unit 92 can be less than the display in FIG. 5B, whereby the burden on the driver can be reduced.

Figure 7A:
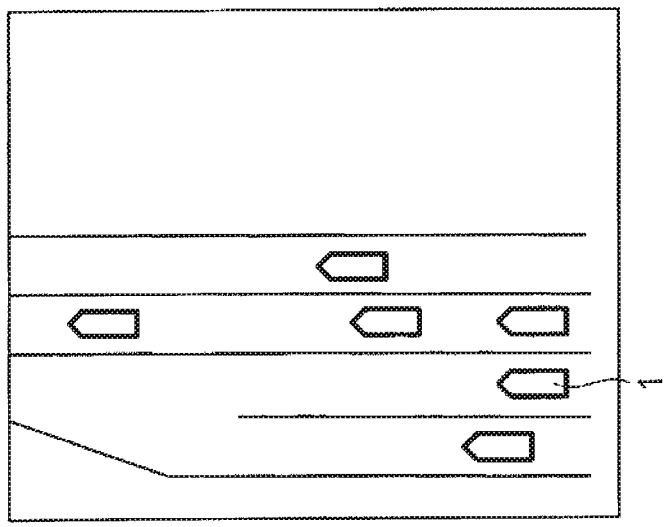
FIG. 7A is a view for describing a second example of a travel environment according to the first exemplary embodiment.
Figure 7B:
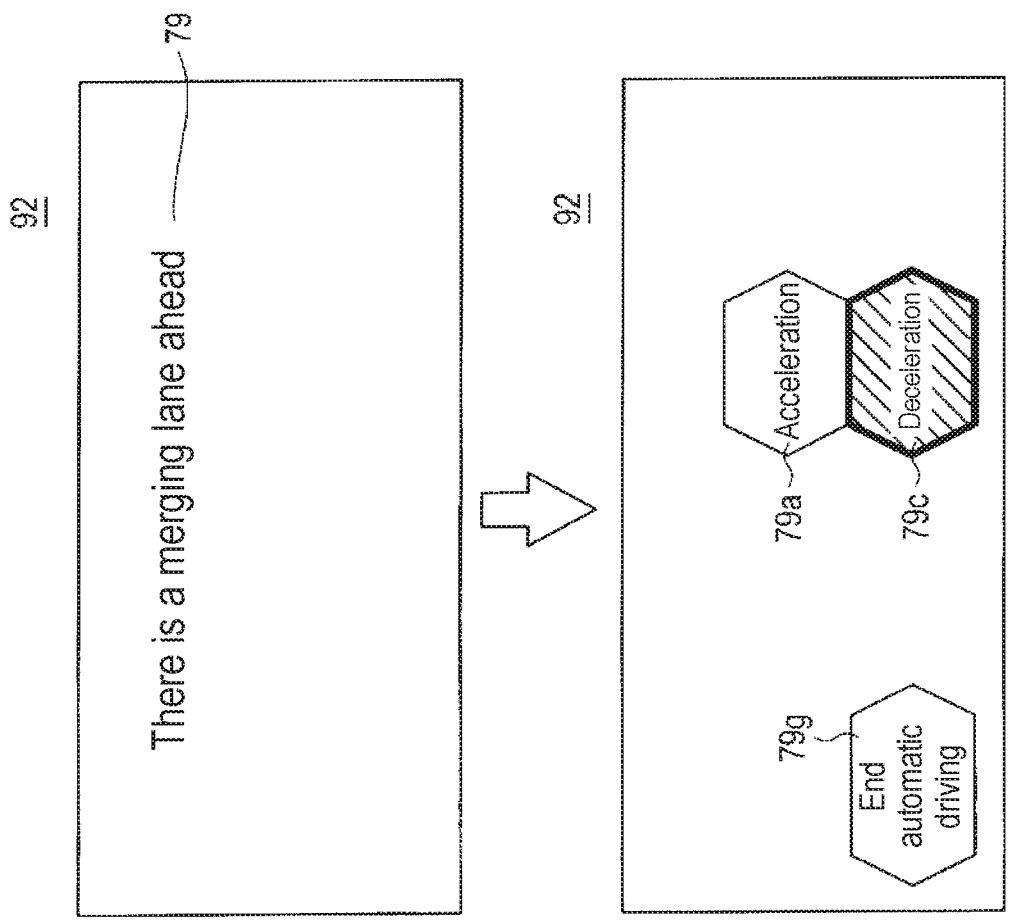
FIG. 7B is a view for describing display control for the second example of a travel environment according to the first exemplary embodiment.

FIG. 7A is a view illustrating a second example of the travel environment, and FIG. 7B is a view illustrating display control for this environment. FIG. 7A is an overhead view illustrating the travel environment. The travel environment illustrated in FIG. 7A is similar to those in FIGS. 5A and 6A in that there is a merging lane ahead, but different from those in FIGS. 5A and 6A in that there is a traveling vehicle on the right of vehicle 1. In such a case, vehicle controller 7 determines that it is impossible to change lanes.

When determining that the travel environment of vehicle 1 is the one illustrated in FIG. 7A, vehicle controller 7 causes notification unit 92 to display information about the determined travel environment as character information 79 as illustrated in FIG. 7B.

Further, vehicle controller 7 selects only acceleration of vehicle 1 and deceleration of vehicle 1 from among three behavior candidates read from storage unit 8, which are acceleration of vehicle 1, deceleration of vehicle 1, and lane change of vehicle 1 to the right, because the lane change of vehicle 1 to the right is impossible.

In addition, vehicle controller 7 predicts that vehicle 1 becomes too close to the merging vehicle if vehicle 1 is traveling with the current speed, and determines that the deceleration of vehicle 1 is the most suitable behavior, that is, the first behavior.

In this case, which is the most suitable behavior among the three behavior candidates is determined using a conventional technology for determining the most suitable behavior based on the information about the travel state and the surrounding situation. Alternatively, which is the most suitable behavior may be determined in advance, or vehicle controller 7 may store the information about the last selected behavior in storage unit 8, and determine this behavior as the most suitable behavior. Alternatively, vehicle controller 7 may store in storage unit 8 the number of times each behavior has been previously selected, and determine the most frequently selected behavior as the most suitable behavior.

Thereafter, vehicle controller 7 displays "deceleration" in display region 79c as the first behavior, and displays "acceleration" in display region 79a as the second behavior. Vehicle controller 7 also displays, in display region 79g, the display of "end autonomous driving" indicating that the driving is switched from autonomous driving to manual driving.

With this display control, vehicle controller 7 can notify the driver of the behavior most suitable for the travel environment as the first behavior according to the travel environment.

The information about the first behavior may be disposed on an upper side, the information about the second behavior may be disposed on a lower side, and functions of selecting the first behavior and the second behavior may be assigned to operation buttons 51a and 51c, respectively. Alternatively, the information about the acceleration behavior may be disposed on an upper side, the information about the deceleration behavior may be disposed on a lower side, the information about the behavior of the lane change to the right may be disposed on a right side, the information about the behavior of the lane change to the left may be disposed on a left side, and functions of selecting the acceleration behavior, the deceleration behavior, the behavior of the lane change to the right, and the behavior of the lane change to the left may be assigned to operation buttons 51a, 51c, 51b, and 51d, respectively. Alternatively, these displays may be switchable, and whether priority is placed on action or priority is placed on operation may be displayed separately. In addition, the display size of the first behavior information may be larger, and the display size of the second behavior information may be smaller. It is to be noted that, when behavior information display is arranged corresponding to the behavior in the front-rear direction and left-right direction of the vehicle, the driver is capable of having intuitive recognition and operation.

Next, an example of a travel environment other than the travel environment where there is a merging lane ahead will be described.

Figure 8B:
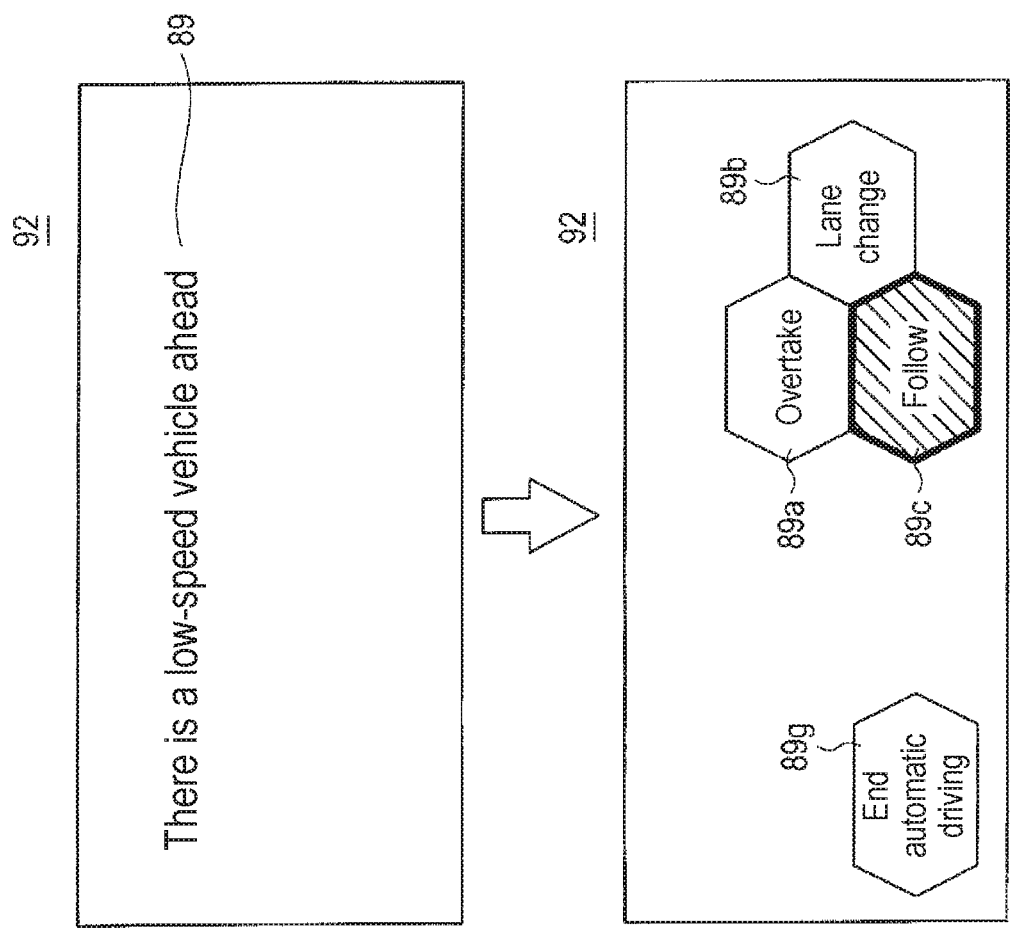
FIG. 8B is a view for describing display control for the third example of a travel environment according to the first exemplary embodiment.
Figure 8A:
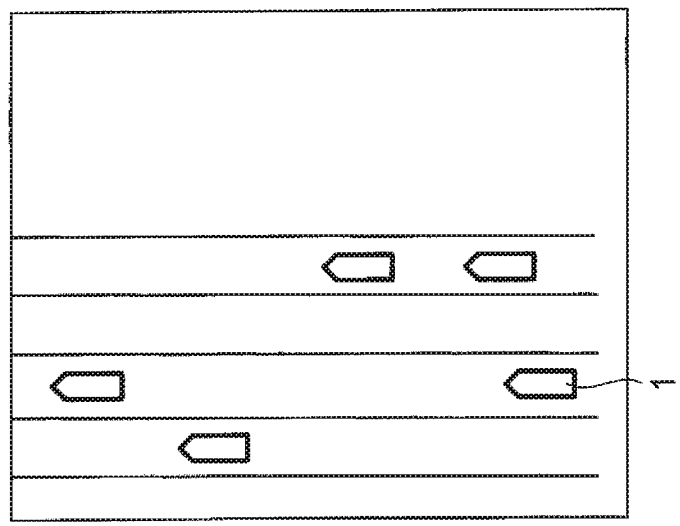
FIG. 8A is a view for describing a third example of a travel environment according to the first exemplary embodiment.

FIG. 8A is a view illustrating a third example of the travel environment, and FIG. 8B is a view illustrating display control for this environment. FIG. 8A is an overhead view illustrating the travel environment of vehicle 1. Specifically, FIG. 8A illustrates the travel environment where a leading vehicle is traveling with a speed lower than the speed of vehicle 1, and a lane change to the adjacent lane is possible.

Vehicle controller 7 determines that the travel environment is the one illustrated in FIG. 8A based on the information about the travel state and the surrounding situation. In this case, vehicle controller 7 causes notification unit 92 to display the information about the determined travel environment as character information 89.

Vehicle controller 7 also reads, as behavior candidates corresponding to the determined travel environment, three behavior candidates which are a travel mode for overtaking the leading vehicle, a travel mode for performing a lane change to the adjacent lane, and a travel mode for decelerating vehicle 1 to follow the leading vehicle, from storage unit 8.

For example, vehicle controller 7 determines that the travel mode for decelerating vehicle 1 to follow the leading vehicle is the most suitable behavior, that is, the first behavior, because the speed of the leading vehicle after deceleration is higher than a predetermined value and is allowable.

In this case, which is the most suitable behavior among the three behavior candidates is determined using a conventional technology for determining the most suitable behavior based on the information about the travel state and the surrounding situation. Alternatively, which is the most suitable behavior may be determined in advance, or vehicle controller 7 may store the information about the last selected behavior in storage unit 8, and determine this behavior as the most suitable behavior. Alternatively, vehicle controller 7 may store in storage unit 8 the number of times each behavior has been previously selected, and determine the most frequently selected behavior as the most suitable behavior.

Vehicle controller 7 also displays character information of "follow" indicating the first behavior in display region 89c in a highlighted manner, and character information items of "overtake" and "lane change" indicating the second behavior in display regions 89a and 89b, respectively, as illustrated in FIG. 8B. Vehicle controller 7 also displays, in display region 89g, the display of "end autonomous driving" indicating that the driving is switched from autonomous driving to manual driving.

The information about the first behavior may be disposed on an upper side, the information about the second behavior may be disposed on a lower side, and functions of selecting the first behavior and the second behavior may be assigned to operation buttons 51a and 51c, respectively. Alternatively, the information about the overtaking behavior may be disposed on an upper side, the information about the following behavior may be disposed on a lower side, the information about the behavior of the lane change to the right may be disposed on a right side, the information about the behavior of the lane change to the left may be disposed on a left side, and functions of selecting the overtaking behavior, the following behavior, the behavior of the lane change to the right, and the behavior of the lane change to the left may be assigned to operation buttons 51a, 51c, 51b, and 51d, respectively. Alternatively, these displays may be switchable, and whether priority is placed on action or priority is placed on operation may be displayed separately. In addition, the display size of the first behavior information may be larger, and the display size of the second behavior information may be smaller.

Figure 9B:
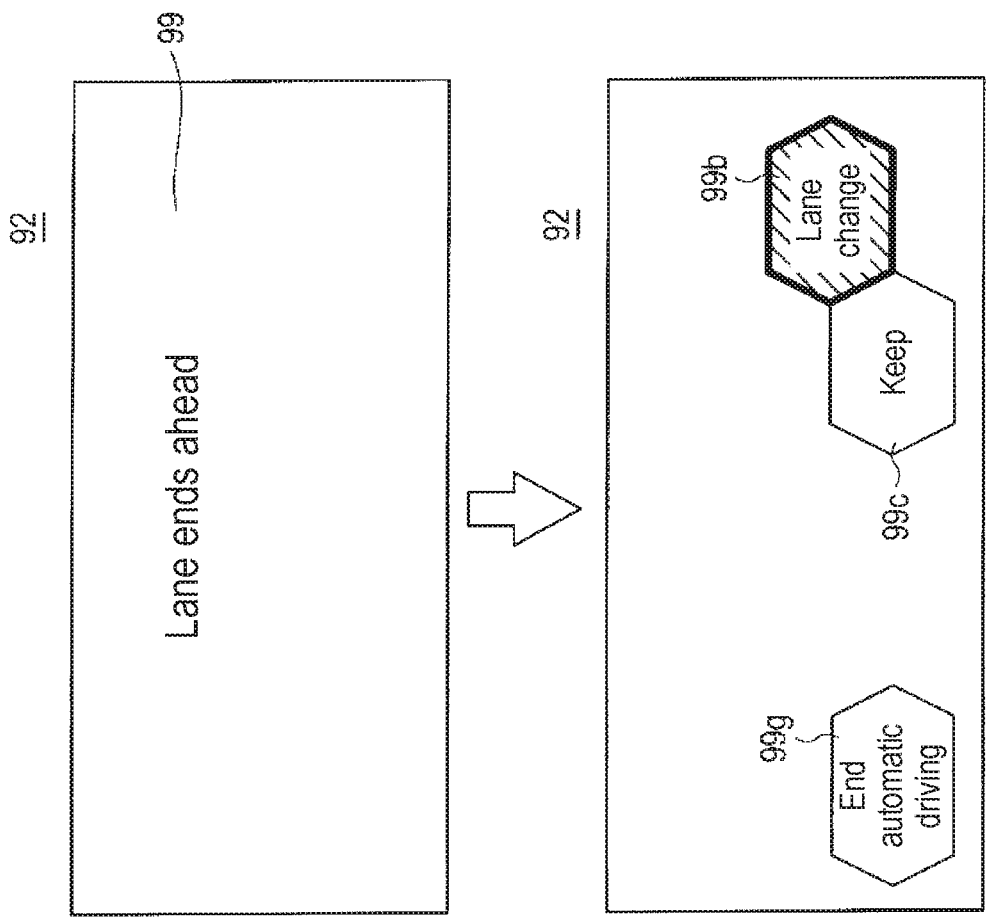
FIG. 9B is a view for describing display control for the fourth example of a travel environment according to the first exemplary embodiment.
Figure 9A:
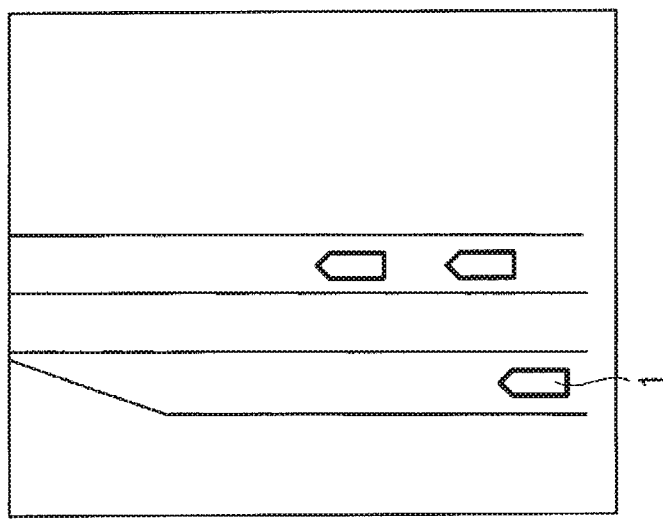
FIG. 9A is a view for describing a fourth example of a travel environment according to the first exemplary embodiment.

FIG. 9A is a view illustrating a fourth example of the travel environment, and FIG. 9B is a view illustrating display control for this environment. FIG. 9A is an overhead view illustrating the travel environment of vehicle 1. Specifically, FIG. 9A illustrates the travel environment where the lane in which vehicle 1 is traveling ends ahead.

Vehicle controller 7 determines that the travel environment is the one illustrated in FIG. 9A based on the information about the travel state and the surrounding situation. In this case, vehicle controller 7 causes notification unit 92 to display the information about the determined travel environment as character information 99.

Vehicle controller 7 also reads, as behavior candidates corresponding to the determined travel environment, two behavior candidates which are a travel mode for performing a lane change to the adjacent lane, and a travel mode for keeping traveling in the current lane, from storage unit 8.

For example, vehicle controller 7 determines that the travel mode for performing a lane change to the adjacent lane is the most suitable behavior, that is, the first behavior, because TTC to the point where the lane ends is shorter than a predetermined value.

In this case, which is the most suitable behavior between the two behavior candidates is determined using a conventional technology for determining the most suitable behavior based on the information about the travel state and the surrounding situation. Alternatively, which is the most suitable behavior may be determined in advance, or vehicle controller 7 may store the information about the last selected behavior in storage unit 8, and determine this behavior as the most suitable behavior. Alternatively, vehicle controller 7 may store in storage unit 8 the number of times each behavior has been previously selected, and determine the most frequently selected behavior as the most suitable behavior.

Vehicle controller 7 also displays character information of "lane change" indicating the first behavior in display region 99*b* in a highlighted manner, and character information of "keep" indicating the second behavior in display region 99*c*, as illustrated in FIG. 9B. Vehicle controller 7 also displays, in display region 99*g*, the display of "end autonomous driving" indicating that the driving is switched from autonomous driving to manual driving.

The information about the first behavior may be disposed on an upper side, the information about the second behavior may be disposed on a lower side, and functions of selecting the first behavior and the second behavior may be assigned to operation buttons 51*a* and 51*c*, respectively; information about a behavior of doing nothing may be disposed on a lower side, the information about the behavior of lane change to the right may be disposed on a right side, the information about the behavior of lane change to the left may be disposed on a left side, and functions of selecting the behavior of doing nothing, the behavior of lane change to the right, and the behavior of lane change to the left may be assigned to operation buttons 51*c*, 51*b*, and 51*d*, respectively; or these displays may be switchable, and whether priority is placed on action or priority is placed on operation may be displayed separately. In addition, the display size of the first behavior information may be larger, and the display size of the second behavior information may be smaller. Notably, due to the configuration in which a different function is assigned to each display region depending on a different travel environment as illustrated in FIGS. 7B, 8B, and 9B, notification of information or operation is enabled with fewer regions.

It has been described above that vehicle controller 7 causes notification unit 92 to provide notification regarding a behavior according to the information about the travel environment and surrounding situation. However, the present invention is not limited thereto. For example, it may be configured such that vehicle controller 7 causes notification unit 92 to provide notification regarding a behavior when the driver performs a predetermined operation.

FIG. 10A is a view illustrating a fifth example of the travel environment, and FIG. 10B is a view illustrating display control for this environment. FIG. 10A is an overhead view illustrating the travel environment of vehicle 1. Specifically, FIG. 10A illustrates the travel environment where vehicle 1 can change lanes to the left and right.

FIG. 10A illustrates the travel environment where, different from the travel environments illustrated in FIGS. 5A to 9A, vehicle 1 can travel in a normal way without requiring a lane change or acceleration and deceleration of the vehicle. In this case, vehicle controller 7 may cause notification unit 92 not to display the information about the travel environment as character information as indicated by display 109 in FIG. 10B.

When the driver depresses any of the operation buttons on operating unit 51 under the above-described condition where character information is not displayed on notification unit 92, vehicle controller 7 reads the behavior candidates in a normal travel from storage unit 8.

Specifically, storage unit 8 stores four behavior candidates which are acceleration of vehicle 1, deceleration of vehicle 1, lane change of vehicle 1 to the right, and lane change of vehicle 1 to the left, in association with the travel environment of normal travel as illustrated in FIG. 10A. Vehicle controller 7 reads these behavior candidates, and causes notification unit 92 to display these behavior candidates in display regions 109*a* to 109*d*, respectively.

In addition, vehicle controller 7 displays the display of "end autonomous driving" indicating that the driving is switched from autonomous driving to manual driving in display region 109*g*, and a display of "cancel" indicating that updating of the behavior is canceled in display region 109*e* in a highlighted manner.

The present exemplary embodiment described above can effectively notify the driver of the behavior candidates to be executed next, thereby enabling the driver to select more preferable behavior.

Note that the driver may directly perform a manual operation on the steering wheel or the like, instead of selecting the behavior he/she desires to do. Thus, the driver can quickly switch to a manual driving operation according to his/her intention.

In the present exemplary embodiment described above, character information is displayed on notification unit 92. However, the present invention is not limited thereto. For example, information may be displayed using a symbol indicating the behavior for enabling the driver to visually recognize the information. Hereinafter, a display using a symbol for enabling the driver to visually recognize information will be described, using the displays in FIGS. 5B and 7B as one example.

Figure 11:
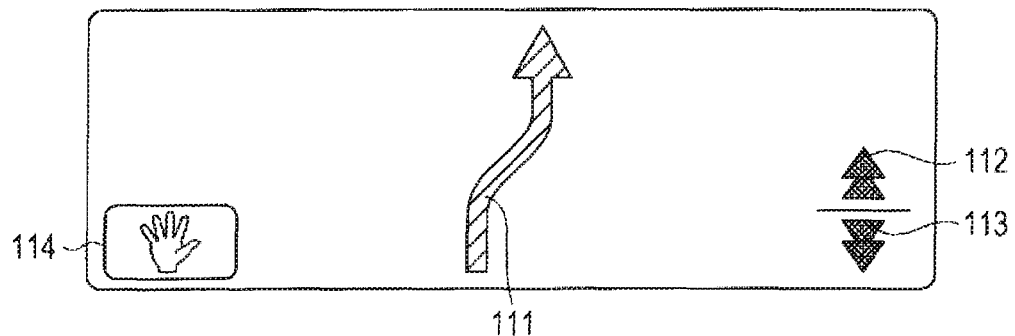
FIG. 11 is a view for describing another display control for the first example of a travel environment illustrated in FIG. 5A.

FIG. 11 is a view for describing another display control for the first example of the travel environment illustrated in FIG. 5A. In this example, the above-described first behavior is a lane change of vehicle 1 to the right, and the second behavior is acceleration of vehicle 1 and deceleration of vehicle 1.

In this case, symbol 111 indicating "lane change" which is the first behavior is displayed bigger on the center, and symbol 112 indicating "acceleration of vehicle 1" and symbol 113 indicating "deceleration of vehicle 1" which are the second behavior are displayed smaller on the right. In addition, symbol 114 indicating ending of autonomous driving is displayed smaller on the left.

If an instruction for changing the behavior of vehicle 1 is not received from the driver, the lane change is performed.

Figure 12A:
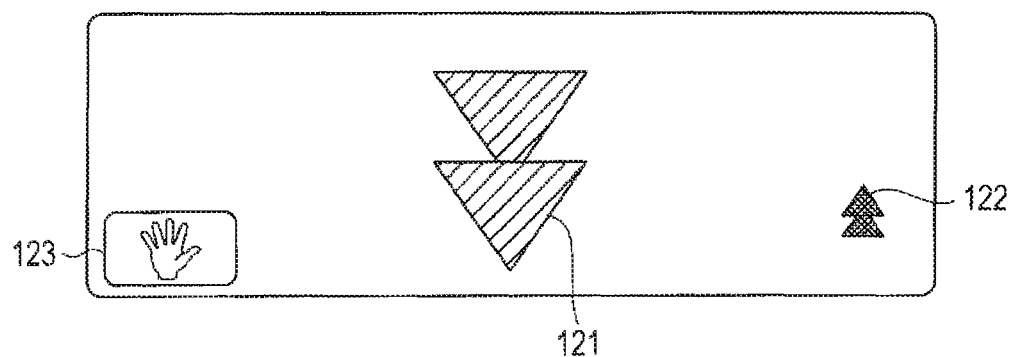
FIG. 12A is a view for describing another display control for the second example of a travel environment illustrated in FIG. 7A.
Figure 12B:
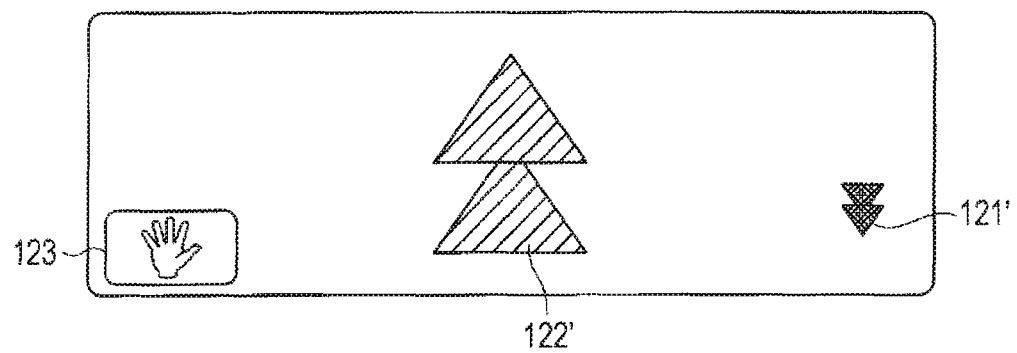
FIG. 12B is a view for describing another display control for the second example of a travel environment illustrated in FIG. 7A.

FIGS. 12A and 12B are views for describing another display control for the second example of the travel environment illustrated in FIG. 7A. In this example, different from the first example, a lane change is impossible because a nearby vehicle is traveling on the right of vehicle 1. Therefore, "deceleration of vehicle 1" is set as the first behavior, and "acceleration of vehicle 1" is set as the second behavior, for example.

In this case, as illustrated in FIG. 12A, symbol 121 indicating "deceleration of vehicle 1" which is the first behavior is displayed bigger on the center, and symbol 122 indicating "acceleration of vehicle 1" which is the second behavior is displayed smaller on the right. In addition, symbol 123 indicating ending of autonomous driving is displayed smaller on the left.

It is supposed here that operating unit 51 receives an operation for selecting "acceleration of vehicle 1" from the driver. In this case, as illustrated in FIG. 12B, symbol 122' indicating "acceleration of vehicle 1" which is the first behavior is displayed bigger on the center, and symbol 121' indicating "deceleration of vehicle 1" which is the second behavior is displayed smaller on the right.

The present exemplary embodiment described above can effectively notify the driver of the behavior candidates to be executed next, thereby enabling the driver to select more preferable behavior. On the other hand, the driver can recognize the behaviors to be executed by vehicle 1 or other selectable behaviors, thereby being capable of continuing autonomous driving with a sense of security. Alternatively, the driver can smoothly issue an instruction to the vehicle.

In addition, according to the present exemplary embodiment, the options notified by the notification unit, that is, the second behavior, can be variable according to the travel environment.

Second Exemplary Embodiment

The first exemplary embodiment has described the configuration in which an operation according to the display on notification unit 92 is performed using operating unit 51 provided on steering wheel 5. The present exemplary embodiment describes a configuration in which a touch panel is provided in place of operating unit 51 provided on steering wheel 5.

Figure 13:
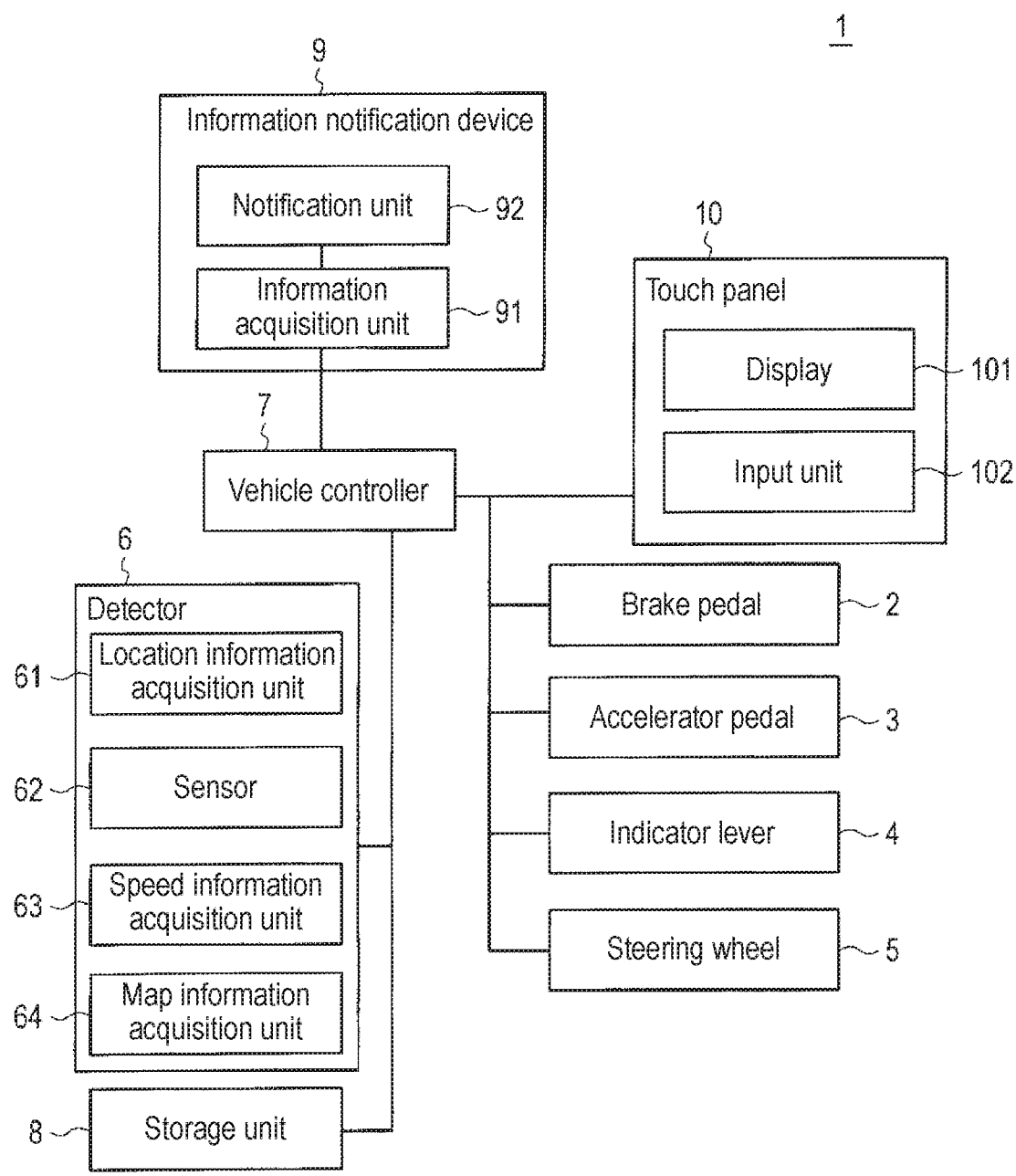
FIG. 13 is a block diagram illustrating a configuration of a main part of a vehicle including an information notification device according to a second exemplary embodiment of the present invention.

FIG. 13 is a block diagram illustrating a configuration of a main part of vehicle 1 including an information notification device according to the second exemplary embodiment of the present invention. It should be noted that constituent elements in FIG. 13 which are substantially identical to the constituent elements in FIG. 1 are denoted by the identical reference numerals used in FIG. 1 and will not be described in detail. Vehicle 1 illustrated in FIG. 13 is provided with touch panel 10 in place of operating unit 51 on steering wheel 5.

Touch panel 10 is a device including a liquid crystal panel or the like and capable of displaying and inputting information, and is connected to vehicle controller 7. Touch panel 10 includes display 101 that displays information based on control by vehicle controller 7, and input unit 102 that receives an operation from a driver or the like and outputs the received operation to vehicle controller 7.

Next, display control for touch panel 10 will be described. Herein, the display control will be described for the case where vehicle 1 is traveling on the center lane of three lanes, and vehicle 1 is capable of changing the lane to the right lane or the left lane.

Figure 14B:
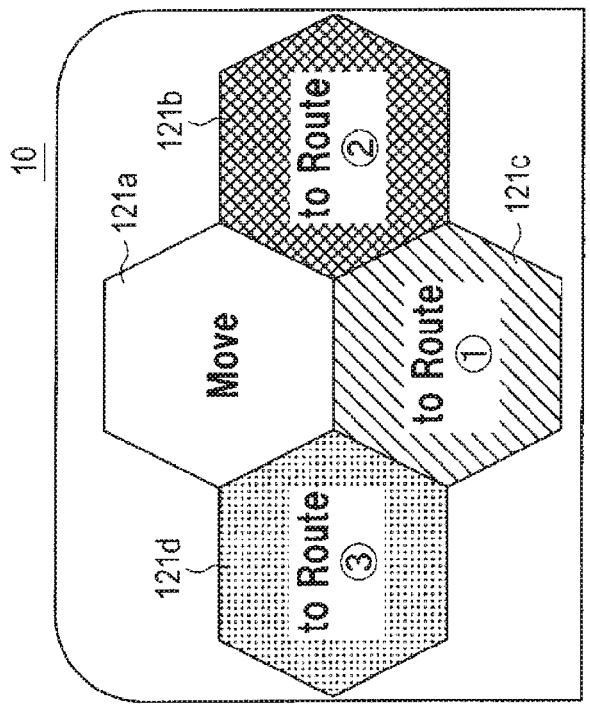
FIG. 14B is a view for describing a display on the touch panel according to the second exemplary embodiment.
Figure 14C:
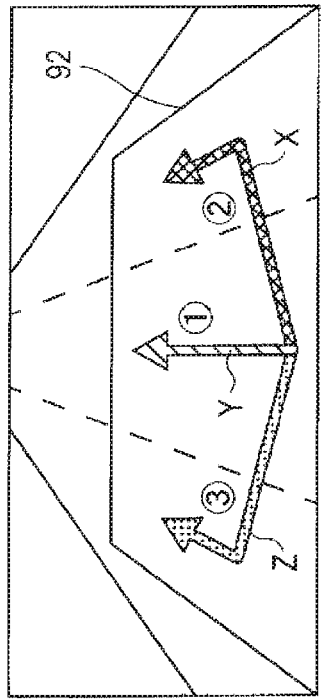
FIG. 14C is a view for describing a display on the touch panel according to the second exemplary embodiment.
Figure 14A:
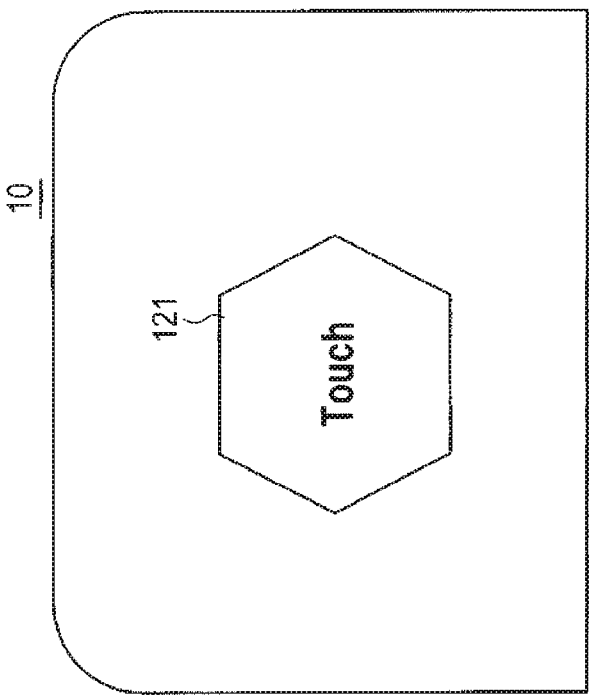
FIG. 14A is a view for describing a display on a touch panel according to the second exemplary embodiment.

FIGS. 14A to 14C are views for describing the display on touch panel 10 according to the second exemplary embodiment. FIG. 14A illustrates an initial display on display 101 of touch panel 10. When determining that vehicle 1 is capable of changing the lane to the right lane or the left lane, vehicle controller 7 causes display 101 of touch panel 10 to execute the display illustrated in FIG. 14A. Herein, the display of "Touch" in display region 121 indicates that touch panel 10 is in a mode where a touch operation performed by the driver is acceptable.

When the driver performs the touch operation for touching display region 121 with the display illustrated in FIG. 14A being displayed therein, input unit 102 receives this operation, and outputs to vehicle controller 7 information indicating that this operation is performed. When receiving this information, vehicle controller 7 causes display 101 to display the display illustrated in FIG. 14B, and causes notification unit 92 to display the display illustrated in FIG. 14C.

In FIG. 14B, display region 121a having therein a display of "Move" which is an operation for instructing vehicle 1 to move is illustrated. In addition, display regions 121b to 121d indicating that it is possible for vehicle 1 to travel in each of three lanes are illustrated in FIG. 14B. Note that display regions 121b to 121d respectively correspond to traveling in lanes indicated by arrows X, Y, and Z in FIG. 14C.

In addition, each display region in FIG. 14B and the corresponding arrow in FIG. 14C have the same manner (for example, color, arrangement, and the like). This makes the display easy to be understood by the driver.

In addition, the lanes indicated by arrows X, Y, and Z may be displayed by varying thickness or the like such that the behavior to be executed by the vehicle determined by the vehicle controller and other behaviors selectable by the driver can be distinguished.

The driver touches the display region corresponding to the lane he/she wishes to travel, from among display regions 121b to 121d, to select the behavior of vehicle 1. In this case, input unit 102 receives the behavior selecting operation performed by the driver, and outputs information about the selected behavior to vehicle controller 7. Then, vehicle controller 7 controls vehicle 1 such that vehicle 1 executes the selected behavior. Thus, vehicle 1 travels in the lane the driver wishes to travel.

It is to be noted that the driver may swipe touch panel 10 instead of touching touch panel 10. For example, when the driver wishes to change the lane to the lane indicated by arrow X in FIG. 14C in the example in FIG. 14C, the driver swipes right on touch panel 10.

In this case, input unit 102 receives the swipe operation, and outputs the information indicating the swipe operation content to vehicle controller 7. Then, vehicle controller 7 controls vehicle 1 such that vehicle 1 executes the selected behavior of changing the lane to the lane indicated by arrow X.

In addition, when display region 121a displaying "Move" which indicates the operation for instructing vehicle 1 to move is displayed, the driver may utter "behavior selection" in a voice. Thus, the driver can operate by seeing only the display on the HUD without seeing the touch panel at his/her hand.

In addition, when the driver performs the touch operation or swipe operation, the display manner of the lane corresponding to the selected display region of the touch panel may be changed such that the driver can confirm which lane he/she is about to select before the selection. For example, the moment the driver touches display region b, the thickness of lane X may be enlarged, and if the driver immediately releases his/her hand, lane X may not be selected and the thickness of lane X may be returned to the original size; and the moment the driver then touches display region 121c, the thickness of lane Y may be enlarged, and if the driver keeps this state for a while, lane Y may be selected and may flicker to indicate that lane Y is determined. According to this configuration, the driver can perform the selecting operation or determining operation without viewing his/her hands.

Notably, as in the first exemplary embodiment, vehicle control functions such as acceleration, deceleration, overtake, and keep may be assigned to display regions according to the travel environment.

According to the present exemplary embodiment described above, the driver can perform an intuitive operation due to the touch panel being provided in place of the operating unit. Furthermore, because the number, shape, color, and the like of display regions in the touch panel receiving an operation can freely be changed, the flexibility of a user interface is improved.

Third Exemplary Embodiment

The first exemplary embodiment has described the case where the first behavior and the second behavior are simultaneously displayed. The present exemplary embodiment describes a configuration in which a first behavior is displayed first on notification unit 92, and when a driver's operation is received, a second behavior is displayed.

The configuration of the present exemplary embodiment is achieved such that a grip sensor for detecting whether or not the driver holds steering wheel 5 is further included in operating unit 51 in the configuration, illustrated in FIG. 1, described in the first exemplary embodiment.

FIGS. 15A to 15D are each a view for describing a display on notification unit 92 according to the third exemplary embodiment of the present invention. FIGS. 15A to 15D each illustrate an example of a display in a travel environment, similar to that illustrated in FIG. 8A, where a vehicle traveling ahead of vehicle 1 in the same lane is traveling with a speed lower than the speed of vehicle 1, and a lane change to the adjacent lane is possible.

Figure 15A:
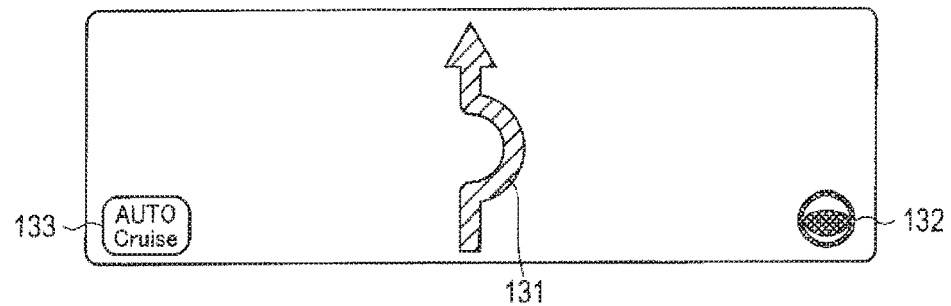
FIG. 15A is a view for describing a display on a notification unit according to a third exemplary embodiment of the present invention.

When determining that the travel environment is the one illustrated in FIG. 8A, vehicle controller 7 firstly causes notification unit 92 to execute the display illustrated in FIG. 15A.

In FIG. 15A, symbol 131 indicating "overtake" which is the first behavior among behavior candidates to be executed after a lapse of a first predetermined time is illustrated in a first manner (for example, in a first color).

When a second predetermined time has elapsed after vehicle controller 7 causes notification unit 92 to execute the display illustrated in FIG. 15A, vehicle controller 7 causes notification unit 92 to display symbol 131 in a second manner different from the first manner (for example, in a second color different from the first color) from the first manner. Herein, the second predetermined time is similar to the second predetermined time described in the first exemplary embodiment.

Specifically, while symbol 131 is displayed in the first manner, the driver is able to select the second behavior, but when symbol 131 is changed to the second manner, it becomes impossible for the driver to select the second behavior.

FIG. 15A also illustrates steering-wheel-shaped symbol 132 indicating that the second behavior is selectable. As the driver holds steering wheel 5 while symbol 132 is displayed, the second behavior is displayed. Symbol 132 is a display indicating that the second behavior is selectable. However, such configuration may be applied that the driver is notified of the second behavior being selectable by symbol 131 being displayed in the first manner. In this case, symbol 132 may not be displayed.

FIG. 15A also illustrates symbol 133 indicating that vehicle 1 is now in an autonomous driving mode. Symbol 133 is an auxiliary display notifying the driver that vehicle 1 is now traveling in the autonomous driving mode. However, symbol 133 may not be displayed.

When the driver holds steering wheel 5 in response to the display in FIG. 15A, the grip sensor detects the holding, and outputs information about the detection result to vehicle controller 7. In this case, vehicle controller 7 causes notification unit 92 to execute the display illustrated in FIG. 15B.

Figure 15B:
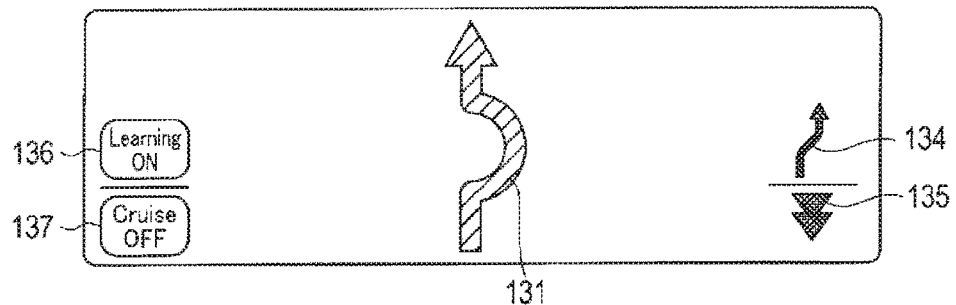
FIG. 15B is a view for describing a display on the notification unit according to the third exemplary embodiment.

In FIG. 15B, symbol 131 indicating "overtake" which is the first behavior is illustrated in the first manner (for example, in the first color) as in FIG. 15A. In addition, symbol 134 indicating "lane change" which is the second behavior and symbol 135 indicating "deceleration" which is the second behavior are also illustrated.

The driver performs changing from the first behavior to the second behavior by operating operating unit 51 on steering wheel 5. For example, the driver updates the behavior to "lane change" (symbol 134) or "deceleration" (symbol 135) by pressing operation button 51a or operation button 51c (see FIG. 2C) on operating unit 51.

Further, symbol 136 indicating that vehicle controller 7 is learning the behavior of vehicle 1 is illustrated in FIG. 15B. While symbol 136 is displayed, vehicle controller 7 learns the behavior selected by the driver. Symbol 136 may not be displayed. Further, the learning may always be conducted.

Specifically, vehicle controller 7 stores the behavior selected by the driver into storage unit 8, and when vehicle 1 encounters again the similar travel environment, vehicle controller 7 causes notification unit 92 to display the stored behavior as the first behavior. Alternatively, vehicle controller 7 may store, in storage unit 8, the number of times each behavior has been previously selected, and cause notification unit 92 to display the most frequently selected behavior as the first behavior.

In FIG. 15B, symbol 137 indicating that vehicle 1 is not in the autonomous driving mode is also illustrated. When symbol 137 is displayed, vehicle controller 7 waits until the behavior to be executed after a lapse of the first predetermined time is selected by the driver.

Figure 15C:
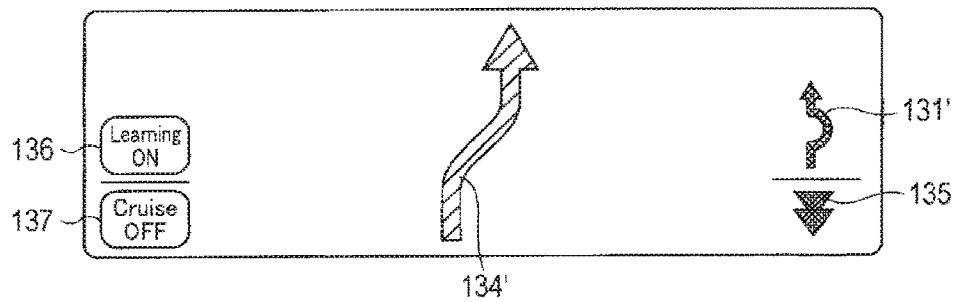
FIG. 15C is a view for describing a display on the notification unit according to the third exemplary embodiment.

When the driver presses operation button 51a on operating unit 51 in response to the display illustrated in FIG. 15B to select "lane change", vehicle controller 7 receives the information about the selecting operation, and causes notification unit 92 to execute the display illustrated in FIG. 15C.

In FIG. 15C, symbol 134' indicating "lane change" is illustrated in the first manner. When receiving the information about the operation for selecting "lane change", vehicle controller 7 determines that the selected behavior is the behavior that is to be executed next, and causes notification unit 92 to display symbol 134' indicating "lane change" in the first manner.

Further, symbol 131 which has been displayed as the first behavior in FIG. 15B is switched to symbol 134, and displayed as symbol 131' in FIG. 15C.

When the driver presses twice in succession any one of the operation buttons in response to the display illustrated in FIG. 15C, the selecting operation previously conducted by the driver may be canceled. In this case, vehicle controller 7 receives the information about the operation for pressing any one of the operation buttons twice in succession, and causes notification unit 92 to execute changing from the display illustrated in FIG. 15C to the display illustrated in FIG. 15B.

In a period from the time when vehicle controller 7 causes notification unit 92 to execute the display illustrated in FIG. 15A before the second predetermined time has elapsed, vehicle controller 7 changes the display on notification unit 92 to the display illustrated in FIG. 15B and the display illustrated in FIG. 15C based on the operation performed by the driver. Then, vehicle controller 7 causes notification unit 92 to execute the display illustrated in FIG. 15D when the second predetermined time has elapsed after vehicle controller 7 causes notification unit 92 to execute the display illustrated in FIG. 15A.

Figure 15D:
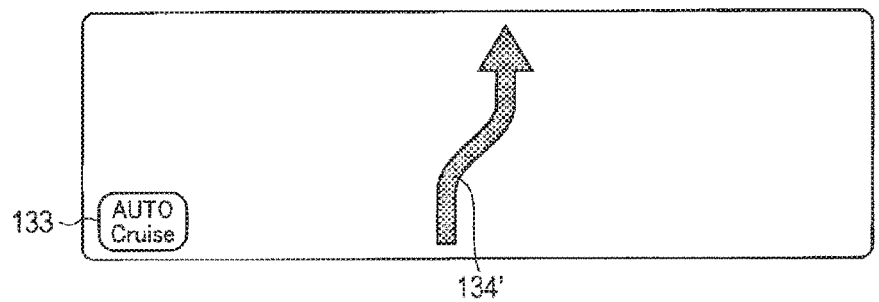
FIG. 15D is a view for describing a display on the notification unit according to the third exemplary embodiment.

Notably, when acquiring the information indicating that the driver releases his/her hand from steering wheel 5 from the grip sensor, vehicle controller 7 may cause notification unit 92 to display the display illustrated in FIG. 15D before the second predetermined time has elapsed.

In this case, FIG. 15D illustrates the state where symbol 134' indicating "lane change" selected by the driver as the next behavior is displayed in the second manner, and symbol 133 indicating that vehicle 1 is traveling in the autonomous driving mode is displayed again.

According to the present exemplary embodiment described above, vehicle controller 7 changes the display on notification unit 92 such that the driver can confirm the other behavior candidates, only when the driver intends to update the behavior to be executed next. According to this configuration, the display visually confirmed by the driver can be reduced, whereby the burden on the driver can be reduced.

Fourth Exemplary Embodiment

The above-mentioned exemplary embodiments have described some of the methods for determining which is the most suitable behavior from among a plurality of behavior candidates executable by vehicle 1. The present exemplary embodiment describes a case where a driver model constructed in advance by learning is used as the method for determining the most suitable behavior.

The method for constructing the driver model will now be described. The driver model is constructed in such a way that the tendency of an operation performed by a driver for each travel environment is modeled based on information relating to the frequency of each operation. Travel histories of a plurality of drivers are aggregated, and the driver model is constructed from the aggregated travel histories.

The travel history of each driver is formed such that the frequency of a behavior actually selected by the driver from among behavior candidates corresponding to each travel environment is aggregated for each behavior candidate, for example.

FIG. 16 is a diagram illustrating one example of the travel history. FIG. 16 illustrates that driver x selects the behavior candidate of "deceleration" three times, "acceleration" once, and "lane change" five times, in a travel environment of "approaching to a merging lane". FIG. 16 also illustrates that driver X selects the behavior candidate of "follow" twice, "overtake" twice, and "lane change" once, in a travel environment where "there is a low-speed vehicle ahead". The same is applied to driver y.

The travel history of the driver may be formed by aggregating the behaviors selected during autonomous driving, or by aggregating the behaviors actually executed by the driver during manual driving. Thus, a travel history according to a driving state, i.e., autonomous driving or manual driving, can be collected.

The driver model is classified into a clustering type constructed by clustering travel histories of a plurality of drivers, and an individually-adapted type in which a driver model of a specific driver (for example, driver x) is constructed from a plurality of travel histories similar to the travel history of driver x.

Firstly, the clustering type will be described. The clustering-type driver model is constructed in such a way that travel histories of a plurality of drivers illustrated in FIG. 16 are aggregated in advance. Then, a plurality of drivers having a high degree of similarity between the travel histories, that is, a plurality of drivers having a similar driving operation tendency, is grouped to construct a driver model.

FIG. 17 is a diagram illustrating a method for constructing the clustering-type driver model. FIG. 17 illustrates the travel histories of drivers a to f in tabular form. FIG. 17 illustrates that, from the travel histories of drivers a to f, model A is constructed based on the travel histories of drivers a to c, and model B is constructed based on the travel histories of drivers d to f.

The degree of similarity between travel histories may be obtained such that: for example, frequencies (numerical values) in the travel histories of driver a and driver b are treated as frequency distributions; a correlation value in the respective frequency distributions is calculated; and the calculated correlation value is set as the degree of similarity. In this case, when the correlation value calculated from the travel histories of driver a and driver b is higher than a predetermined value, the travel histories of driver a and driver b are grouped into a single group.

Note that the calculation of the degree of similarity is not limited thereto. For example, the degree of similarity may be calculated based on the same number of the behavior having the highest frequency in the travel history of driver a and the travel history of driver b.

Then, the clustering-type driver model is constructed by calculating the average of the frequencies in the travel histories of the drivers in each group, for example.

FIG. 18 is a diagram illustrating one example of the constructed clustering-type driver model. The average frequency of the travel history in each group is derived by calculating the average of the frequencies in the travel histories of the drivers in each group illustrated in FIG. 17. In this way, the clustering-type driver model is constructed using the average frequency for the behavior determined for each travel environment.

It is to be noted that the driver model may be constructed using only the behavior having the highest frequency from among the calculated average frequencies. FIG. 19 is a diagram illustrating another example of the constructed clustering-type driver model. As illustrated in FIG. 19, the most frequent behavior is selected for each travel environment, and the driver model is constructed using the selected behavior.

Now, a method for using the constructed clustering-type driver model will be described with examples.

The driver model illustrated in FIG. 18 is stored in advance in storage unit 8 of vehicle 1. In addition, vehicle controller 7 stores, in storage unit 8, the travel history of driver y in previous driving. Notably, driver y is detected by a camera or the like (not illustrated) installed in the vehicle interior.

Then, vehicle controller 7 calculates the degree of similarity between the travel history of driver y and the travel history of each model in the driver model to determine which model is the most suitable for driver y. For example, regarding the travel history of driver y illustrated in FIG. 16 and the driver model illustrated in FIG. 18, vehicle controller 7 determines that model B is the most suitable for driver y.

Vehicle controller 7 determines that, in actual autonomous travel, the behavior having the highest frequency is the behavior most suitable for driver y, that is, the first behavior, in each travel environment in model B.

In this way, the notification regarding the behavior more suitable for the driver can be provided by constructing in advance the driver model from the travel histories of a plurality of drivers.

For example, even when the frequency of the behavior for the travel environment of "there is a low-speed vehicle ahead" is zero in the travel history of driver y as illustrated in FIG. 16, that is, even when the driver has never selected the behavior of "follow", "overtake", and "lane change" in the travel environment of "there is a low-speed vehicle ahead", vehicle controller 7 can determine the behavior of "follow" as the first behavior in the travel environment of "there is a low-speed vehicle ahead" based on model B illustrated in FIG. 18.

Next, the individually-adapted type will be described. The individually-adapted-type driver model is constructed in such a way that travel histories of a plurality of drivers illustrated in FIG. 16 are aggregated in advance, as in the method for constructing the clustering-type. The different point from the clustering-type is such that the driver model is constructed for each driver. Hereinafter, an example of constructing the driver model for driver y will be described.

Firstly, travel histories of a plurality of drivers having a high degree of similarity with the travel history of driver y are extracted from the aggregated travel histories of a plurality of drivers. Then, the driver model for driver y is constructed from the extracted travel histories of a plurality of drivers.

FIG. 20 is a diagram illustrating a method for constructing the individually-adapted-type driver model. As in FIG. 17, FIG. 20 illustrates the travel histories of drivers a to f in tabular form. FIG. 20 also illustrates that the driver model for driver y is constructed from the travel histories of drivers c to e having a high degree of similarity with the travel history of driver y illustrated in FIG. 16.

The individually-adapted-type driver model is constructed by calculating the average of the frequencies in the extracted travel histories of the drivers.

FIG. 21 is a diagram illustrating one example of the constructed individually-adapted-type driver model. In the travel history of driver y illustrated in FIG. 16 and the travel histories of drivers c to e illustrated in FIG. 20, the average frequency of each behavior is derived for each travel environment. In this way, the individually-adapted-type driver model for driver y is constructed using the average frequency for the behavior corresponding to each travel environment.

Now, a method for using the constructed individually-adapted-type driver model will be described with examples.

The driver model for driver y illustrated in FIG. 21 is stored in advance in storage unit 8 of vehicle 1. In addition, vehicle controller 7 stores, in storage unit 8, the travel history of driver y in previous driving. Notably, driver y is detected by a camera or the like (not illustrated) installed in the vehicle interior.

Vehicle controller 7 then determines that, in actual autonomous travel, the behavior having the highest frequency is the behavior most suitable for driver y, that is, the first behavior, in each travel environment in the driver model for driver y.

In this way, the notification regarding the behavior more suitable for the driver can be provided by constructing in advance the driver model for each driver from the travel histories of a plurality of drivers.

For example, even when the frequency of the behavior for the travel environment of "there is a low-speed vehicle ahead" is zero in the travel history of driver y as illustrated in FIG. 16, that is, even when the driver has never selected the behavior of "follow", "overtake", and "lane change" in the travel environment of "there is a low-speed vehicle ahead", vehicle controller 7 can determine the behavior of "lane change" as the first behavior in the travel environment of "there is a low-speed vehicle ahead" based on the driver model illustrated in FIG. 21.

A description will next be given of a case where driving characteristics of a driver (habit in driving) are acquired, and autonomous driving according to the taste of the driver is performed. In general, the actual action (for example, the level of acceleration or deceleration, or an operation amount of a steering wheel) for one behavior (for example, lane change) differs for each driver. Therefore, if autonomous driving according to the taste of the driver is enabled, more comfortable driving for the driver can be implemented.

Notably, while the case where the driving characteristics of the driver are acquired during manual driving, and the acquired driving characteristics are reflected in autonomous driving will be described below, the present invention is not limited to this case.

Vehicle controller 7 extracts a characteristic amount indicating the driving characteristics of the driver based on the content of an operation performed by the driver for each unit in vehicle 1, and stores the acquired amount in storage unit 8. Herein, examples of the characteristic amount include a characteristic amount pertaining to a speed, a characteristic amount pertaining to steering, a characteristic amount pertaining to an operation timing, a characteristic amount pertaining to vehicle exterior sensing, and a characteristic amount pertaining to vehicle interior sensing.

The characteristic amount pertaining to a speed is the speed, acceleration, deceleration, or the like of the vehicle, for example, and these characteristic amounts are acquired from a speed sensor or the like mounted to the vehicle.

The characteristic amount pertaining to steering includes a steering angle, angular velocity, angular acceleration, and the like of the steering, for example, and these characteristic amounts are acquired from steering wheel 5.

The characteristic amount pertaining to an operation timing includes an operation timing of the brake, accelerator, indicator lever, steering wheel, and the like, for example, and these characteristic amounts are acquired respectively from brake pedal 2, accelerator pedal 3, indicator lever 4, and steering wheel 5.

The characteristic amount pertaining to vehicle external sensing includes the distance between vehicle 1 and a vehicle present in front of, at the side of, or at the back of vehicle 1, for example, and these characteristic amounts are acquired from sensor 62 or the like.

The characteristic amount pertaining to vehicle interior sensing includes personal identification information indicating who the driver is and who the fellow passenger is, for example, and these characteristic amounts are acquired from a camera or the like installed in the vehicle interior.

For example, when the driver manually performs a lane change, vehicle controller 7 detects that the driver manually performs the lane change. The detection is performed by analyzing operation time-series data which is acquired from controller area network (CAN) information by establishing rules on operation time-series data pattern for a lane change in advance. Upon detection, vehicle controller 7 acquires the characteristic amount. Vehicle controller 7 stores characteristic amounts in storage unit 8 for each driver, and constructs a driving characteristic model.

Note that vehicle controller 7 may construct the driver model based on the characteristic amount for each driver. Specifically, vehicle controller 7 extracts a characteristic amount pertaining to a speed, a characteristic amount pertaining to steering, a characteristic amount pertaining to an operation timing, a characteristic amount pertaining to vehicle exterior sensing, and a characteristic amount pertaining to vehicle interior sensing, and stores the extracted characteristic amounts into storage unit 8. Then, vehicle controller 7 may construct, based on the characteristic amounts stored in storage unit 8, a driver model in which the operation tendency of the driver for each travel environment and information about the frequency of each operation are associated with each other.

FIG. 22 is a diagram for describing one example of a driving characteristic model. FIG. 22 illustrates the characteristic amounts for each driver in tabular form. FIG. 22 also illustrates the number of times each driver has previously selected each behavior. Although FIG. 22 illustrates only some of the characteristic amounts described above, any of or all of the characteristic amounts described above may be illustrated.

The characteristic amounts illustrated in FIG. 22 will be described in detail. Numerical values in terms of the speed represent the actual speed in stages. Numerical values in terms of the steering wheel, the brake, and the accelerator represent operation amounts in stages. These numerical values are obtained by calculating the averages of the speed and the operation amounts for the steering wheel, the brake, and the accelerator during a predetermined previous time period, and by showing the averages in stages.

For example, when driver x performs a lane change without having a fellow passenger in FIG. 22, the speed level is 8, and the operation amount levels for the steering wheel, the brake, and the accelerator are respectively 4, 6, and 8.

While in autonomous driving, vehicle controller 7 selects, from the driving characteristic models in FIG. 22, the driving characteristic model corresponding to the driver, behavior, and fellow passenger, according to who the driver is, what behavior is executed, and who the fellow passenger is.

Then, vehicle controller 7 causes vehicle 1 to travel with the speed corresponding to the selected driving characteristic model, and controls vehicle 1 in combination of the operation amounts and operation timings for the steering wheel, the brake, and the accelerator. Thus, autonomous driving according to the taste of the driver can be implemented. Note that the notification regarding the information about the driving characteristic model illustrated in FIG. 22 can be provided by notification unit 92.

FIGS. 23A to 23D are each a view for describing a display on notification unit 92 according to the fourth exemplary embodiment of the present invention. FIGS. 23A to 23D are each a view illustrating a display corresponding to the first example of the travel environment illustrated in FIG. 5A.

Figure 23A:
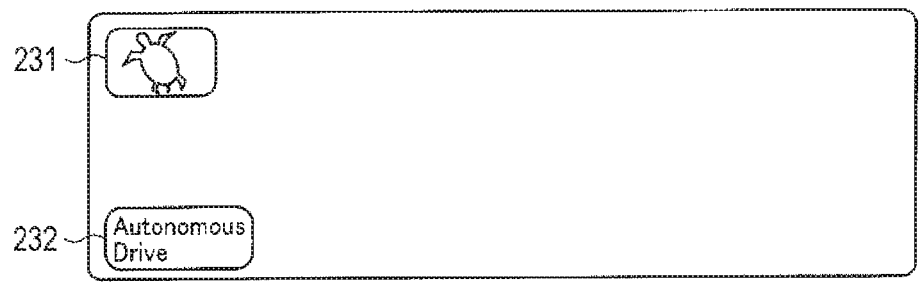
FIG. 23A is a view for describing a display on the notification unit according to the fourth exemplary embodiment.

FIG. 23A illustrates a display on notification unit 92 when vehicle 1 performs normal travel without requiring a lane change or acceleration/deceleration of the vehicle. In FIG. 23A, symbol 231 indicating that the driver has a driving characteristic of "frequently decelerating" and symbol 232 indicating that autonomous driving is now conducted are illustrated.

Vehicle controller 7 determines the driving characteristic of the driver based on the number of times the driver has previously selected each behavior included in the driving characteristic model illustrated in FIG. 22, for example. In this case, vehicle controller 7 causes notification unit 92 to display a display including symbol 231 as illustrated in FIGS. 23A to 23D for the driver who frequently "decelerates" (that is, the driver who frequently selects the behavior of "deceleration") based on the driving characteristic, for example.

Figure 23B:
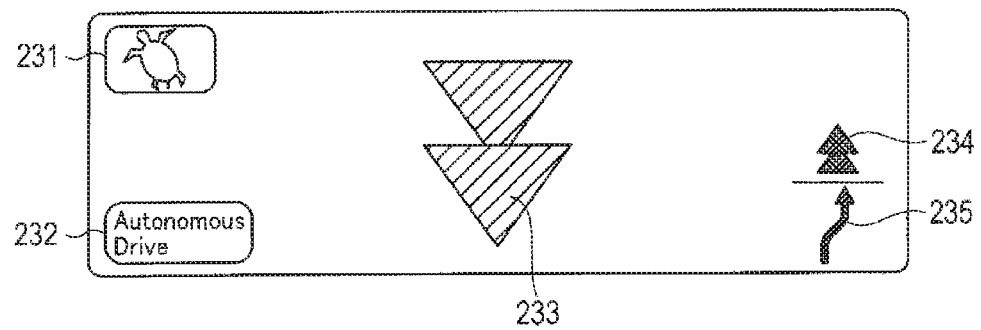
FIG. 23B is a view for describing a display on the notification unit according to the fourth exemplary embodiment.

When determining that the travel environment is the one in the first example illustrated in FIG. 5A, vehicle controller 7 determines that the first behavior is "deceleration" based on the driver's driving characteristic of "frequently decelerating", and causes notification unit 92 to execute the display in FIG. 23B.

In FIG. 23B, symbol 233 indicating "deceleration" which is the first behavior is illustrated in the first manner (for example, in the first color). In addition, symbol 234 indicating "acceleration" which is the second behavior and symbol 235 indicating "lane change" which is the second behavior are illustrated.

Figure 23C:
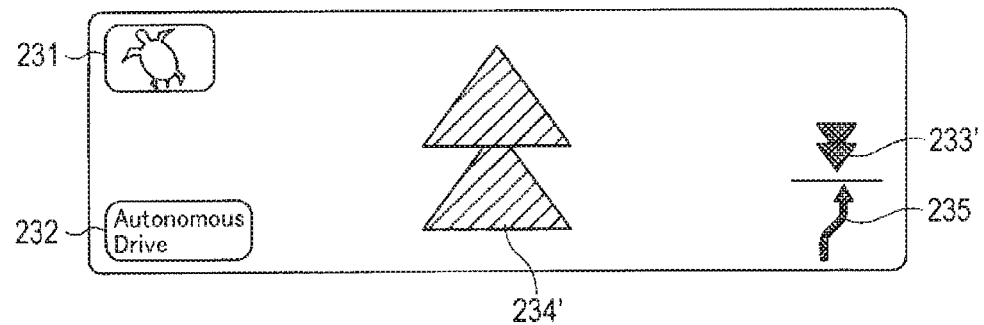
FIG. 23C is a view for describing a display on the notification unit according to the fourth exemplary embodiment.

When the driver changes the behavior to the behavior of "acceleration" by the operation described in the first exemplary embodiment, vehicle controller 7 causes notification unit 92 to execute the display in FIG. 23C.

In FIG. 23C, symbol 234' indicating "acceleration" which is the selected behavior is illustrated in the first manner. Further, symbol 233 which has been displayed as the first behavior in FIG. 23B is switched to symbol 234, and displayed as symbol 233'.

Figure 23D:
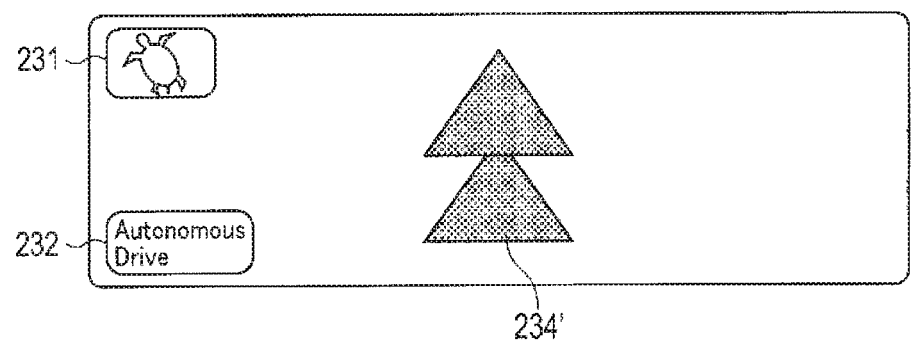
FIG. 23D is a view for describing a display on the notification unit according to the fourth exemplary embodiment.
Figure 24A:
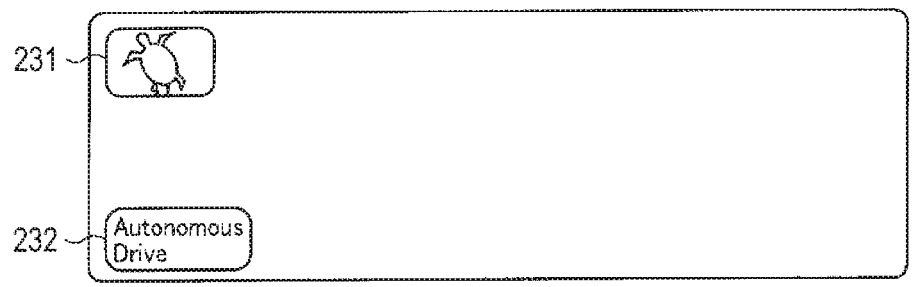
FIG. 24A is a view for describing a display on the notification unit according to the fourth exemplary embodiment.
Figure 24B:
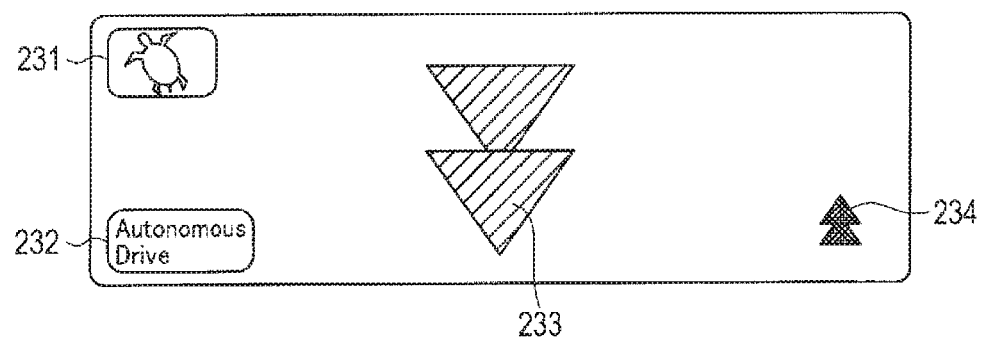
FIG. 24B is a view for describing a display on the notification unit according to the fourth exemplary embodiment.
Figure 24C:
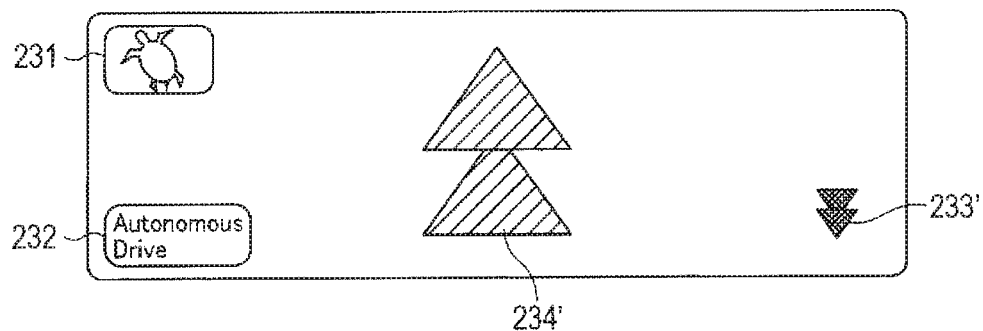
FIG. 24C is a view for describing a display on the notification unit according to the fourth exemplary embodiment.
Figure 24D:
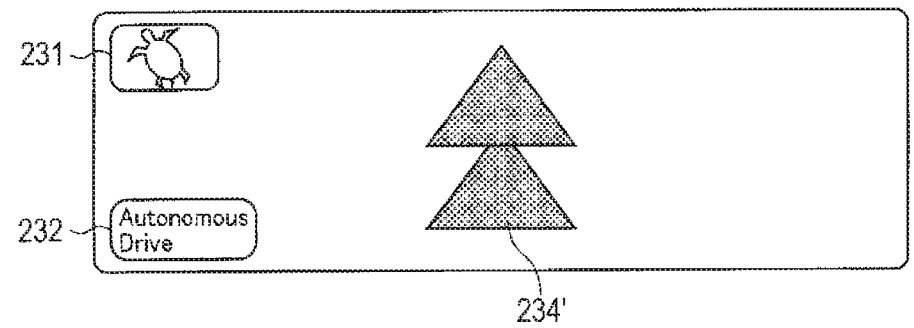
FIG. 24D is a view for describing a display on the notification unit according to the fourth exemplary embodiment.

Then, vehicle controller 7 causes notification unit 92 to execute the display illustrated in FIG. 23D when the second predetermined time has elapsed after vehicle controller 7 causes notification unit 92 to execute the display illustrated in FIG. 23A. In FIG. 23D, symbol 234' indicating "acceleration" selected as the next behavior by the driver is displayed in the second manner.

When the behavior to be executed next is determined to be "acceleration", vehicle controller 7 reads characteristic amounts corresponding to the behavior of "acceleration" included in the driving characteristic model, and controls vehicle 1 such that vehicle 1 performs "acceleration" with these characteristic amounts being reflected thereon.

FIGS. 24A to 24D are each a view for describing a display on notification unit 92 according to the fourth exemplary embodiment of the present invention. FIGS. 24A to 24D are each a view illustrating a display corresponding to the second example of the travel environment illustrated in FIG. 7A. It should be noted that constituent elements in FIGS. 24A to 24D which are substantially identical to constituent elements in FIGS. 23A to 23D are denoted by identical reference numerals used in FIGS. 23A to 23D and will not be described in detail. FIGS. 24A to 24D are formed by deleting symbol 235 indicating "lane change" from FIGS. 23A to 23D.

As mentioned previously, in the second example (FIG. 7A), different from the first example (FIG. 5A), a lane change is impossible because nearby vehicle is traveling on the right of vehicle 1. Therefore, "lane change" is not displayed in FIGS. 24B and 24C. Further, in the example in FIG. 24C, because "acceleration" is selected as in FIG. 23C, vehicle controller 7 reads characteristic amounts corresponding to the behavior of "acceleration" included in the driving characteristic model, and controls vehicle 1 such that vehicle 1 performs "acceleration" with these characteristic amounts being reflected thereon, as in FIGS. 23A to 23D.

FIGS. 25A to 25D are each a view for describing a display on notification unit 92 according to the fourth exemplary embodiment of the present invention. FIGS. 25A to 25D are each a view illustrating a display corresponding to the third example of the travel environment illustrated in FIG. 8A.

Figure 25A:
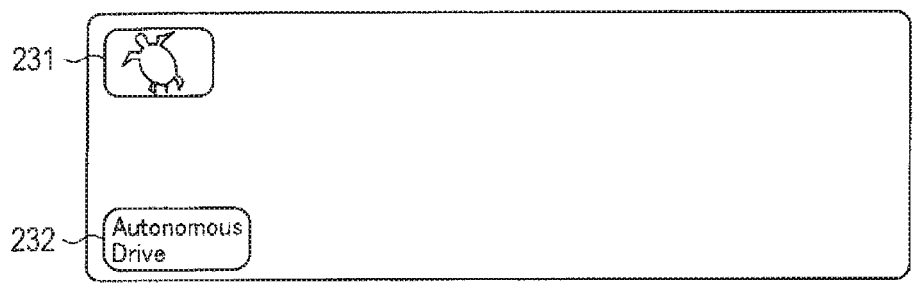
FIG. 25A is a view for describing a display on the notification unit according to the fourth exemplary embodiment.

FIG. 25A is similar to FIG. 23A. When determining that the travel environment is the one in the third example illustrated in FIG. 8A, vehicle controller 7 determines that the first behavior is "deceleration" based on the driver's driving characteristic of "frequently decelerating", and causes notification unit 92 to execute the display in FIG. 25B.

Figure 25B:
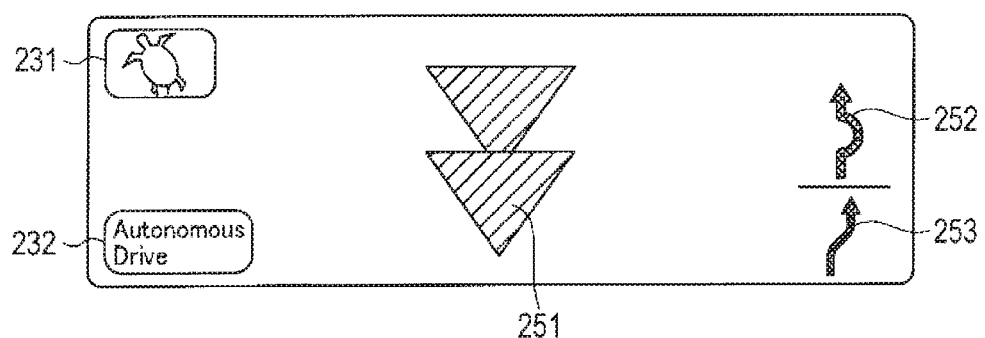
FIG. 25B is a view for describing a display on the notification unit according to the fourth exemplary embodiment.

In FIG. 25B, symbol 251 indicating "deceleration" which is the first behavior is illustrated in the first manner (for example, in the first color). In addition, symbol 252 indicating "overtake" which is the second behavior and symbol 253 indicating "lane change" which is the second behavior are illustrated.

Figure 25C:
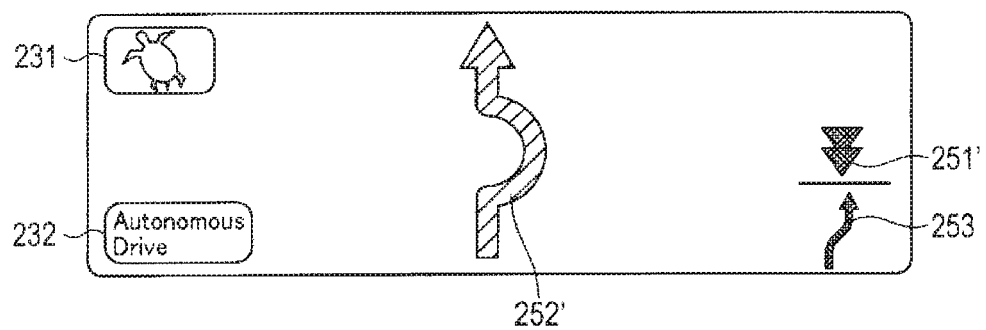
FIG. 25C is a view for describing a display on the notification unit according to the fourth exemplary embodiment.

When the driver changes the behavior to the behavior of "overtake" by the operation described in the first exemplary embodiment, vehicle controller 7 causes notification unit 92 to execute the display in FIG. 25C.

In FIG. 25C, symbol 252' indicating "overtake" which is the selected behavior is illustrated in the first manner. Further, symbol 251 which has been displayed as the first behavior in FIG. 25B is switched to symbol 252 and displayed as symbol 251'.

Figure 25D:
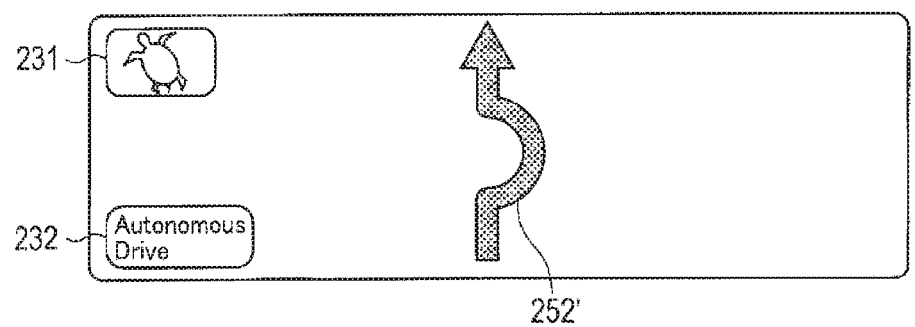
FIG. 25D is a view for describing a display on the notification unit according to the fourth exemplary embodiment.

Then, vehicle controller 7 causes notification unit 92 to execute the display illustrated in FIG. 25D when the second predetermined time has elapsed after vehicle controller 7 causes notification unit 92 to execute the display illustrated in FIG. 25A. In FIG. 25D, symbol 252' indicating "overtake" selected as the next behavior by the driver is displayed in the second manner.

When the behavior to be executed next is determined to be "overtake", vehicle controller 7 reads characteristic amounts corresponding to the behavior of "overtake" included in the driving characteristic model, and controls vehicle 1 such that vehicle 1 performs "acceleration" with these characteristic amounts being reflected thereon.

A description will next be given of an example of a display when the driving characteristic of the driver is not the driving characteristic of "frequently decelerating".

Figure 26A:
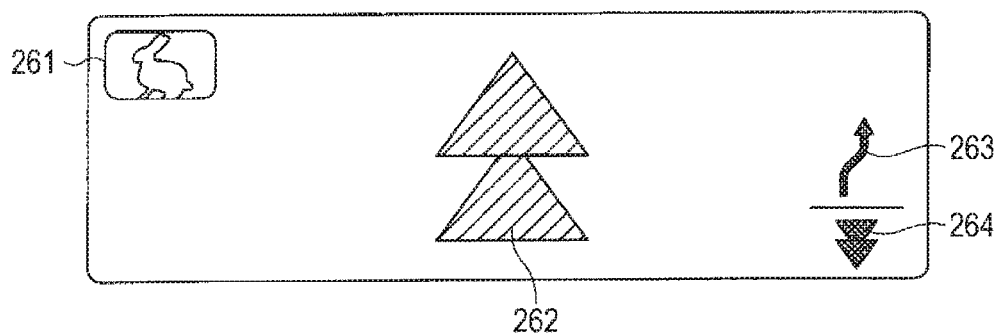
FIG. 26A is a view for describing a display on the notification unit according to the fourth exemplary embodiment.
Figure 26B:
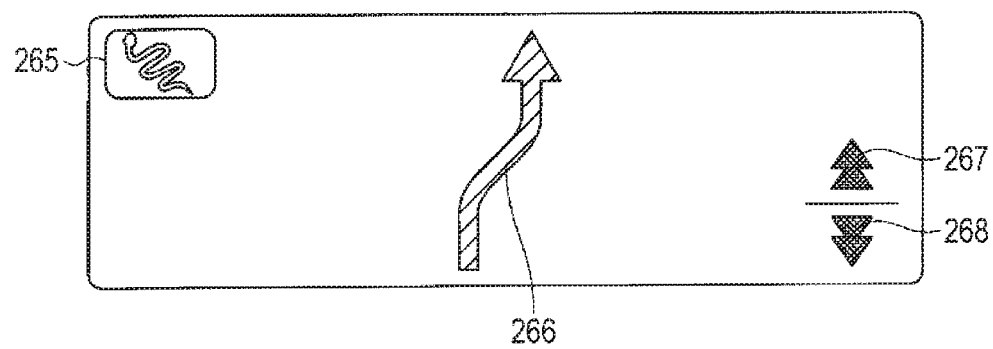
FIG. 26B is a view for describing a display on the notification unit according to the fourth exemplary embodiment.

FIGS. 26A to 26B are each a view for describing a display on notification unit 92 according to the fourth exemplary embodiment of the present invention. FIGS. 26A to 26B are each a view illustrating a display corresponding to the first example of the travel environment illustrated in FIG. 5A. It is to be noted that FIG. 26A illustrates an example of a case where the driver has a driving characteristic of "frequently accelerating", and FIG. 26B illustrates an example of a case where the driver has a driving characteristic of "frequently performing a lane change".

In FIG. 26A, symbol 261 indicating that the driver has a driving characteristic of "frequently accelerating" is illustrated. Symbol 262 indicating "acceleration" which is the first behavior is also illustrated in the first manner (for example, in the first color). In addition, symbol 263 indicating "lane change" which is the second behavior and symbol 264 indicating "deceleration" which is the second behavior are also illustrated.

Vehicle controller 7 causes notification unit 92 to execute a display including symbol 261 as illustrated in FIG. 26A for the driver who has frequently "accelerated" previously (that is, the driver who has frequently selected the behavior of "acceleration" previously) based on the driving characteristic, for example. In addition, vehicle controller 7 determines the first behavior as "acceleration" and causes notification unit 92 to execute the display in FIG. 26A based on the driver's driving characteristic of "frequently accelerating".

In FIG. 26B, symbol 265 indicating that the driver has a driving characteristic of "frequently performing a lane change" is illustrated. Symbol 266 indicating "lane change" which is the first behavior is also illustrated in the first manner (for example, in the first color). In addition, symbol 267 indicating "lane change" which is the second behavior and symbol 268 indicating "deceleration" which is the second behavior are also illustrated.

Vehicle controller 7 causes notification unit 92 to execute a display including symbol 265 as illustrated in FIG. 26B for the driver who has frequently performed "lane change" previously (that is, the driver who has frequently selected the behavior of "lane change" previously) based on the driving characteristic, for example. Vehicle controller 7 determines the first behavior as "lane change" and causes notification unit 92 to execute the display in FIG. 26B based on the driver's driving characteristic of "frequently performing a lane change".

The description has been given only using the driving characteristic model. However, the driver model may also be considered. Symbols 231, 261, and 265 in FIGS. 23A to 23D, 24A to 24D, 25A to 25D, 26A, and 26B may indicate the type of the driver model selected from the operation history of the driver. For example, for the driver model to be applied to a driver frequently selecting "deceleration" for the first example of the travel environment illustrated in FIG. 5A, vehicle controller 7 causes notification unit 92 to execute the display including symbol 231 as in FIGS. 23A to 23D and determines the first behavior as "deceleration". For the driver model to be applied to a driver frequently selecting "acceleration", vehicle controller 7 causes notification unit 92 to execute the display including symbol 261 as in FIG. 26A and determines the first behavior as "acceleration". For the driver model to be applied to a driver frequently selecting "lane change", vehicle controller 7 causes notification unit 92 to execute the display including symbol 265 as in FIG. 26B and determines the first behavior as "lane change".

According to the present exemplary embodiment described above, when determining a future behavior of the vehicle, the vehicle can learn the previous travel history of the driver and reflect the result in determining the future behavior. In addition, when controlling the vehicle, vehicle controller can learn the driving characteristic (driving taste) of the driver and reflect the result in controlling the vehicle.

Thus, the vehicle can control the autonomous driving at a timing or with an operation amount favored by the driver or the occupant, thereby being capable of suppressing unnecessary operation intervention performed by the driver during the autonomous driving without causing deviation from a sense of the driver when he/she actually manually drives the vehicle.

Note that, in the present invention, the function similar to the function executed by vehicle controller 7 may be executed by a cloud server or a server device. In addition, storage unit 8 may be provided in the cloud server or the server device, not in vehicle 1. Alternatively, storage unit 8 may store a driver model which has already been constructed, and vehicle controller 7 may determine a behavior by referring to the driver model stored in storage unit 8.

As described above, in the fourth exemplary embodiment, vehicle controller 7 acquires the information about the characteristic amount indicating the driving characteristic of the driver; storage unit 8 stores the information about the characteristic amount; and vehicle controller 7 constructs, for each travel environment of the vehicle, the driver model which indicates the tendency of the behavior of the vehicle selected by the driver in terms of the frequency of the selected behavior, based on the information about the characteristic amount stored in storage unit 8.

In addition, vehicle controller 7 determines, among from a plurality of drivers, the group of the drivers having similar behavior selection, and constructs the driver model for each group or each travel environment of the vehicle.

Further, vehicle controller 7 calculates the average of the frequency of the behavior selected by each driver for each group of the drivers performing a similar operation, and constructs, for each travel environment of the vehicle, a driver model in which the tendency of the behavior of the vehicle selected by the driver is indicated in terms of the calculated average.

Moreover, vehicle controller 7 constructs, based on the vehicle behavior which is selected by another driver having a similar tendency to the vehicle behavior selected by a specific driver, a driver model in which the tendency of the vehicle behavior selected by the specific driver is indicated in terms of the frequency of each selected behavior, for each travel environment of the vehicle.

Accordingly, vehicle controller 7 can construct a driver model more suitable for the driving tendency of the driver, and can perform autonomous driving more appropriate for the driver based on the constructed driver model.

(Modification of Driver Model)

The driver model described above is constructed in such a way that the operation (behavior) tendency of a driver for each travel environment is modeled based on information relating to the frequency of each operation. However, the present invention is not limited thereto.

For example, the driver model may be constructed based on a travel history in which an environmental parameter indicating a travel environment (i.e., situation) through which the vehicle has previously traveled and the operation (behavior) actually selected by the driver in this travel environment are associated with each other. When the environmental parameter is incorporated into the driver model, options can be decided without going through the procedure for individually performing detection and labeling of the travel environment and inputting (storing) the labeling result in the driver model. Specifically, when the difference in travel environment as in FIGS. 23A to 23D and 24A to 24D is acquired as environmental parameters, and the acquired parameters are directly input (stored) in the driver model, "acceleration", "deceleration", and "lane change" are determined as options in FIGS. 23A to 23D, and "acceleration" and "deceleration" are determined as options in FIGS. 24A to 24D. Hereinafter, an example of constructing such a driver model will be described. Note that the driver model described below may be restated as a situation database.

Now, a travel history for constructing the driver model in the present modification will be described. FIG. 27 is a diagram illustrating one example of the travel history. FIG. 27 illustrates the travel history in which environmental parameters indicating a travel environment through which the vehicle driven by driver x has previously traveled and the operation (behavior) actually selected by the driver in this travel environment are associated with each other.

The environmental parameters in (a) to (c) in the travel history in FIG. 27 respectively indicate the travel environment when the vehicle behavior is presented to the driver as in FIGS. 8B, 5B, and 7B, for example. The environmental parameters in the travel history are acquired from sensing information or infrastructure information.

The sensing information is information detected by sensors or radars in the vehicle. The infrastructure information includes information from GPS, map information, information acquired through road-to-vehicle communication, for example.

For example, the environmental parameters in the travel history in FIG. 27 include: "host vehicle information"; "leading vehicle information" indicating information about a vehicle traveling in front of the host vehicle in a lane of the host vehicle; "adjacent lane information" indicating information about an adjacent lane of the lane in which the host vehicle is traveling; "merging lane information" indicating, when there is a merging lane on a location where the host vehicle travels, the information about the merging lane; and "location information" indicating information about the location of the host vehicle and the surrounding thereof. In addition, following vehicle information may be included. In this case, a relative speed of the following vehicle relative to the host vehicle, head-to-head spacing, rate of change of the head-to-head spacing, and the like may be used. In addition, vehicle presence information may be included.

For example, the "host vehicle information" includes information about speed Va of the host vehicle. The "leading vehicle information" includes information about relative speed Vba of the leading vehicle relative to the host vehicle, distance DRba between the leading vehicle and the host vehicle, and rate of change RSb of the size of the leading vehicle.

Herein, speed Va of the host vehicle is detected by a speed sensor mounted to the host vehicle. Relative speed Vba and distance DRba between the host vehicle and the leading vehicle are detected by a sensor, radar, or the like. Rate of change RSb of the size is calculated from a relational expression of $RSb=-Vba/DRba$.

The "adjacent lane information" includes information about an adjacent following vehicle traveling behind the host vehicle in the adjacent lane, information about an adjacent leading vehicle traveling in front of the host vehicle in the adjacent lane, and information about remaining adjacent lane length DRda for the host vehicle.

The adjacent following vehicle information includes information about relative speed Vca of the adjacent following vehicle relative to the host vehicle, head-to-head spacing Dca between the adjacent following vehicle and the host vehicle, and rate of change Rca of the head-to-head spacing. Head-to-head spacing Dca between the adjacent following vehicle and the host vehicle is the distance between the front part (head) of the host vehicle and the front part (head) of the adjacent following vehicle measured in the direction along the travel direction of the host vehicle (and the adjacent following vehicle). Note that the head-to-head spacing may be calculated from the inter-vehicular distance or vehicle length. In addition, the head-to-head spacing may be replaced by the inter-vehicular distance.

Relative speed Vca and head-to-head spacing Dca are detected by a sensor, radar, or the like. Rate of change Rca of the head-to-head spacing is calculated from a relational expression of $Rca=Vca/Dca$.

In addition, the adjacent leading vehicle information includes information about relative speed Vda of the adjacent leading vehicle relative to the host vehicle, head-to-head spacing Dda between the adjacent leading vehicle and the host vehicle, and rate of change Rda of the head-to-head spacing. Head-to-head spacing Dda between the adjacent leading vehicle and the host vehicle is the distance between the front part (head) of the host vehicle and the front part (head) of the adjacent leading vehicle measured along the travel direction of the host vehicle (and the adjacent leading vehicle).

Relative speed Vda and head-to-head spacing Dda are detected by a sensor, radar, or the like. In addition, rate of change Rda of the head-to-head spacing is calculated from a relational expression of Rda=Vda/Dda.

Remaining adjacent lane length DRda for the host vehicle is a parameter indicating the degree of possibility of a lane change to the adjacent lane. Specifically, when the distance between the front part (head) of the host vehicle and the rear part of the adjacent leading vehicle measured along the travel direction of the host vehicle (and the adjacent leading vehicle) is longer than distance DRba between the leading vehicle and the host vehicle, remaining adjacent lane length DRda for the host vehicle is the distance between the front part (head) of the host vehicle and the rear part of the adjacent leading vehicle, and when the distance between the front part (head) of the host vehicle and the rear part of the adjacent leading vehicle is shorter than DRba, remaining adjacent lane length DRda is DRba. Remaining adjacent lane length DRda for the host vehicle is detected by a sensor, radar, or the like.

The "merging lane information" includes information about relative speed Vma of a merging vehicle relative to the host vehicle, head-to-head spacing Dma between the merging vehicle and the host vehicle, and rate of change Rma of the head-to-head spacing. Head-to-head spacing Dma between the merging vehicle and the host vehicle is the distance between the front part (head) of the host vehicle and the front part (head) of the merging vehicle measured in the direction along the travel direction of the host vehicle (and the merging vehicle).

Relative speed Vma and head-to-head spacing Dma are detected by a sensor, radar, or the like. Rate of change Rma of the head-to-head spacing is calculated from a relational expression of Rma=Vma/Dma.

In the example of the travel history illustrated in FIG. 27, the numerical values of the speed, distance, and rate of change described above are classified into a plurality of levels, and the numerical values indicating the classified levels are stored. Note that the numerical values of the speed, distance, and rate of change may be stored without being classified into levels.

The location information includes "host vehicle location information", "number of travel lanes", "host vehicle travel lane", "distance to start/end point of merging section", "distance to start/end point of branch section", "distance to start/end point of road work section", "distance to start/end point of lane end section", "distance to accident spot", and the like. FIG. 27 illustrates, as examples of the location information, the "host vehicle travel lane" (travel lane in FIG. 27) and the "distance to start/end point of merging section" (illustrated as "distance to merging point" in FIG. 27).

For example, numerical information indicating the latitude and longitude acquired from the GPS is stored in the part of the "host vehicle location information" not illustrated. The number of travel lanes on the road where the host vehicle is traveling is stored in the part of the "number of travel lanes". Numerical information indicating the location of the lane where the host vehicle is traveling is stored in the part of the "host vehicle travel lane" not illustrated. When there are start and end points of a merging section within a predetermined distance, the distances to the start and end points of the merging section are classified into a plurality of predetermined levels, and the numerical values of the classified levels are stored in the part of the "distance to start/end point of merging section". When there are no start and end points of a merging section within the predetermined distance, "0" is stored in the part of the "distance to start/end point of merging section".

When there are start and end points of a branch section within a predetermined distance, the distances to the start and end points of the branch section are classified into a plurality of predetermined levels, and the numerical values of the classified levels are stored in the part of the "distance to start/end point of branch section". When there are no start and end points of a branch section within the predetermined distance, "0" is stored in the part of the "distance to start/end point of branch section". When there are start and end points of a road work section within a predetermined distance, the distances to the start and end points of the road work section are classified into a plurality of predetermined levels, and the numerical values of the classified levels are stored in the part of the "distance to start/end point of road work section". When there are no start and end points of a road work section within the predetermined distance, "0" is stored in the part of the "distance to start/end point of road work section".

When there are start and end points of a lane end section within a predetermined distance, the distances to the start and end points of the lane end section are classified into a plurality of predetermined levels, and the numerical values of the classified levels are stored in the part of the "distance to start/end point of lane end section". When there are no start and end points of a lane end section within the predetermined distance, "0" is stored in the part of the "distance to start/end point of lane end section".

When there is an accident spot within a predetermined distance, the distance to the accident spot is classified into a plurality of predetermined levels, and the numerical values of the classified levels are stored in the part of the "distance to accident spot". When there is no accident spot within the predetermined distance, "0" is stored in the part of the "distance to accident spot".

In addition, the location information may include information indicating which lane, out of all lanes on the road where the host vehicle is traveling, is the merging lane, the branch lane, the lane having a road work, the lane which ends, and the lane having an accident spot.

Note that the travel history illustrated in FIG. 27 is merely one example, and the present invention is not limited thereto. For example, when the adjacent lane information is information about the right adjacent lane, the travel history may further include "left adjacent lane information" opposite to the right adjacent lane.

The "left adjacent lane information" includes information about a left adjacent following vehicle traveling behind the host vehicle in the left adjacent lane, information about a left adjacent leading vehicle traveling in front of the host vehicle in the left adjacent lane, and information about remaining left adjacent lane length DRda for the host vehicle.

The left following vehicle information includes information about relative speed Vfa of the left adjacent following vehicle relative to the host vehicle, head-to-head spacing Dfa between the left adjacent following vehicle and the host vehicle, and rate of change Rfa of the head-to-head spacing. Head-to-head spacing Dfa between the left adjacent following vehicle and the host vehicle is the distance between the front part (head) of the host vehicle and the front part (head) of the left adjacent following vehicle measured in the direction along the travel direction of the host vehicle (and the left adjacent following vehicle).

Here, relative speed Vfa and head-to-head spacing Dfa are detected by a sensor, radar, or the like. In addition, rate of change Rfa of the head-to-head spacing is calculated from a relational expression of Rfa=Vfa/Dfa.

In addition, the left adjacent leading vehicle information includes information about relative speed Vga of the left adjacent leading vehicle relative to the host vehicle, head-to-head spacing Dga between the left adjacent leading vehicle and the host vehicle, and rate of change Rga of the head-to-head spacing. Head-to-head spacing Dga between the left adjacent leading vehicle and the host vehicle is the distance between the front part (head) of the host vehicle and the front part (head) of the left adjacent leading vehicle measured along the travel direction of the host vehicle (and the left adjacent leading vehicle).

Here, relative speed Vga and head-to-head spacing Dga are detected by a sensor, radar, or the like. In addition, rate of change Rga of the head-to-head spacing is calculated from a relational expression of Rga=Vga/Dga.

It is to be noted that, while the description has been given of the case where the vehicle is in the left side of the road, the similar process is also applied for the case where the vehicle is in the right side of the road by inverting left to right.

In addition, the travel history illustrated in FIG. 27 may include "following vehicle information" indicating information about a vehicle traveling behind the host vehicle in the travel lane of the host vehicle.

The following vehicle information includes information about relative speed Vea of the following vehicle relative to the host vehicle, head-to-head spacing Dea between the following vehicle and the host vehicle, and rate of change Rea of the head-to-head spacing. Head-to-head spacing Dea between the following vehicle and the host vehicle is the distance between the front part (head) of the host vehicle and the front part (head) of the following vehicle measured in the direction along the travel direction of the host vehicle (and the following vehicle).

Here, relative speed Vea and head-to-head spacing Dea are detected by a sensor, radar, or the like. Rate of change Rea of the head-to-head spacing is calculated from a relational expression of Rea=Vea/Dea.

It is to be noted that, if the head-to-head spacing cannot be measured because of the vehicles being hidden by a moving body, the measurable distance between vehicles or an approximate value obtained by adding a predetermined vehicle length to the distance between vehicles may be substituted for the head-to-head spacing, or the head-to-head spacing may be calculated by adding the vehicle length of each recognized vehicle type to the distance between vehicles. Alternatively, regardless of whether the head-to-head spacing can be measured, the measurable distance between vehicles or an approximate value obtained by adding a predetermined vehicle length to the distance between vehicles may be substituted for the head-to-head spacing, or the head-to-head spacing may be calculated by adding the vehicle length of each recognized vehicle type to the distance between vehicles.

The travel history may include other various information items pertaining to the travel environment of the vehicle. For example, the travel history may include information about the size or the type of a leading vehicle, an adjacent vehicle, or a merging vehicle, or information about the relative position relative to the host vehicle. For example, when the vehicle approaching from behind is an emergency vehicle as a result of recognition of the type of the vehicle by a camera sensor, information indicating the vehicle being an ambulance vehicle may be included. According to this configuration, notification regarding information for responding to the emergency vehicle can be provided. Alternatively, numerical values indicating, in stages, operation amounts of the steering wheel, the brake, and the accelerator or the information pertaining to a fellow passenger as described with reference to FIG. 22 may be included in the travel history.

In addition, the travel history of the driver may be formed by aggregating the behaviors selected during autonomous driving, or by aggregating the behaviors actually executed by the driver during manual driving. Thus, a travel history according to a driving state, i.e., autonomous driving or manual driving, can be collected.

Further, although the environmental parameters included in the travel history in the example in FIG. 27 show the travel environment when a vehicle behavior is presented to the driver, the environmental parameters may show a travel environment when the driver performs behavior selection. Alternatively, the travel history may include both environmental parameters showing the travel environment when a vehicle behavior is presented to the driver and environmental parameters showing the travel environment when the driver performs behavior selection.

Moreover, the following configuration may be applied when vehicle controller 7 generates the display of the overhead view illustrated FIG. 2A, 5A, 6A, 7A, 8A, 9A, or 10A or the display illustrated FIG. 14C. Specifically, vehicle controller 7 generates, as notification information item, at least one of the information about the environmental parameter which has a high rate of contribution by which the first behavior and the second behavior are selected, and the information (for example, icon) pertaining to this environmental parameter. The notification information may be provided by notification unit 92 by displaying the generated notification information on the overhead view.

In this case, if distance DRba between the leading vehicle and the host vehicle or rate of change RSb of the size of the leading vehicle has a high rate of contribution, for example, vehicle controller 7 may cause notification unit 92 to display a high luminance region or a color-changed region between the leading vehicle and the host vehicle in the overhead view so as to provide the notification information.

Alternatively, vehicle controller 7 may display, as the notification information, an icon indicating that distance DRba or rate of change RSb has a high rate of contribution, in a region between the leading vehicle and the host vehicle. Still alternatively, vehicle controller 7 may cause notification unit 92 to depict, as the notification information, a line segment connecting the leading vehicle and the host vehicle in the overhead view, or to depict line segments connecting all surrounding vehicles and the host vehicle as the notification information and to highlight only the line segment connecting the leading vehicle and the host vehicle in the overhead view.

Alternatively, vehicle controller 7 may cause notification unit 92 to display between the leading vehicle and the host vehicle, as the notification information, a region having higher luminance than the surrounding region or a region having a different color from the surrounding region, not in the overhead view, but in a viewpoint image viewed by the driver, thereby implementing augmented reality (AR) display. Alternatively, vehicle controller 7 may cause notification unit 92 to display in the viewpoint image, as the notification information, an AR image of an icon indicating an environmental parameter having a high rate of contribution in a region between the leading vehicle and the host vehicle.

Still alternatively, vehicle controller 7 may cause notification unit 92 to display in the viewpoint image, as the notification information, an AR image of a line segment connecting the leading vehicle and the host vehicle, or to display in the viewpoint image, as the notification information, an AR image of line segments connecting all surrounding vehicles and the host vehicle and to highlight only the line segment connecting the leading vehicle and the host vehicle.

It should be noted that the method for providing notification regarding the environmental parameter having a high rate of contribution or the information pertaining to the environmental parameter is not limited to the methods described above. For example, vehicle controller 7 may generate, as the notification information, an image in which the leading vehicle involved with an environmental parameter having a high rate of contribution is displayed in a highlighted manner, and may cause notification unit 92 to display this image.

In addition, vehicle controller 7 may generate, as the notification information, information indicating the direction of the leading vehicle or the like involved with an environmental parameter having a high rate of contribution in the overhead view or AR display, and display this information in the host vehicle or around the host vehicle.

Alternatively, in place of providing the notification regarding the information about the environmental parameter having a high rate of contribution or the information pertaining to this environmental parameter, vehicle controller 7 may make a leading vehicle or the like which is involved with an environmental parameter having a low rate of contribution unnoticeable by lowering the display luminance of the leading vehicle or the like, generate, as the notification information, the information about the environmental parameter having a high rate of contribution which becomes relatively noticeable or the information pertaining to the environmental parameter, and cause notification unit 92 to display the generated information.

Next, the construction of a driver model based on the travel history of the driver will be described. The driver model is classified into a clustering type constructed by clustering travel histories of a plurality of drivers, and an individually-adapted type in which a driver model of a specific driver (for example, driver x) is constructed from a plurality of travel histories similar to the travel history of driver x.

Firstly, the clustering type will be described. The clustering-type driver model is constructed in such a way that the travel history of the driver illustrated in FIG. 27 is aggregated in advance for each driver. Then, a plurality of drivers having a high degree of similarity between the travel histories, that is, a plurality of drivers having a similar driving operation tendency, is grouped to construct a driver model.

The degree of similarity between travel histories can be determined, for example, based on a correlation value of a vector having, when the behaviors in the travel histories of driver a and driver b are quantified according to a predetermined rule, the numerical value of the environmental parameter and the numerical value of the behavior as an element. In this case, when the correlation value calculated from the travel histories of driver a and driver b is higher than a predetermined value, the travel histories of driver a and driver b are grouped into a single group. Note that the calculation of the degree of similarity is not limited thereto.

Next, the individually-adapted type will be described. The individually-adapted-type driver model is constructed in such a way that travel histories of a plurality of drivers illustrated in FIG. 27 are aggregated in advance, as in the method for constructing the clustering-type. The different point from the clustering-type is such that the driver model is constructed for each driver. For example, when a driver model is constructed for driver y, the travel history of driver y and travel histories of the other drivers are compared, and the travel histories of the drivers having a high degree of similarity are extracted. Then, the individually-adapted-type driver model for driver y is constructed from the extracted travel histories of a plurality of drivers.

Notably, the driver model (situation database) based on the travel history in FIG. 27 is not limited to the clustering type or the individually-adapted type, and may be constructed to include travel histories of all drivers, for example.

Now, a method for using the constructed driver model will be described with examples. A description will next be given of a case where a driver model formed by aggregating travel histories of four drivers a to d is used for driver x. Note that the driver model is constructed by vehicle controller 7.

Modification

FIGS. 28A and 28B are diagrams illustrating a method for using the driver model in the present modification. FIG. 28A illustrates environmental parameters indicating the current travel environment of the vehicle driven by driver x. FIG. 28B illustrates one example of a driver model for driver x.

As illustrated in FIG. 28A, the behavior (operation) for the environmental parameters indicating the current travel environment is blank. Vehicle controller 7 acquires environmental parameters at predetermined intervals, and determines the next behavior from the driver model illustrated in FIG. 28B by using any one of the environmental parameters as a trigger.

For example, the environmental parameter indicating the need to change the operation of the vehicle, such as the case where the distance to the start point of the merging section becomes shorter than or equal to a predetermined distance or the case where the relative speed relative to the leading vehicle becomes less than or equal to a predetermined value, may be used as a trigger.

Vehicle controller 7 compares the environmental parameters illustrated in FIG. 28A with the environmental parameters in the travel history of the driver model illustrated in FIG. 28B, and determines the behavior associated with the most similar environmental parameters as the first behavior. In addition, vehicle controller 7 determines some behaviors associated with the other similar environmental parameters as the second behavior.

The similarity between environmental parameters can be determined from a correlation value of a vector having the numerical values of the environmental parameters as elements. For example, when the correlation value calculated from the vector having the numerical values of the environmental parameters illustrated in FIG. 28A as an element and the vector having the numerical values of the environmental parameters in FIG. 28B as an element is larger than a predetermined value, these environmental parameters are determined to be similar to each other. Note that the method for determining similarity between environmental parameters is not limited thereto.

In the above, a behavior is determined based on the degree of similarity between environmental parameters. However, a group of environmental parameters having high degree of similarity may be firstly generated, statistics of the environmental parameters in this group may be taken, and a behavior may be determined from this statistical data.

In this way, the notification regarding the behavior more suitable for the driver can be provided by constructing in advance the driver model for each driver from the travel histories of a plurality of drivers. Notably, to register a safer travel history into a database, it may be configured such that: storage unit 8 stores information indicating a safe travel standard; vehicle controller 7 determines whether or not the travel history satisfies this standard; and vehicle controller 7 further registers the travel history satisfying this standard into the database and does not register the travel history not satisfying this standard.

In addition, due to the association between the parameter indicating the travel environment and the behavior, vehicle controller 7 can determine the next behavior with high accuracy without determining a specific travel environment, i.e., without performing labeling of travel environments.

It is to be noted that the driver model (situation database) may be constructed from the travel history in which the behavior selected by the driver during autonomous driving and the environmental parameters indicating the travel environment when this behavior is presented are associated with each other. Alternatively, the driver model (situation database) may be constructed from the travel history in which the behavior selected by the driver during autonomous driving and the environmental parameters indicating the travel environment when the vehicle performs this behavior are associated with each other.

When the environmental parameters indicate the travel environment when the vehicle performs the behavior selected by the driver, the following configuration may be applied. Specifically, environmental parameters indicating a future travel environment are predicted from the environmental parameters indicating the current travel environment. Then, from among the environmental parameters indicating the travel environment when the vehicle performs the behavior selected by the driver, the behavior associated with the environmental parameter most similar to the predicted environmental parameters may be determined as the first behavior, and some behaviors associated with the other similar environmental parameters may be determined as the second behavior.

For example, the above prediction is conducted by extrapolating the environmental parameters in the future from the environmental parameters indicating the travel environments at the present moment and before the present moment.

Alternatively, the driver model (situation database) may be constructed from both the travel history in which the behavior selected by the driver during autonomous driving and the environmental parameters indicating the travel environment when this behavior is presented are associated with each other, and the travel history in which the behavior selected by the driver during autonomous driving and the environmental parameters indicating the travel environment when the vehicle performs this behavior are associated with each other.

In this case, both of the travel histories are stored in the form illustrated in FIG. 28B for example, and vehicle controller 7 determines the next behavior from these travel histories. In this case, vehicle controller 7 may place priority between these travel histories, and may preferentially determine the next behavior from the travel history in which the behavior selected by the driver during autonomous driving and the environmental parameters indicating the travel environment when the vehicle performs this behavior are associated with each other.

Note that, in the present invention, the function similar to the function executed by vehicle controller 7 may be executed by a cloud server or a server device. Particularly, storage unit 8 may be mounted in a server device such as a cloud server, not in vehicle 1, because it has an enormous amount of data with accumulation of travel histories. Alternatively, storage unit 8 may store a driver model which has already been constructed, and vehicle controller 7 may determine a behavior by referring to the driver model stored in storage unit 8.

It is to be noted that, in the configuration in which storage unit 8 is mounted in a cloud server, a cache is desirably provided in case of storage unit 8 being inaccessible due to a drop in a communication speed or disruption of communication.

Figure 29:
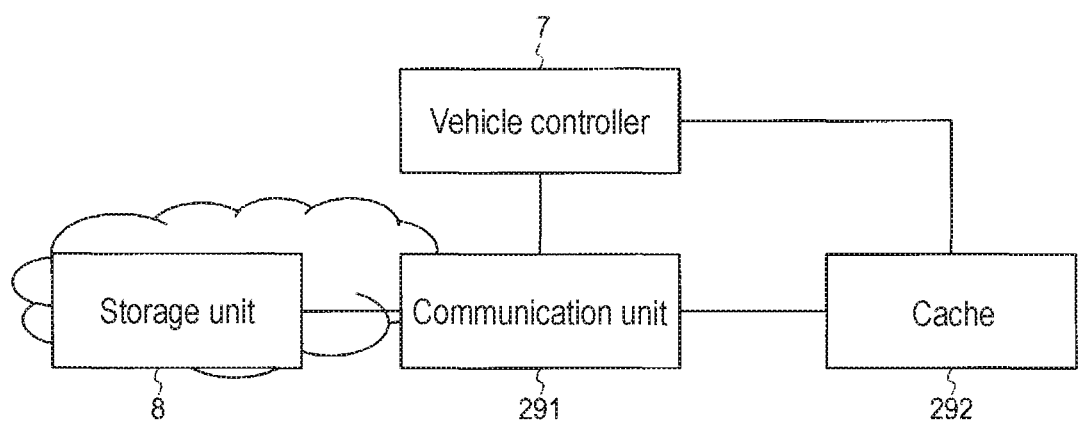
FIG. 29 is a block diagram illustrating one example of a cache arrangement in a modification of the driver model according to the fourth exemplary embodiment.

FIG. 29 is a block diagram illustrating one example of the arrangement of the cache. Vehicle controller 7 causes storage unit 8 to store the travel history through communication unit 291, and causes cache 292 to store a portion of the driver model (situation database) stored in storage unit 8 through communication unit 291.

Vehicle controller 7 accesses the driver model in cache 292. Conceivable methods for creating a cache in this case include a method for limitation according to presence or absence of an environmental parameter, a method using location information, and a method for processing data. Each of the methods will be described below.

Firstly, the method for limitation according to presence or absence of an environmental parameter will be described. It is possible to extract similar situations through comparison with surrounding situations, if there are sufficient travel environments (situations) having only the same environmental parameters. Therefore, vehicle controller 7 extracts travel environments having only the same environmental parameters from among the travel environments stored in storage unit 8, sorts these travel environments, and holds the resultant in cache 292.

In this case, vehicle controller 7 updates a primary cache at the timing at which the environmental parameters acquired from the detected situation are changed. According to this process, vehicle controller 7 can extract similar surrounding conditions even if the communication speed drops. Notably, the environmental parameters which are determined to be changed or not may be all environmental parameters or some of the environmental parameters described previously.

Moreover, because the environmental parameters vary from hour to hour, a primary cache and a secondary cache may be prepared in cache 292. For example, vehicle controller 7 holds travel environments having the same environmental parameters in the primary cache. Further, vehicle controller 7 holds, in the secondary cache, at least one of a travel environment in which one environmental parameter is added to the travel environment held in the primary cache and a travel environment in which one environmental parameter is reduced from the travel environment held in the primary cache.

Accordingly, vehicle controller 7 can extract a similar situation only by using the data in cache 292, even if temporal communication disruption occurs.

This case will be more specifically described with reference to FIG. 30. When sensor 62 detects surrounding situation 303 in which only adjacent leading vehicle 302 is present around host vehicle 301, vehicle controller 7 extracts travel environments (travel environments having the same environmental parameters) where only adjacent leading vehicle 302 is present, from storage unit 8 in which all travel environments (situations) stored, and stores the extracted travel environments in primary cache 304.

In addition, vehicle controller 7 extracts a travel environment where only one vehicle other than adjacent leading vehicle 302 is added (travel environment where one environmental parameter is added to the same environmental parameter) or a travel environment where there is no adjacent leading vehicle 302 (travel environment where one environmental parameter is reduced from the same environmental parameters) from storage unit 8, and stores the extracted travel environments in secondary cache 305.

When surrounding situation 303 detected by sensor 62 is changed, vehicle controller 7 copies the travel environment corresponding to changed surrounding situation 303 to primary cache 304 from secondary cache 305, extracts, from storage unit 8, a travel environment where one environmental parameter is added and a travel environment where one environmental parameter is reduced relative to the travel environment corresponding to changed surrounding situation 303, and stores the extracted travel environments into secondary cache 305. Thus, vehicle controller 7 updates secondary cache 305. Accordingly, vehicle controller 7 can smoothly extract more similar surrounding situation through comparison with the surrounding situations.

Next, the method using location information will be described. When location information is included in environmental parameters, vehicle controller 7 can extract, from storage unit 8, the travel environment (situation) where the location indicated by the location information is included within a certain range around the location of the host vehicle, and store the extracted travel environment in cache 292.

In this case, vehicle controller 7 updates cache 292 when the location indicated by the location information corresponding to the travel environment falls outside the certain range. Accordingly, vehicle controller 7 can extract a similar surrounding situation as long as the location falls within a certain range, even if long-term communication disruption occurs.

In addition, the method for processing data will be described. Operation histories including environmental parameters are accumulated in storage unit 8. Vehicle controller 7 divides the respective environmental parameters for each predetermined range to form a mesh on a multidimensional space. Then, vehicle controller 7 creates a table in which behaviors included in each mesh are counted for each type.

Figures 31A, 31B:
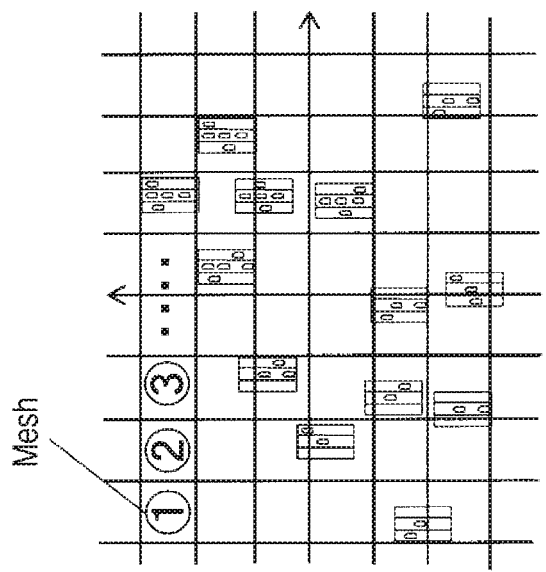
FIG. 31A is a diagram illustrating one example of a method for generating a cache in the modification of the driver model according to the fourth exemplary embodiment.
FIG. 31B is a diagram illustrating one example of a method for generating a cache in the modification of the driver model according to the fourth exemplary embodiment.

A description will be given of the case where the environmental parameters to be used are limited to two, for example. Vehicle controller 7 maps the environmental parameters included in the operation history on a plane as illustrated in FIG. 31A, and each axis is equally divided, whereby the plane is divided into a plurality of blocks. This is called a mesh.

Vehicle controller 7 counts the number of behaviors included in each mesh for each type (for example, the type such as acceleration, deceleration, lane change, or overtake). FIG. 31B illustrates a table where the number of behaviors included in each mesh is counted for each type.

Vehicle controller 7 stores this content in cache 292. Then, when extracting similar surrounding situation through the comparison with surrounding situations, vehicle controller 7 determines in which mesh the detected environmental parameter is located, selects the behavior having the highest number from the behaviors included in the determined mesh, and determines the selected behavior as the behavior to be provided as notification.

For example, when determining that the detected environmental parameter is located in No. 3 mesh, vehicle controller 7 determines operation of the behavior (here, "acceleration") showing the highest number among the behaviors included in the No. 3 mesh as the behavior to be provided as notification. If this method is used, cache 292 can be updated at any timing, and the capacity of cache 292 can be made constant.

The cache is created by using one of these methods or a combination thereof. It is to be noted that the methods described above are merely one example, and the method for creating a cache is not limited thereto.

As described above, the example of extending the driver model according to the fourth exemplary embodiment has the following configurations. Specifically, vehicle controller 7 acquires information about characteristic amounts indicating a driver's driving characteristic including information about a previous travel environment, storage unit 8 stores the information about characteristic amounts, and when it is determined that a vehicle behavior is needed to be changed, vehicle controller 7 determines information similar to characteristic amounts indicating the driver's driving characteristic including information about a newly-acquired travel environment, from the information about characteristic amounts stored in storage unit 8, and provides notification regarding the behavior corresponding to the determined information.

In addition, in the example of extending the driver model according to the fourth exemplary embodiment, the information about characteristic amounts indicating the driver's driving characteristic including the information about the previous travel environment is at least one of information about characteristic amounts when a vehicle behavior is presented to the driver and information about characteristic amounts when the driver performs behavior selection.

In addition, in the example of extending the driver model according to the fourth exemplary embodiment, when the information about characteristic amounts indicating the driver's driving characteristic including the information about the previous travel environment is both the information about characteristic amounts when a vehicle behavior is presented to the driver and the information about characteristic amounts when the driver performs behavior selection, vehicle controller 7 determines information similar to characteristic amount indicating the driver's driving characteristic including information about a newly-acquired travel environment, from both information items of characteristic amounts, and provides notification regarding the behavior corresponding to the determined information.

In addition, following configuration is applied to the example for extending the driver model according to the fourth exemplary embodiment. Specifically, when the information about characteristic amounts indicating the driver's driving characteristic including the information about the previous travel environment is both the information about characteristic amounts when a vehicle behavior is presented to the driver and the information about characteristic amounts when the driver performs behavior selection, vehicle controller 7 determines information similar to characteristic amounts indicating the driver's driving characteristic including information about a newly-acquired travel environment, preferentially from the information about characteristic amounts when the driver performs behavior selection, and provides notification regarding the behavior corresponding to the determined information.

In addition, in the example of extending the driver model according to the fourth exemplary embodiment, the information about characteristic amounts indicating the driver's driving characteristic including the information about the previous travel environment is information about characteristic amounts indicating the driver's driving characteristic when the vehicle is under autonomous driving and/or under manual driving.

Accordingly, vehicle controller 7 can construct a driver model more suitable for the driving tendency of the driver, and can perform autonomous driving more appropriate for the driver based on the constructed driver model. Due to the association between parameters indicating the travel environment and the behavior, vehicle controller 7 can determine the next behavior with high accuracy without requiring a process for determining a specific travel environment, i.e., without performing labeling of travel environments.

Fifth Exemplary Embodiment

Recently, development pertaining to autonomous driving for motor vehicles has been advanced. According to the levels of vehicle automation defined by National Highway Traffic Safety Administration (NHTSA) in 2013, vehicle automation is classified into no automation (level 0), function-specific automation (level 1), combined function automation (level 2), limited self-driving automation (level 3), and full self-driving automation (level 4). The level 1 is a driving assistance system autonomously performing one of acceleration, deceleration, and steering, and level 2 is a driving assistance system autonomously performing two or more of acceleration, deceleration, and steering in unison. In either case, driver intervention for a driving operation is required. The level 4 is a full self-driving automation system autonomously performing all of acceleration, deceleration, and steering, and the driver does not intervene the driving operation. The level 3 is a limited self-driving automation system autonomously performing all of acceleration, deceleration, and steering, but the driver performs a driving operation according to need.

The exemplary embodiment below mainly proposes a device (hereinafter also referred to as a "driving assistance device") that controls a human machine interface (HMI) for transmitting/receiving information pertaining to autonomous driving to/from an occupant of the vehicle (for example, driver). "Actions" of the vehicle in the description below correspond to "behaviors" of the vehicle in the description of the first to fourth exemplary embodiments, and include an activation state such as steering or braking while the vehicle is traveling or stopped, or a control content pertaining to autonomous driving control, during autonomous driving or manual driving. The "actions" include constant-speed driving, acceleration, deceleration, temporarily stop, stop, lane change, route change, right/left turn, parking, and the like, for example.

Particularly, the fifth exemplary embodiment describes a process for further improving the accuracy in estimating the next action for the individually-adapted-type driver model described in the fourth exemplary embodiment. In the fourth exemplary embodiment, after the travel history of each driver is collected, the operation frequency distribution of each driver is analyzed to select travel histories of other drivers similar to the travel history of the target driver, and the driver model is created based on the selected travel histories. That is, a driver model adapted to an individual is created by performing grouping for each driver.

On the other hand, the fifth exemplary embodiment focuses on the fact that the driving action of a driver may change depending on the presence or absence of a fellow passenger or the state of the fellow passenger. For example, even under the situation where the driver changes lanes if a fellow passenger is not in the vehicle, the driver decelerates without changing lanes if a fellow passenger is in the vehicle. To address such situation, in the fifth exemplary embodiment, operation histories are collected for each of combinations of a driver and a fellow passenger, the travel history of the other combination similar to the travel history of the target combination is selected, and a driver model is created based on the selected travel history. In other words, the process executed for each driver in the fourth exemplary embodiment is executed for each combination of driver and fellow passenger, whereby the unit of the process is subdivided. Note that, to improve the accuracy in estimating actions, travel histories of more drivers are needed, which increases the processing load. Therefore, it is supposed here that the process is executed by a cloud server.

Figure 32:
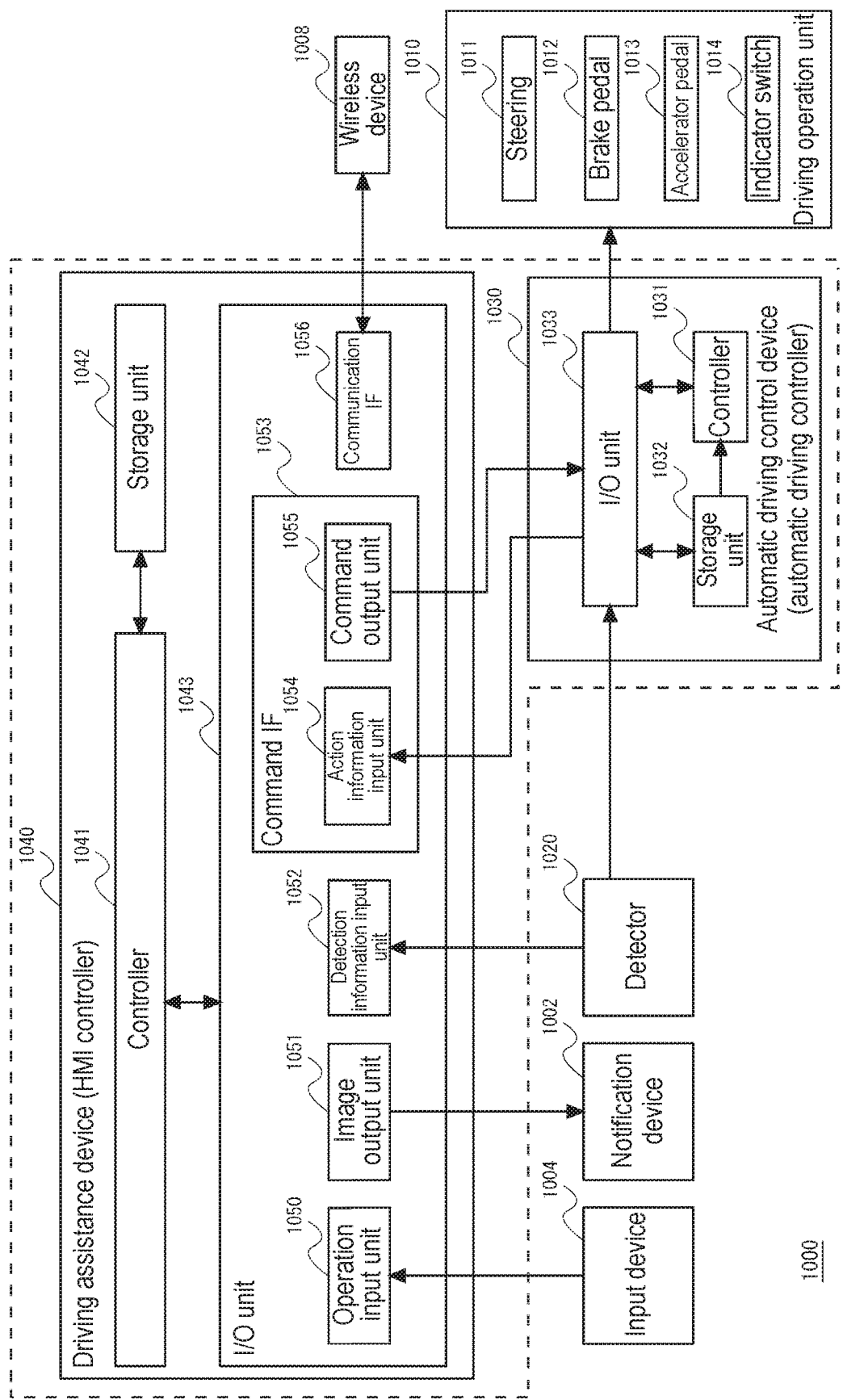
FIG. 32 is a block diagram illustrating a configuration of a vehicle according to a fifth exemplary embodiment.

FIG. 32 is a block diagram illustrating the configuration of vehicle 1000, showing the configuration pertaining to autonomous driving. Vehicle 1000 can travel in an autonomous driving mode, and includes notification device 1002, input device 1004, wireless device 1008, driving operating unit 1010, detector 1020, autonomous driving control device 1030, and driving assistance device 1040. The devices illustrated in FIG. 32 may be interconnected by exclusive lines or wire communication such as a controller area network (CAN). Alternatively, they may be interconnected by wire communication or wireless communication such as a Universal Serial Bus (USB), Ethernet (registered trademark), Wi-Fi (registered trademark), or Bluetooth (registered trademark).

Vehicle 1000 corresponds to vehicle 1 in the first to fourth exemplary embodiments. Notification device 1002 corresponds to information notification device 9 in FIGS. 1 and 13, input device 1004 corresponds to operating unit 51 in FIG. 1 and input unit 102 in FIG. 13, and detector 1020 corresponds to detector 6 in FIGS. 1 and 13. In addition, autonomous driving control device 1030 and driving assistance device 1040 correspond to vehicle controller 7 in FIGS. 1 and 13. The description of the components which have already been described in the first to fourth exemplary embodiments will be omitted as appropriate.

Notification device 1002 notifies the driver of information pertaining to travel of vehicle 1000. Notification device 1002 may be a display for displaying information, such as a light emitting element, e.g., a light emitting diode (LED), provided on a car navigation system, a head-up display, a center display, a steering wheel, a pillar, a dashboard, the vicinity of an instrument panel, and the like in the vehicle interior. Notification device 1002 may be a speaker for notifying the driver of information converted into a voice/sound or a vibrator provided on a position (for example, a seat of the driver, steering wheel, and the like) where the driver can sense the vibration. In addition, notification device 1002 may be a combination of these elements. Input device 1004 is a user interface device that receives an operation input performed by an occupant. For example, input device 1004 receives information input by the driver and pertaining to autonomous driving of host vehicle. Driving assistance device 1040 outputs the received information to driving assistance device 1040 as an operation signal.

Figure 33:
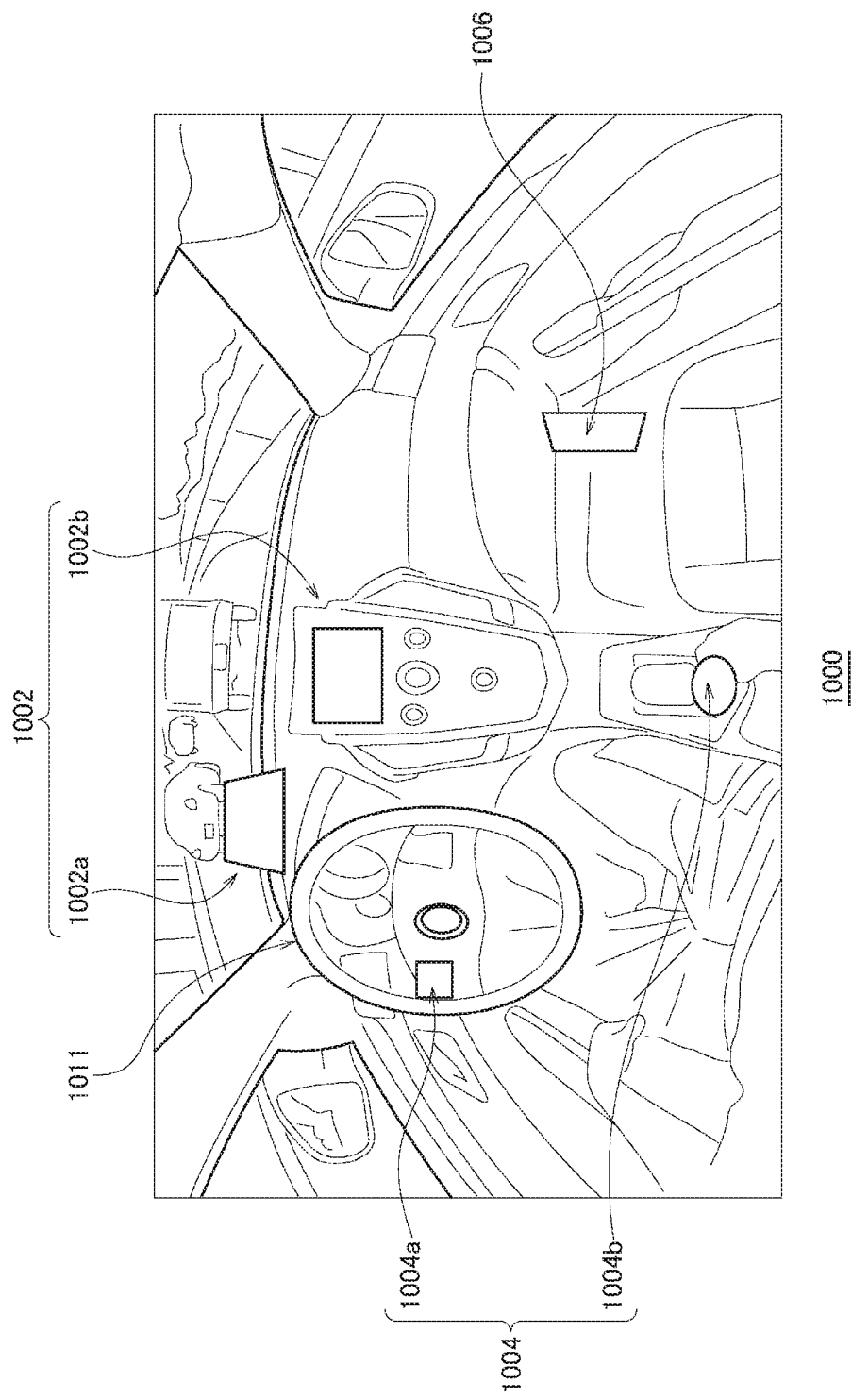
FIG. 33 is a view schematically illustrating an interior of the vehicle in FIG. 32.

FIG. 33 schematically illustrates an interior of vehicle 1000 in FIG. 32. Notification device 1002 may be head-up display (HUD) 1002a or center display 1002b. Input device 1004 may be first operating unit 1004a mounted to steering wheel 1011 or second operating unit 1004b mounted between a driver seat and a passenger seat. Note that notification device 1002 and input device 1004 may be integrated. For example, they may be mounted as a touch panel display.

Although not mentioned below, speaker 1006 for presenting information pertaining to autonomous driving to occupants with a voice/sound may be mounted on vehicle 1000 as illustrated in FIG. 33. In this case, driving assistance device 1040 may cause notification device 1002 to display an image indicating information pertaining to autonomous driving, and in addition to or in place of this configuration, may output a voice/sound indicating the information pertaining to autonomous driving from speaker 1006.

Returning to FIG. 32, wireless device 1008 is adapted to a mobile phone communication system, Wireless Metropolitan Area Network (WMAN), or the like, and executes wireless communication with a device (not illustrated) outside of vehicle 1000. Driving operating unit 1010 includes steering 1011, brake pedal 1012, accelerator pedal 1013, and indicator switch 1014. Steering 1011 corresponds to steering wheel 5 in FIGS. 1 and 13, brake pedal 1012 corresponds to brake pedal 2 in FIGS. 1 and 13, accelerator pedal 1013 corresponds to accelerator pedal 3 in FIGS. 1 and 13, and indicator switch 1014 corresponds to indicator lever 4 in FIGS. 1 and 13.

Steering 1011, brake pedal 1012, accelerator pedal 1013, and indicator switch 1014 can be electronically controlled respectively by a steering ECU, a brake ECU, an engine ECU and a motor ECU, and an indicator controller. In an autonomous driving mode, the steering ECU, the brake ECU, the engine ECU, and the motor ECU drive actuators according to control signals supplied from autonomous driving control device 1030. In addition, the indicator controller turns on or off an indicator lamp according to a control signal supplied from autonomous driving control device 1030.

Detector 1020 detects a surrounding situation and a travel state of vehicle 1000. As has been partially mentioned in the first to fourth exemplary embodiments, detector 1020 detects a speed of vehicle 1000, relative speed of a leading vehicle relative to vehicle 1000, distance between vehicle 1000 and the leading vehicle, relative speed of a vehicle in the adjacent lane relative to vehicle 1000, distance between vehicle 1000 and the vehicle in the adjacent lane, and location information about vehicle 1000. Detector 1020 outputs detected various information items (hereinafter referred to as "detection information") to autonomous driving control device 1030 and driving assistance device 1040. Note that the detail of detector 1020 will be described later.

Autonomous driving control device 1030 is an autonomous driving controller having mounted thereto an autonomous driving control function, and determines an action of vehicle 1000 in autonomous driving. Autonomous driving control device 1030 includes controller 1031, storage unit 1032, and I/O unit (input/output unit) 1033. The configuration of controller 1031 can be achieved by collaboration of a hardware resource and a software resource, or by a hardware resource alone. Available hardware resources include a processor, a ROM, a RAM, and other LSI, and available software resources include a program such as an operating system, an application, and firmware. Storage unit 1032 has a non-volatile recording medium such as a flash memory. I/O unit 1033 executes communication control according to various communication formats. For example, I/O unit 1033 outputs information pertaining to autonomous driving to driving assistance device 1040, and receives a control command from driving assistance device 1040. I/O unit 1033 also receives detection information from detector 1020.

Controller 1031 applies the control command input from driving assistance device 1040 and various information items collected from detector 1020 or various ECUs to an autonomous driving algorithm, thereby calculating a control value for controlling a target to be autonomously controlled such as a travel direction of vehicle 1000. Controller 1031 transmits the calculated control value to the ECU or the controller for each of the targets to be controlled. In the present exemplary embodiment, controller 1031 transmits the calculated control value to the steering ECU, the brake ECU, the engine ECU, and the indicator controller. It is to be noted that, in an electric vehicle or a hybrid car, controller 1031 transmits the control value to the motor ECU in place of or in addition to the engine ECU.

Driving assistance device 1040 is an HMI controller executing an interface function between vehicle 1000 and a driver, and includes controller 1041, storage unit 1042, and I/O unit 1043. Controller 1041 executes a variety of data processing such as HMI control. Controller 1041 can be achieved by collaboration of a hardware resource and a software resource, or by a hardware resource alone. Available hardware resources include a processor, a ROM, a RAM, and other LSI, and available software resources include a program such as an operating system, an application, and firmware.

Storage unit 1042 is a storage area for storing data that will be referred to or updated by controller 1041. For example, storage unit 1042 is implemented by a non-volatile recording medium such as a flash memory. I/O unit 1043 executes various communication controls according to various communication formats. I/O unit 1043 is provided with operation input unit 1050, image output unit 1051, detection information input unit 1052, command interface (IF) 1053, and communication IF 1056.

Operation input unit 1050 receives, from input device 1004, an operation signal by an operation performed by a driver, an occupant, or a user outside of vehicle 1000 with respect to input device 1004, and outputs this operation signal to controller 1041. Image output unit 1051 outputs image data generated by controller 1041 to notification device 1002 and causes notification device 1002 to display this image data. Detection information input unit 1052 receives, from detector 1020, information (hereinafter referred to as "detection information") which is the result of the detection process performed by detector 1020 and indicates the current surrounding situation and travel state of vehicle 1000, and outputs the received information to controller 1041.

Command IF 1053 executes an interface process with autonomous driving control device 1030, and includes action information input unit 1054 and command output unit 1055. Action information input unit 1054 receives information, pertaining to autonomous driving of vehicle 1000, transmitted from autonomous driving control device 1030, and outputs the received information to controller 1041. Command output unit 1055 receives, from controller 1041, a control command which indicates the manner of autonomous driving to autonomous driving control device 1030, and transmits this control command to autonomous driving control device 1030.

Communication IF 1056 executes an interface process with wireless device 1008. Communication IF 1056 transmits the data output from controller 1041 to wireless device 1008, and transmits this data to the external device from wireless device 1008. In addition, communication IF 1056 receives data transmitted from the external device and transferred by wireless device 1008, and outputs this data to controller 1041.

Note that autonomous driving control device 1030 and driving assistance device 1040 are configured as individual devices. As a modification, autonomous driving control device 1030 and driving assistance device 1040 may be integrated into one controller as indicated by a broken line in FIG. 32. In other words, a single autonomous driving control device may have both the functions of autonomous driving control device 1030 and the driving assistance device 1040 in FIG. 32.

Figure 34:
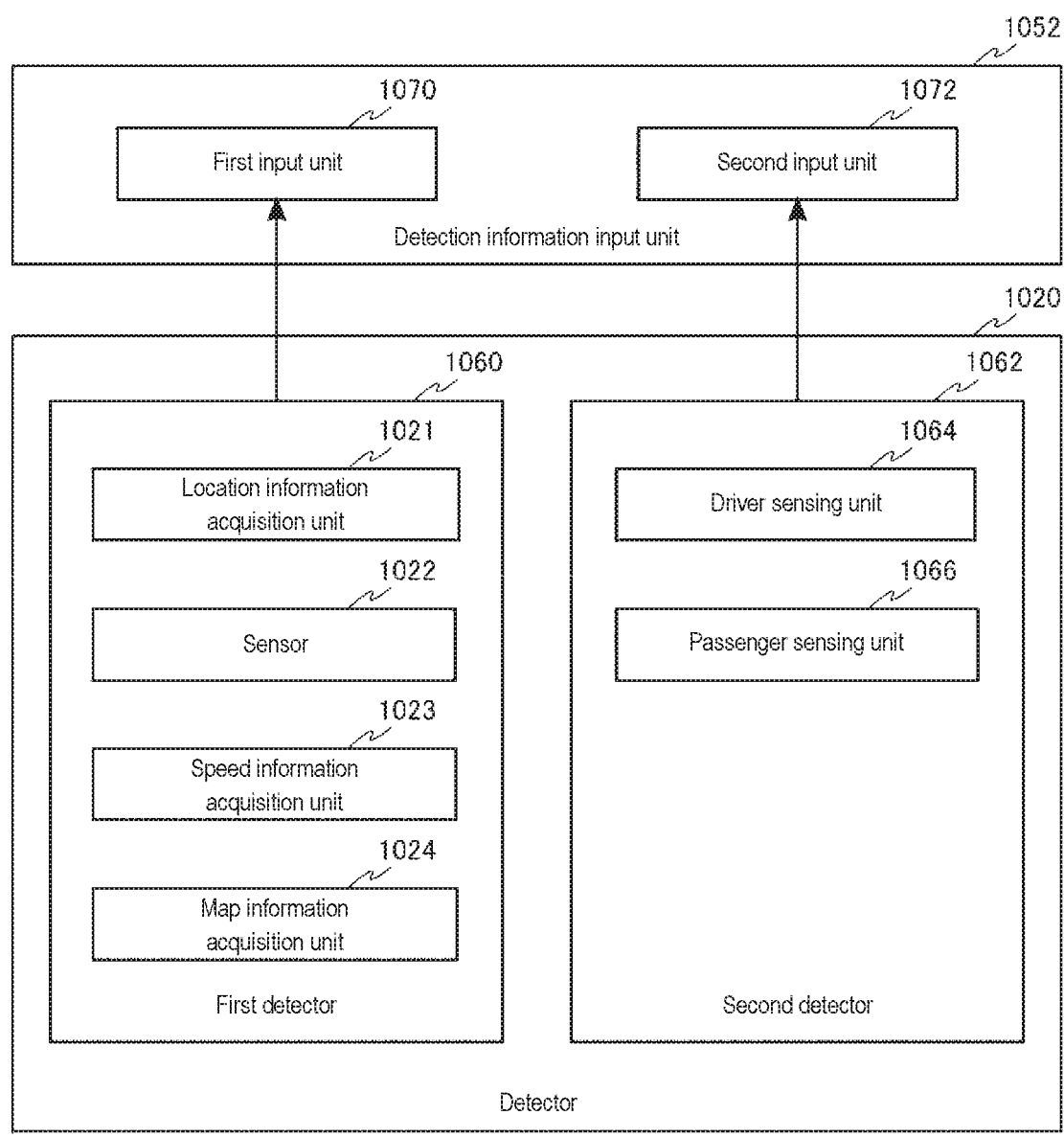
FIG. 34 is a block diagram illustrating a detailed configuration of a detector and a detection information input unit in FIG. 32.

FIG. 34 is a block diagram illustrating the detailed configuration of detector 1020 and detection information input unit 1052. Detector 1020 includes first detector 1060 and second detector 1062, and detection information input unit 1052 includes first input unit 1070 and second input unit 1072. In addition, first detector 1060 includes location information acquisition unit 1021, sensor 1022, speed information acquisition unit 1023, and map information acquisition unit 1024, and second detector 1062 includes driver sensing unit 1064 and passenger sensing unit 1066.

First detector 1060 mainly detects a surrounding situation and a travel state of vehicle 1000 as previously mentioned. First detector 1060 outputs the detected information (hereinafter referred to as "first detection information") to first input unit 1070. First input unit 1070 receives the first detection information from first detector 1060. On the other hand, second detector 1062 mainly detects information pertaining to the driver and fellow passengers in vehicle 1000. Second detector 1062 outputs the detected information (hereinafter referred to as "second detection information") to second input unit 1072. Second input unit 1072 receives the second detection information from second detector 1062. Note that the combination of the first detection information and the second detection information or either the first detection information or the second detection information corresponds to the above-mentioned detection information.

Location information acquisition unit 1021 in first detector 1060 acquires the current position of vehicle 1000 from a GPS receiver. Sensor 1022 is a general term for various sensors for detecting a situation outside of the vehicle and the state of vehicle 1000. Examples of sensors to be mounted for detecting the situation outside of the vehicle include a camera, a millimeter-wave radar, light detection and ranging or laser imaging detection and ranging (LIDAR), an ambient temperature sensor, an atmospheric pressure sensor, a humidity sensor, and an illuminance sensor. The situation outside the vehicle includes a road condition, including lane information, of a road in which vehicle 1000 is traveling, an environment including weather, a surrounding situation of a host vehicle, and nearby vehicles (such as nearby vehicles traveling in the adjacent lane) present near vehicle 1000. Note that the situation outside the vehicle may be anything which is information about an outside of the vehicle detectable by the sensor. In addition, as sensors for detecting the state of vehicle 1000, for example, an acceleration sensor, a gyro sensor, a geomagnetic sensor, an inclination sensor, and the like are mounted.

Speed information acquisition unit 1023 acquires the current speed of vehicle 1000 from a speed sensor. Map information acquisition unit 1024 acquires map information around the current position of vehicle 1000 from a map database. The map database may be recorded in a recording medium in vehicle 1000, or downloaded from a map server via a network when being used.

Driver sensing unit 1064 in second detector 1062 authenticates the individual driver seated on driver seated on the driver seat in vehicle 1000. For example, a camera that can capture the face of the driver seated on the driver seat in vehicle 1000 is installed in the vehicle interior, and the face of the driver is captured by the camera. In addition, driver sensing unit 1064 retains in advance information pertaining to a face of a driver who may be seated on the driver seat in vehicle 1000. For example, the information pertaining to the face of the driver is a face image, information about a characteristic point in the face image, and the like. Driver sensing unit 1064 identifies the individual driver seated on the driver seat through comparison between the image captured by the camera and the information pertaining to the face of the driver. Since a technology used for identification is publicly known, description on the technology is omitted. It is to be noted that a time of flight (TOF) sensor and a fingerprint sensor may be installed in the vehicle interior, and driver sensing unit 1064 may identify the individual driver seated on the driver seat based on information acquired from these sensors. Driver sensing unit 1064 outputs the information about the identified driver as second detection information.

Passenger sensing unit 1066 authenticates a fellow passenger seated on a passenger seat and a rear seat of vehicle 1000. For example, a seat occupancy sensor is mounted on each seat, and passenger sensing unit 1066 identifies the presence or absence of a fellow passenger based on the information acquired from the seat occupancy sensor. Herein, passenger sensing unit 1066 may identify such that a fellow passenger is on the passenger seat but no fellow passenger is on the rear seat. In addition, as in driver sensing unit 1064, a camera capable of capturing the face of a fellow passenger seated on the passenger seat or the rear seat may be installed in the vehicle interior, and passenger sensing unit 1066 may identify presence or absence of a fellow passenger and information pertaining to the fellow passenger based on the image captured by the camera. The information pertaining to a fellow passenger includes age/sex, personal authentication, and occupant state (having sleepiness, getting carsick). Since a technology used for such identification is also publicly known, description on the technology is also omitted. In addition, a TOF sensor may be installed in the vehicle interior, and passenger sensing unit 1066 may identify the presence or absence of a fellow passenger and the information pertaining to the fellow passenger based on the information acquired by the TOF sensor. Passenger sensing unit 1066 outputs the identified presence or absence of a fellow passenger as the second detection information. When identifying the information pertaining to a fellow passenger, passenger sensing unit 1066 also outputs this information as the second detection information.

Figure 35:
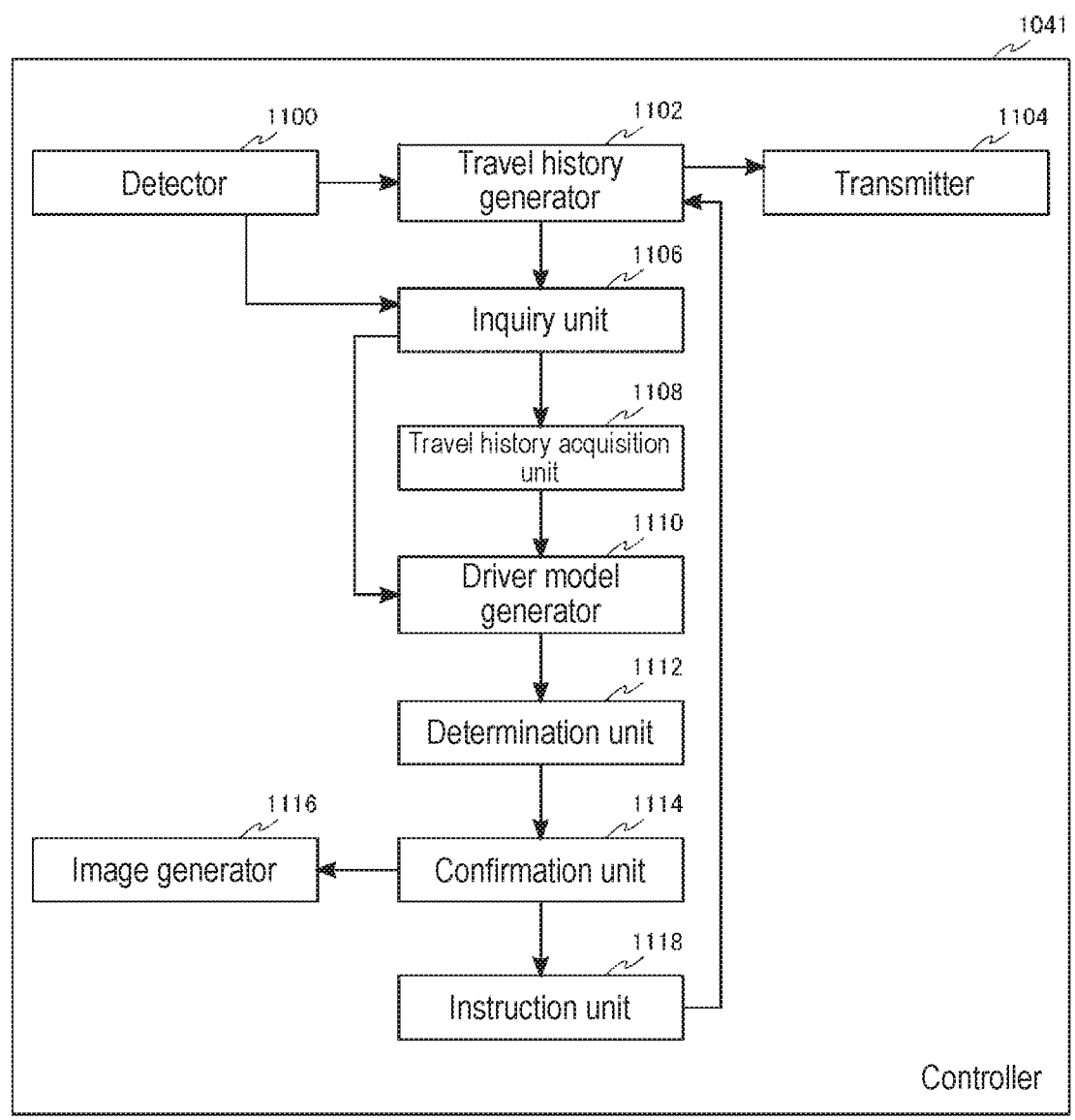
FIG. 35 is a block diagram illustrating a detailed configuration of a controller in FIG. 32.

FIG. 35 is a block diagram illustrating a detailed configuration of controller 1041. Controller 1041 includes detector 1100, travel history generator 1102, transmitter 1104, inquiry unit 1106, travel history acquisition unit 1108, driver model generator 1110, determination unit 1112, confirmation unit 1114, screen generator 1116, and instruction unit 1118.

Detector 1100 is connected to an open/close sensor of the door of vehicle 1000 and to second input unit 1072. Detector 1100 is notified of a timing at which the door is opened/ closed via the open/close sensor. Since a technology used for detecting the opening/closing timing by the open/close sensor is publicly known, description on the technology is omitted. When receiving the notification of the opening/closing timing, detector 1100 receives the second detection information from second input unit 1072. In addition, when the state of the fellow passenger is changed, detector 1100 may receive the second detection information from second input unit 1072. Detector 1100 detects the individual driver of vehicle 1000 by receiving the second detection information. Detector 1100 also detects the presence or absence of fellow passengers in vehicle 1000 by receiving the second detection information. Further, vehicle 1000 may detect information pertaining to fellow passengers in vehicle 1000.

Travel history generator 1102 is connected to first input unit 1070, detector 1100, and instruction unit 1118. When indicating the next action to autonomous driving control device 1030, instruction unit 1118 notifies travel history generator 1102 of the indicated action. This will be described in detail later. The next action is selected by the driver, and the action may include "deceleration", "acceleration", "traveling at constant speed", "change lanes to right", and the like. When receiving the notification from instruction unit 1118, travel history generator 1102 receives the first detection information from first input unit 1070, and also receives the information from detector 1100.

Travel history generator 1102 derives environmental parameters based on various information items included in the first detection information. As illustrated in FIG. 27, for example, the environmental parameters include "speed Va of host vehicle", "relative speed Vba of leading vehicle relative to host vehicle", "distance DRba between leading vehicle and host vehicle", "rate of change RSb of size of leading vehicle", and "relative speed Vca of adjacent following vehicle relative to host vehicle". The environmental parameters also include "head-to-head spacing Dca between adjacent following vehicle and host vehicle", "rate of change Rca of head-to-head spacing", "relative speed Vda of adjacent leading vehicle relative to host vehicle", "head-to-head spacing Dda between adjacent leading vehicle and host vehicle", "rate of change Rda of head-to-head spacing", and "remaining adjacent lane length DRda for host vehicle". The environmental parameters also include "relative speed Vma of merging vehicle relative to host vehicle", "head-to-head spacing Dma between merging vehicle and host vehicle", and "rate of change Rma of head-to-head spacing". These parameters are as stated previously, so that the description thereof will be omitted.

Now, a travel history generated by travel history generator 1102 for each kind of information input from detector 1100 will be described. As one example of the kind of information, five kinds are assumed: (1) individual driver, presence or absence of fellow passengers, (2) individual driver, age/sex of fellow passengers, (3) individual driver, individual fellow passengers, (4) individual driver, presence or absence of fellow passengers, state of fellow passengers, and (5) individual driver. Travel histories for the respective cases are respectively illustrated in FIGS. 36A, 36B, 37A, 37B, and 27. FIGS. 36A and 36B illustrate the data structure of the travel history generated by travel history generator 1102, and FIGS. 37A and 37B illustrate another data structure of the travel history generated by travel history generator 1102.

(1) Individual Driver, Presence or Absence of Fellow Passengers

Travel history generator 1102 generates the travel history illustrated in FIG. 36A. More specifically, travel history generator 1102 receives, as the information from detector 1100, the name of the driver, the presence or absence of a fellow passenger in the passenger seat, and the number of fellow passengers in the rear seat at the timing of receiving the notification from acquisition unit 1108. In FIG. 36A, the name of the driver is indicated as "A" or "B", the presence of a fellow passenger in the passenger seat is indicated by "○", the absence of a fellow passenger in the passenger seat is indicated by "x", and the number of the fellow passengers in the rear seat is indicated by "0", "1", for example. Travel history generator 1102 also receives the values of "Va" and other parameters as the travel history at this timing. In addition, travel history generator 1102 collectively stores, in one row in FIG. 36A, the information and values input thereto, and the action indicated by the notification from acquisition unit 1108, such as "deceleration". Specifically, travel history generator 1102 generates a travel history in which environmental parameters indicating a travel environment through which vehicle 1000 has previously traveled and an action selected by the driver in response to the environmental parameters are associated with each other. In this case, the travel history is generated for each combination of the driver and the presence or absence of fellow passengers.

(2) Individual Driver, Age/Sex of Fellow Passengers

Travel history generator 1102 generates the travel history illustrated in FIG. 36B. More specifically, travel history generator 1102 receives, as the information from detector 1100, the name of the driver and age/sex of fellow passengers at the timing of receiving the notification from acquisition unit 1108. In FIG. 36B, age/sex of fellow passengers is indicated as "woman in 30's" or "woman in 30's/boy", for example. Here, the former indicates that there is one fellow passenger, and the latter indicates that there are two fellow passengers. The age/sex of the fellow passengers can be regarded as the information pertaining to fellow passengers mentioned above. As in (1), travel history generator 1102 collectively stores, in one row in FIG. 36B, the name of the driver, the age/sex of the fellow passengers, values pertaining to the travel history, and the action indicated by the notification from acquisition unit 1108. That is, the travel history is generated by travel history generator 1102 for each combination of the driver, and the presence or absence of fellow passengers and the information pertaining to fellow passengers which have been previously detected.

(3) Individual Driver, Individual Fellow Passengers

Travel history generator 1102 generates the travel history illustrated in FIG. 37A. More specifically, travel history generator 1102 receives, as the information from detector 1100, the name of the driver, the name of a fellow passenger in the passenger seat, and names of fellow passengers in the rear seat at the timing of receiving the notification from acquisition unit 1108. In FIG. 37A, the name of the fellow passenger is indicated as "B", "C", and "D". Notably, the number of the fellow passengers is identified by confirming the name of each fellow passenger. As in (1), travel history generator 1102 collectively stores, in one row in FIG. 37A, the name of the driver, the name of the fellow passenger in the passenger seat, the name of each fellow passenger in the rear seat, values pertaining to the travel history, and the action indicated by the notification from acquisition unit 1108. In this case as well, the travel history is generated by travel history generator 1102 for each combination of the driver, and the presence or absence of fellow passengers and the information pertaining to fellow passengers which have been previously detected.

(4) Individual Driver, Presence or Absence of Fellow Passengers, State of Fellow Passengers Travel history generator 1102 generates the travel history illustrated in FIG. 37B. More specifically, travel history generator 1102 receives, as the information from detector 1100, the name of the driver, the presence or absence of a fellow passenger in the passenger seat, and the state of the fellow passenger at the timing of receiving the notification from acquisition unit 1108. In FIG. 37B, the state of the fellow passenger is indicated by "ordinary", "sleepy", or "carsick", for example. Notably, the number of the fellow passengers is identified by confirming the state of each fellow passenger. As in (1), travel history generator 1102 collectively stores, in one row in FIG. 37B, the name of the driver, the presence or absence of a fellow passenger in the passenger seat, the state of the fellow passenger, values pertaining to the travel history, and the action indicated by the notification from acquisition unit 1108. In this case as well, the travel history is generated by travel history generator 1102 for each combination of the driver, and the presence or absence of fellow passengers and the information pertaining to fellow passengers which have been previously detected.

(5) Individual Driver

This corresponds to the fourth exemplary embodiment, and travel history generator 1102 generates the travel history illustrated in FIG. 27. Therefore, travel history generator 1102 generates the travel history by executing the process without having the process for the fellow passengers in (1) to (4). Specifically, travel history generator 1102 generates, for each driver, a travel history in which environmental parameters indicating a travel environment through which vehicle 1000 has previously traveled and an action selected by the driver in response to the environmental parameters are associated with each other.

In (1) to (4), travel history generator 1102 generates a travel history by using the presence or absence of fellow passengers, age/sex of each fellow passenger, the name of each fellow passenger, the state of each fellow passenger, and the like. However, travel history generator 1102 may generate a travel history by combining any of these items. Further, to clarify the description, it will be described below assuming that the travel history in FIG. 36A is generated. However, it is only necessary that the similar process is executed even when other travel histories are generated. Returning to FIG. 35, travel history generator 1102 outputs the travel history to transmitter 1104 and inquiry unit 1106.

Transmitter 1104 receives the travel history from travel history generator 1102. When the travel history is input, transmitter 1104 notifies the unillustrated cloud server of the update of the travel history from wireless device 1008 through communication IF 1056. The cloud server is provided outside of vehicle 1000 for collecting travel histories generated by driving assistance device 1040 mounted on each of a plurality of vehicles 1000. That is, the cloud server collectively manages the travel histories generated by driving assistance devices 1040. For the sake of convenience of description, the travel histories stored in the cloud server are referred to as "comprehensive travel history". When receiving the notification for updating the travel history, the cloud server transmits a travel history request to wireless device 1008 for causing the travel history to be transmitted. When receiving the travel history request from the cloud server through communication IF 1056, transmitter 1104 assigns, to each combination, identification information (hereinafter referred to as "ID") for identifying a combination, in the travel history, of the name of the driver and the presence or absence of fellow passengers.

For describing this process, FIGS. 38A, 38B, and 39 will be used. FIGS. 38A and 38B illustrate the outline of the process by transmitter 1104. FIG. 38A illustrates the data structure of the travel history input to transmitter 1104, and this is the same as the data structure illustrated in FIG. 36A. FIG. 38B illustrates the correspondence between an ID and a combination of the name of a driver and the presence or absence of fellow passengers. As illustrated in the figure, ID "0001" is associated with the case where the name of the driver is "A", the presence or absence of a fellow passenger in the passenger seat is "x", and the number of fellow passengers in the rear seat is "0". Also, ID "0003" is associated with the case where the name of the driver is "A", the presence or absence of a fellow passenger in the passenger seat is "○", and the number of fellow passengers in the rear seat is "1". Notably, the IDs are determined such that they are not overlapped with one another among a plurality of driving assistance devices 1040. In this case, when a case where the name of the driver is "B", the presence or absence of a fellow passenger in the passenger seat is "x", and the number of fellow passengers in the rear seat is "0" is added due to the update of the travel history, and no ID is assigned to this combination, transmitter 1104 assigns ID "0004" to this combination. Notably, in the above-mentioned (2) to (4), age/sex of fellow passenger and other information are included in the combination, and in the above-mentioned (5), the data structure does not include the combination but includes only the name of the driver.

Transmitter 1104 replaces the combinations in FIG. 38A with IDs by using the relation illustrated in FIG. 38B. FIG. 39 illustrates another process outline by transmitter 1104. As illustrated in the figure, each combination is replaced by ID. When such ID is used, the information pertaining to driver "A" is segmented into three information items of ID "0001" to "0003". Transmitter 1104 outputs the travel history replaced by ID (this is also referred to as "travel history" below) to communication IF 1056. Communication IF 1056 causes wireless device 1008 to transmit the travel history to the cloud server. In doing so, only the updated portion of the travel history may be transmitted. The cloud server adds the received travel history to the comprehensive travel history.

The description is returned to FIG. 35. Inquiry unit 1106 receives the travel history from travel history generator 1102. Inquiry unit 1106 also receives information from detector 1100. The information input here is a combination of the name of the current driver and the presence or absence of fellow passengers at present. Inquiry unit 1106 extracts the travel history of the combination of the name of the current driver and the presence or absence of fellow passengers at present from the travel histories generated by travel history generator 1102. FIGS. 40A and 40B illustrate the outline of the process by inquiry unit 1106. FIG. 40A illustrates the data structure of the travel history input to inquiry unit 1106, and this is the same as the data structure illustrated in FIG. 36A. It is assumed here the case where the name of the current driver is "A", the presence or absence of a fellow passenger in the passenger seat at present is "○", and the number of fellow passengers in the rear seat at present is "1". FIG. 40B shows the result of the extraction of the travel history of the current combination from the travel history illustrated in FIG. 40A.

The description is returned to FIG. 35. Inquiry unit 1106 transmits, to the cloud server through communication IF 1056 and wireless device 1008, an inquiry signal for asking the cloud server to search the travel history similar to the extracted travel history from the comprehensive travel history. The inquiry signal includes the extracted travel history (hereinafter referred to as an "inquiry travel history"). When receiving the inquiry signal, the cloud server acquires the inquiry travel history from the inquiry signal. The cloud server searches and acquires a travel history similar to the inquiry travel history from the comprehensive travel history. More specifically, the cloud server extracts one action and an environmental parameter corresponding to this action from the inquiry travel history. Herein, the extracted environmental parameter is referred to as a "first environmental parameter". The cloud server acquires a plurality of environmental parameters corresponding to the extracted action from the comprehensive travel history. Herein, each of the plurality of acquired environmental parameters is referred to as a "second environmental parameter".

The cloud server calculates a correlation value of a vector having the numerical value of the first environmental parameter and the numerical value of one second environmental parameter as elements. When the correlation value is larger than a threshold (hereinafter referred to as an "in-server threshold"), the cloud server identifies the ID corresponding to the second environmental parameter, and acquires all of the environmental parameters having the ID assigned thereto from the comprehensive travel history. On the other hand, if the correlation value is equal to or less than the in-server threshold, the cloud server does not execute the acquisition. The cloud server executes such process for each of the acquired second environmental parameters, and also executes such process to the other actions included in the inquiry travel history. As a result, the cloud server acquires at least one environmental parameter similar to the inquiry travel history. The acquired environmental parameter may include a plurality of IDs. The cloud server collects the acquired environmental parameters as a "similar travel history". In this case, the action corresponding to each environmental parameter is also included. The similar travel history has the data structure illustrated in FIG. 39, for example.

Acquisition unit 1108 acquires the similar travel history from the cloud server through wireless device 1008 and communication IF 1056 as a response to the inquiry made by inquiry unit 1106. As previously stated, the similar travel history is a travel history similar to the travel history of the combination of the current driver and the presence or absence of fellow passengers at present. Notably, in the above-mentioned (2) to (4), age/sex of fellow passenger and other information are included in the combination, and in the above-mentioned (5), the travel history does not include the combination but includes only the name of the driver.

Figures 41, 42:
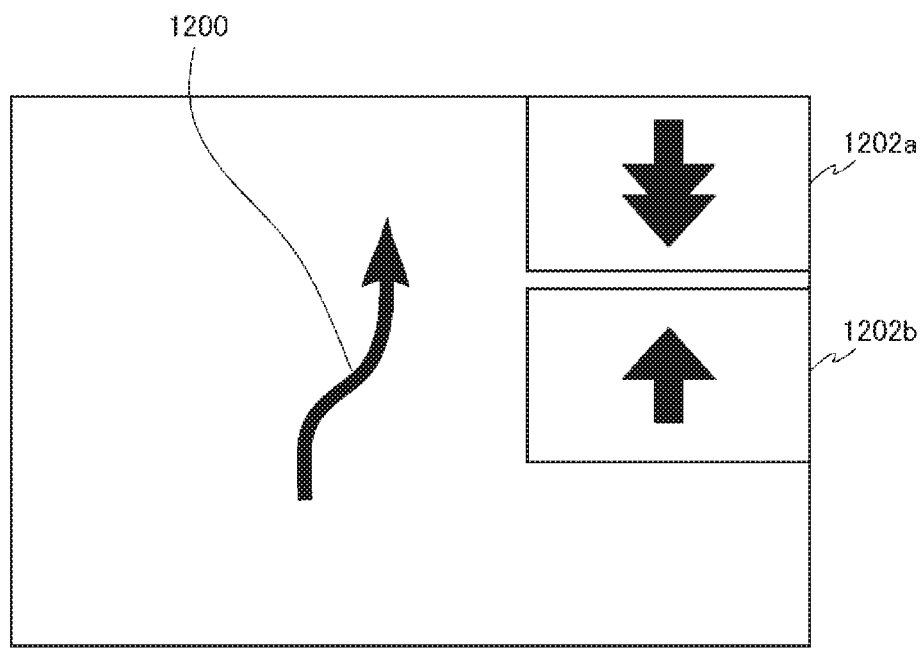
FIG. 41 is a diagram illustrating a data structure of a driver model generated by a driver model generator in FIG. 35.
FIG. 42 is a view illustrating a screen generated by a screen generator in FIG. 35.

Driver model generator 1110 receives the similar travel history from acquisition unit 1108. Driver model generator 1110 generates a driver model based on the similar travel history. For example, driver model generator 1110 generates the driver model by combining the inquiry travel history and the similar travel history. FIG. 41 illustrates the data structure of the driver model generated by driver model generator 1110. As illustrated in the figure, the ID, the environmental parameter, and the action included in the similar travel history are combined. In the data structure, the portion where environmental parameter and action are combined with no ID being assigned corresponds to the inquiry travel history. Note that an ID may not be included in the driver model.

The description is returned to FIG. 35. Driver model generator 1110 may generate, separate from this driver model, a driver model by averaging the numerical values of the respective environmental parameters for the same action in the inquiry travel history and the similar travel history. Driver model generator 1110 outputs the driver model to determination unit 1112.

Determination unit 1112 receives the driver model from driver model generator 1110. Determination unit 1112 also receives the first detection information from first input unit 1070. Determination unit 1112 derives the current environmental parameters based on various information items included in the first detection information. The environmental parameters are as stated previously, so that the description thereof will be omitted. Determination unit 1112 calculates a correlation value of a vector having, as elements, the value of the environmental parameter shown in each row of the driver model illustrated in FIG. 41 and the value of the current environmental parameter. In addition, determination unit 1112 repeatedly executes the calculation of correlation value by changing the row in the driver model illustrated in FIG. 41. As a result, a plurality of correlation values corresponding to each row in the driver model in FIG. 41 are derived.

Determination unit 1112 selects the maximum correlation value from the correlation values, and then, selects the action shown in the row corresponding to the selected correlation value as an "action candidate". The selection of the action candidate corresponds to determining the next action. It is to be noted that a threshold may be set in advance, and determination unit 1112 may select a plurality of correlation values larger than the threshold from the plurality of correlation values. Determination unit 1112 compiles statistics of actions shown in a plurality of selected rows, and sets a "first action candidate", "second action candidate", . . . "Nth action candidate" in order from the biggest number. Note that an upper limit value may be set for the number of action candidates. Determination unit 1112 outputs one or more action candidates to confirmation unit 1114.

Confirmation unit 1114 is connected to action information input unit 1054, and receives information pertaining to autonomous driving from autonomous driving control device 1030 through action information input unit 1054. The next action of vehicle 1000 is presented by the information pertaining to autonomous driving. The next action (hereinafter referred to as "autonomous action") is determined in autonomous driving control device 1030 based on an autonomous driving algorithm. Therefore, the autonomous driving may not fit the sense of the driver. Confirmation unit 1114 also receives one or more action candidates from determination unit 1112. Confirmation unit 1114 outputs the autonomous action and the action candidates to screen generator 1116 so that the driver can select either the autonomous action or at least one action candidates.

Screen generator 1116 receives the autonomous action and at least one action candidate from confirmation unit 1114. Screen generator 1116 generates an image including both the autonomous action and at least one action candidate. FIG. 42 illustrates the screen generated by screen generator 1116. As illustrated in the figure, action image 1200 is disposed at the center of the screen. Screen generator 1116 stores in advance contents of different types of autonomous actions and images corresponding to these actions, and selects an image corresponding to the input autonomous action to generate action image 1200. In addition, first action candidate image 1202*a* and second action candidate image 1202*b* are disposed on the right of the screen. First action candidate image 1202*a* and second action candidate image 1202*b* are collectively referred to as action candidate image

1202. First action candidate image 1202*a* is generated from the first action candidate, and second action candidate image 1202*b* is generated from the second action candidate. Screen generator 1116 generates these images in the same manner as the generation of action image 1200. Screen generator 1116 outputs the image of the generated screen to image output unit 1051 as image data. Image output unit 1051 displays the screen of action candidate image 1202 by outputting the image data to notification device 1002.

Notification device 1002 displays the screen illustrated in FIG. 42. The driver selects any one of action image 1200, first action candidate image 1202*a*, and second action candidate image 1202*b* by means of input device 1004. Operation input unit 1050 receives the selection result from input device 1004 as an operation signal, and outputs the selection result to controller 1041. Confirmation unit 1114 receives the selection result from operation input unit 1050. If the selection result is first action candidate image 1202*a*, confirmation unit 1114 confirms the selection of the first action candidate, and if the selection result is second action candidate image 1202*b*, confirmation unit 1114 confirms the selection of the second action candidate. If the selection result is action image 1200, confirmation unit 1114 confirms the selection of the autonomous action. It is to be noted that, even if the selection result is not input when a predetermined time has elapsed after the autonomous action and at least one action candidate are output to screen generator 1116, confirmation unit 1114 confirms the selection of the autonomous action. When the action candidate is selected, confirmation unit 1114 outputs the selected action candidate to instruction unit 1118.

When the notification of the action candidate is input to instruction unit 1118 from confirmation unit 1114, instruction unit 1118 indicates the action corresponding to the action candidate to autonomous driving control device 1030 through command output unit 1055. More specifically, instruction unit 1118 outputs the action candidate which has been input to command output unit 1055. When the action candidate is input to command output unit 1055 from instruction unit 1118, command output unit 1055 outputs the control command corresponding to the action candidate to autonomous driving control device 1030. As a result, autonomous driving control device 1030 controls the autonomous driving of vehicle 1000 with the action candidate being determined as the next action. Therefore, if "lane change to the right" which is the action candidate is selected even when "deceleration" is presented as the autonomous action, vehicle 1000 travels according to the "lane change to the right" determined to be the next action. When indicating the next action to autonomous driving control device 1030, instruction unit 1118 notifies travel history generator 1102 of the indicated action.

Figure 43B:
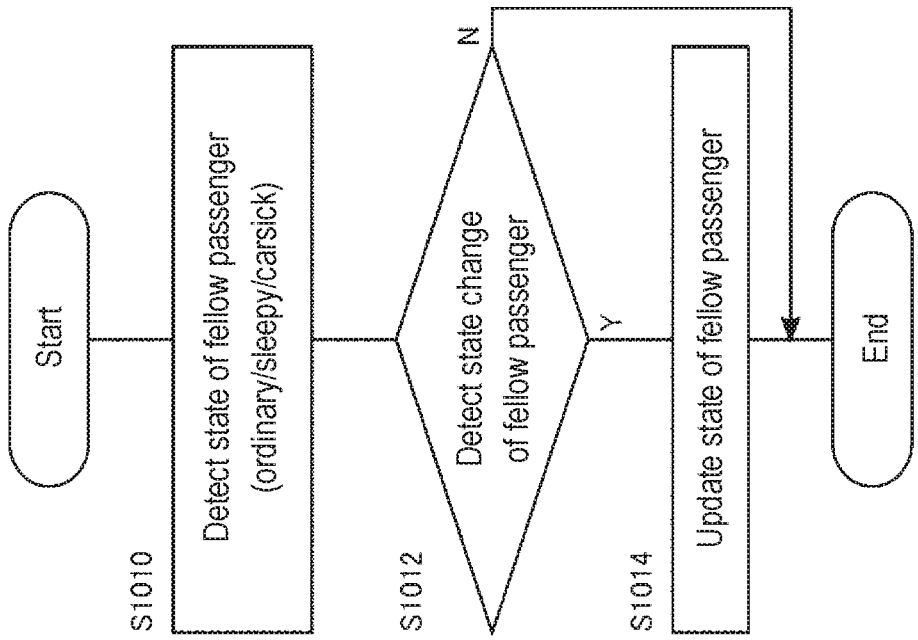
FIG. 43B is a flowchart illustrating a detection procedure performed by the second detector in FIG. 34.
Figure 43A:
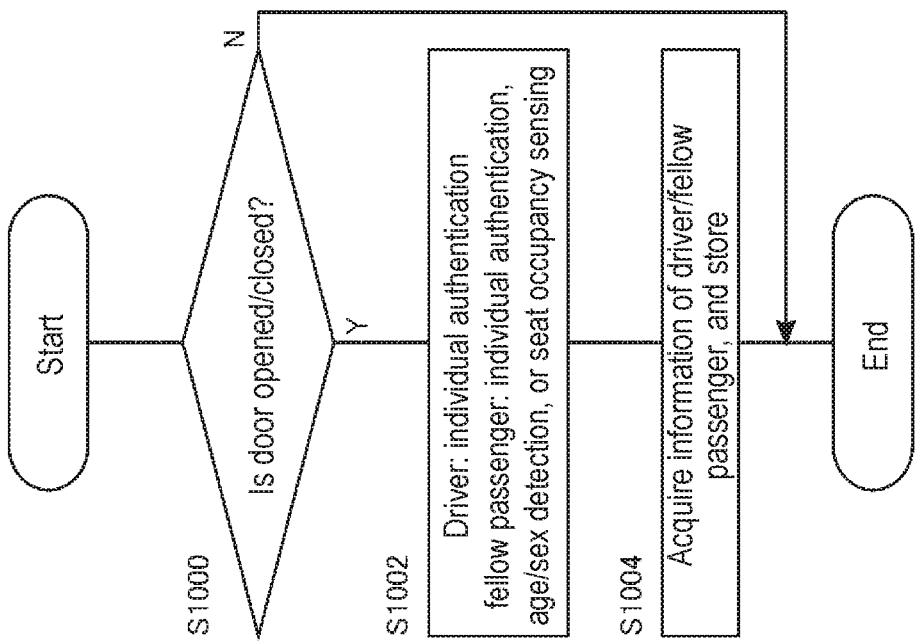
FIG. 43A is a flowchart illustrating a detection procedure performed by a second detector in FIG. 34.

An operation of driving assistance device 1040 configured as described above will now be described herein. FIGS. 43A and 43B are flowcharts illustrating the detection procedure performed by second detector 1062. FIG. 43A is a flowchart illustrating the first detection procedure. When the door is opened/closed (Y in S1000), second detector 1062 executes individual authentication of a driver, and individual authentication, detection of age/sex, or seat occupancy sensing of a fellow passenger (S1002). Detector 1100 acquires information about the driver and the fellow passenger, and stores the acquired information (S1004). If the door is not opened/closed (N in S1000), steps 1002 and 1004 are skipped.

FIG. 43B is a flowchart illustrating the second detection procedure. Second detector 1062 detects the state of the fellow passenger (ordinary/sleepy/carsick) (S1010). When detecting the state change of the fellow passenger (Y in S1012), detector 1100 updates the state of the fellow passenger (S1014). If changing the state of the fellow passenger is not detected (N in S1012), step 1014 is skipped.

Figure 44:
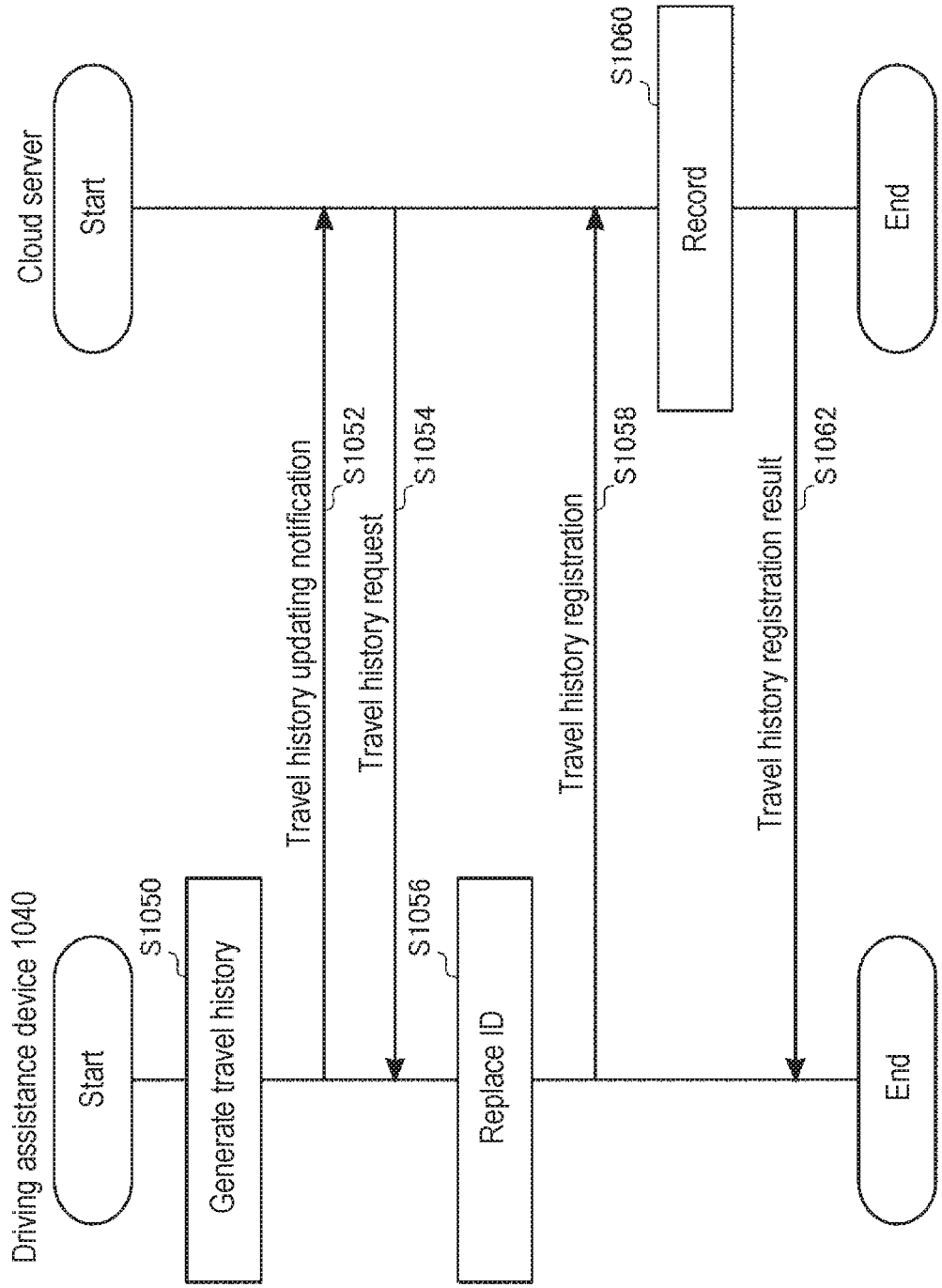
FIG. 44 is a sequence diagram illustrating a registration procedure performed by the driving assistance device in FIG. 32.

FIG. 44 is a sequence diagram illustrating a registration procedure performed by driving assistance device 1040. Driving assistance device 1040 generates a travel history (S1050). Driving assistance device 1040 transmits a travel history updating notification to the cloud server (S1052). The cloud server transmits a travel history request to driving assistance device 1040 (S1054). Driving assistance device 1040 replaces the ID in the travel history (S1056), and transmits a travel history registration (S1058). The cloud server stores the travel history (S1060). The cloud server transmits a travel history registration result to driving assistance device 1040 (S1062).

Figure 45:
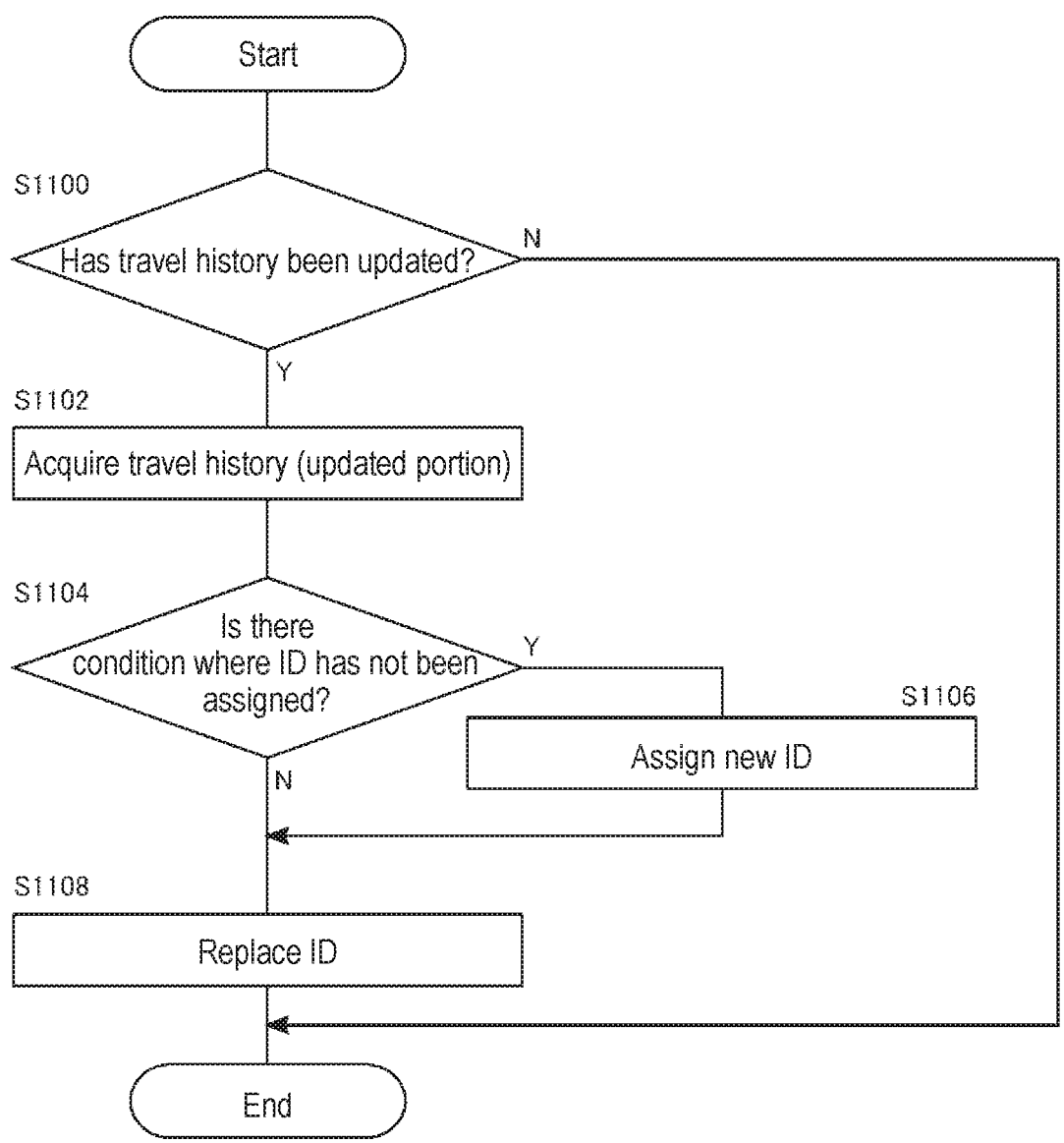
FIG. 45 is a flowchart illustrating a transmission procedure performed by the transmitter in FIG. 35.

FIG. 45 is a flowchart illustrating a transmission procedure performed by transmitter 1104. If the travel history has been updated (Y in S1100), transmitter 1104 acquires the travel history (updated portion) (S1102). When there is a condition where an ID has not been assigned (Y in S1104), transmitter 1104 assigns a new ID (S1106). When there is no condition where an ID has not been assigned (N in S1104), step 1106 is skipped. Transmitter 1104 replaces the ID (S1108). If the travel history is not updated (N in S1100), steps 1102 to 1108 are skipped.

Figure 46:
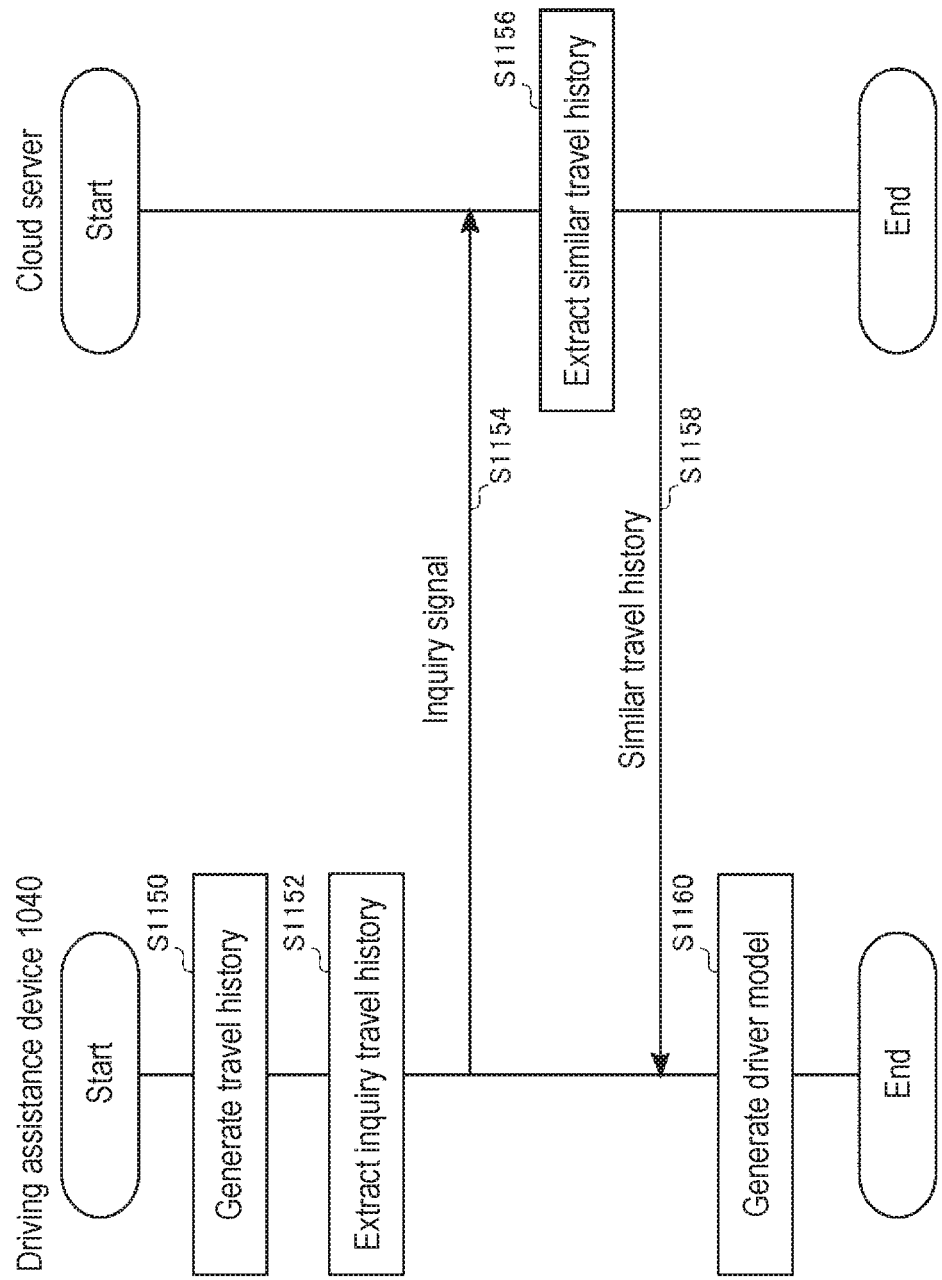
FIG. 46 is a sequence diagram illustrating a procedure for generating a driver model, the procedure being performed by the driving assistance device in FIG. 32.

FIG. 46 is a sequence diagram illustrating a procedure for generating a driver model, the procedure being performed by driving assistance device 1040. Driving assistance device 1040 generates a travel history (S1150). Driving assistance device 1040 extracts an inquiry travel history (S1152). Driving assistance device 1040 transmits an inquiry signal to the cloud server (S1154). The cloud server extracts a similar travel history (S1156). The cloud server transmits the similar travel history to driving assistance device 1040 (S1158). Driving assistance device 1040 generates a driver model (S1160).

Figure 47:
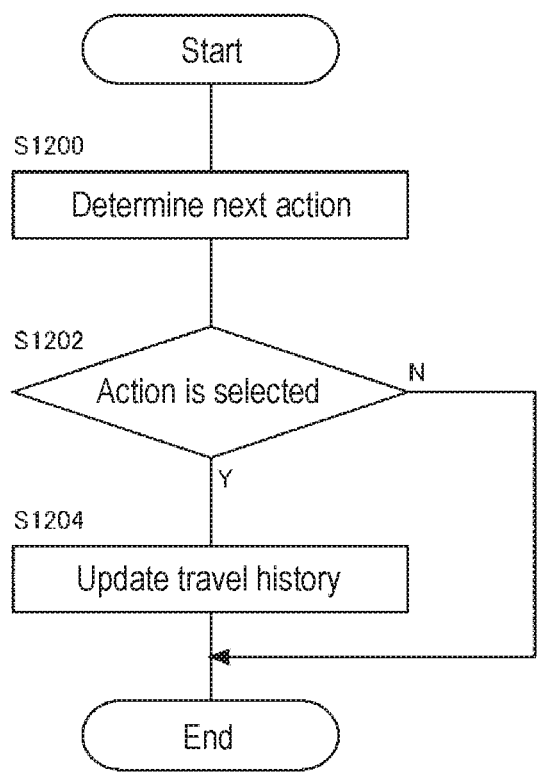
FIG. 47 is a flowchart illustrating a procedure of updating a travel history, the procedure being performed by the travel history generator in FIG. 35.

FIG. 47 is a flowchart illustrating a procedure of updating a travel history, the procedure being performed by travel history generator 1102. Determination unit 1112 determines a next action (S1200). When the determined action is selected (Y in S1202), travel history generator 1102 updates the travel history (S1204). When the determined action is not selected (N in S1202), the process ends.

According to the present exemplary embodiment, a driver model is generated based on a travel history similar to the travel history of the current driver, whereby a driver model suitable for the current driver can be generated. In addition, the next action can be determined based on the driver model suitable for the current driver and the current environmental parameters of the vehicle, whereby accuracy in determining the next action can be improved. In addition, a driver model can be generated based on a travel history similar to a travel history of a combination of a current driver and the presence or absence of fellow passengers at present, whereby the accuracy of the driver model can be improved. In this case, the driver model is generated based on a travel history similar to a travel history of a combination of a current driver, the presence or absence of fellow passengers at present, and information pertaining to the fellow passengers at present, whereby the accuracy of the driver model can further be improved.

In addition, a travel history similar to the travel history of the current driver is acquired from a server, whereby the server can search the similar travel history. Further, the server searches the similar travel history, whereby the processing amount can be reduced. Moreover, the travel history is transmitted to the server, whereby travel histories generated in various driving assistance devices can be accumulated in the server. In addition, since the travel histories generated in various driving assistance devices are accumulated in the server, the accuracy in searching the similar travel history can be improved. Further, since an ID for identifying each combination is assigned to each travel history, the server can easily manage the travel histories. In addition, an image showing the next action is displayed, whereby the driver can be notified of the next action.

In addition, the next action can be determined based on the driver model generated based on the travel history similar to the travel history of the current driver and the current environmental parameters of the vehicle, whereby accuracy in determining the next action by the autonomous driving control device can be improved. In addition, the next action can be determined based on the driver model generated based on the travel history similar to the travel history of the current driver and the current environmental parameters of the vehicle, whereby accuracy in determining the next action by the vehicle can be improved.

While the exemplary embodiments according to the present invention have been described above with reference to the drawings, the functions of the above-mentioned devices and processing units can be implemented by a computer program.

A computer achieving the above-mentioned functions through execution of a program is provided with an input device such as a keyboard, a mouse, or a touch pad, an output device such as a display or a speaker, a central processing unit (CPU), a read only memory (ROM), and a random access memory (RAM). The computer is also provided with a storage device such as a hard disk drive or a solid state drive (SSD), a reading device for reading information from a recording medium such as a digital versatile disk read only memory (DVD-ROM) or a universal serial bus (USB) memory, a network card that performs communication through a network, and the like. The respective components are interconnected with a bus.

The reading device reads the program from the recording medium having the program recorded thereon, and the storage device stores the program. Alternatively, the network card performs communication with a server device connected to a network, and a program, downloaded from the server device, for achieving the functions of the respective devices is stored in the storage device.

Then, the CPU copies the program stored in the storage device on the RAM, sequentially reads commands included in the program from the RAM, and executes the read commands, whereby the functions of the respective devices are achieved.

An aspect of the present invention is summarized below. A driving assistance device according to one aspect of the present invention includes a travel history generator that generates, for each of drivers, a travel history associating an environmental parameter indicating a travel environment through which a vehicle has previously traveled with an action selected by each of the drivers in response to the environmental parameter. The driving assistance device also includes an acquisition unit that acquires a travel history similar to a travel history of a current driver from among travel histories generated by the travel history generator. This driving assistance device also includes a driver model generator that generates a driver model based on the travel history acquired by the acquisition unit, and a determination unit that determines a next action based on the driver model generated by the driver model generator and an environmental parameter indicating the current travel environment of the vehicle.

According to this aspect, the next action can be determined based on the driver model generated based on a travel history similar to the travel history of the current driver and the current environmental parameter of the vehicle, whereby accuracy in determining the next action can be improved.

The driving assistance device may further include a detector that detects presence or absence of a fellow passenger in the vehicle. The travel history generator may generate a travel history, not only for each driver but also for presence or absence of a fellow passenger previously detected by the detector, and the acquisition unit may acquire a travel history similar to a travel history of a combination of the current driver and presence or absence of a fellow passenger at present detected by the detector. In this case, a driver model can be generated based on a travel history similar to the travel history of a combination of the current driver and the presence or absence of a fellow passenger at present, whereby the accuracy of the driver model can be improved.

The detector may also detect information pertaining to a fellow passenger in the vehicle, the travel history generator may generate a travel history, not only for each driver but also for presence or absence of a fellow passenger and for each information pertaining to the fellow passenger which have been previously detected by the detector, and the acquisition unit may acquire a travel history similar to a travel history of a combination of the current driver and the presence or absence of a fellow passenger at present and the information pertaining to the fellow passenger at present which have been detected by the detector. In this case, the driver model is generated based on the travel history similar to the travel history of the combination of the current driver, the presence or absence of a fellow passenger at present, and the information pertaining to the fellow passenger at present, whereby the accuracy of the driver model can be improved.

The driving assistance device may also include an inquiry unit that makes an inquiry to a server based on a travel history of the current driver from among travel histories generated by the travel history generator. The acquisition unit may acquire a travel history similar to the travel history of the current driver from the server as a response to the inquiry made by the inquiry unit. In this case, a travel history similar to the travel history of the current driver is acquired from the server, whereby a processing amount can be reduced.

The driving assistance device may further include an inquiry unit that makes an inquiry to a server based on a travel history of a combination of the current driver and presence or absence of a fellow passenger at present from travel histories generated by the travel history generator. The acquisition unit may acquire, from the server, a travel history similar to the travel history of the combination of the current driver and the presence or absence of a fellow passenger at present as a response to the inquiry made by the inquiry unit. In this case, a travel history similar to the travel history of a combination of the current driver and presence or absence of a fellow passenger at present is acquired from the server, whereby a processing amount can be reduced.

The driving assistance device may further include an inquiry unit that makes an inquiry to a server based on a combination of the current driver, presence or absence of a fellow passenger at present, and information pertaining to the fellow passenger at present from travel histories generated by the travel history generator. The acquisition unit may acquire, from the server, a travel history similar to the travel history of the combination of the current driver, the presence or absence of a fellow passenger at present, and the information pertaining to the fellow passenger at present as a response to the inquiry made by the inquiry unit. In this case, a travel history similar to the travel history of a combination of the current driver and presence or absence of a fellow passenger at present is acquired from the server, whereby a processing amount can be reduced.

The driving assistance device may further include a transmitter that transmits the travel history generated by the travel history generator to a server. In this case, the travel history is transmitted to the server, whereby travel histories generated in various driving assistance devices can be accumulated in the server.

The driving assistance device may further include a transmitter that transmits the travel history generated by the travel history generator to a server. The transmitter may assign identification information for identifying each combination in the travel history. In this case, the identification information for identifying each combination is assigned, whereby management by the server can be facilitated.

The driving assistance device may further include an image output unit that causes a notification device to display an image showing the next action determined by the determination unit. In this case, the driver can be notified of the next action.

Another aspect of the present invention provides an autonomous driving control device. This device includes a travel history generator that generates, for each of drivers, a travel history associating an environmental parameter indicating a travel environment through which a vehicle has previously traveled with an action selected by each of the drivers in response to the environmental parameter. The autonomous driving control device also includes an acquisition unit that acquires a travel history similar to the travel history of a current driver from among travel histories generated by the travel history generator, and a driver model generator that generates a driver model based on the travel history acquired by the acquisition unit. This autonomous driving control device also includes a determination unit that determines a next action based on the driver model generated by the driver model generator and an environmental parameter indicating a current travel environment of the vehicle, and an autonomous driving controller that controls autonomous driving of the vehicle based on the next action determined by the determination unit.

According to this aspect, the next action can be determined based on the driver model generated based on a travel history similar to the travel history of the current driver and the current environmental parameter of the vehicle, whereby accuracy in determining the next action can be improved.

Still another aspect of the present invention provides a vehicle. This vehicle is provided with a driving assistance device. The driving assistance device includes a travel history generator that generates, for each of drivers, a travel history associating an environmental parameter indicating a travel environment through which the vehicle has previously traveled with an action selected by each of the drivers in response to the environmental parameter. The driving assistance device also includes an acquisition unit that acquires a travel history similar to a travel history of a current driver from among travel histories generated by the travel history generator. This driving assistance device also includes a driver model generator that generates a driver model based on the travel history acquired by the acquisition unit, and a determination unit that determines a next action based on the driver model generated by the driver model generator and an environmental parameter indicating the current travel environment of the vehicle.

According to this aspect, the next action can be determined based on the driver model generated based on a travel history similar to the travel history of the current driver and the current environmental parameter of the vehicle, whereby accuracy in determining the next action can be improved.

Yet another aspect of the present invention provides a driving assistance method. This method includes generating, for each of drivers, a travel history associating an environmental parameter indicating a travel environment through which the vehicle has previously traveled with an action selected by each of the drivers in response to the environmental parameter. This driving assistance device also includes: acquiring a travel history similar to a travel history of a current driver from among the generated travel histories; generating a driver model based on the acquired travel history; and determining a next action based on the generated driver model and an environmental parameter indicating a current travel environment of the vehicle.

In the fifth exemplary embodiment, the management of the comprehensive travel history and extraction of similar travel histories are performed by the cloud server. However, the configuration is not limited thereto, and these processes may be performed by driving assistance device 1040. In this case, driving assistance devices 1040 mounted to a plurality of vehicles 1000 exchange their travel histories with each other, thereby generating a comprehensive travel history for each driving assistance device 1040. According to this modification, the need for installment of the cloud server can be eliminated.

INDUSTRIAL APPLICABILITY

The driving assistance method according to the present invention, and the driving assistance device, autonomous driving control device, vehicle, and program using the driving assistance method is suitable for transmitting information to a driver.

REFERENCE MARKS IN THE DRAWINGS

1: vehicle
2, 1012: brake pedal
3, 1013: accelerator pedal
4: indicator lever
5: steering wheel
6: detector
7: vehicle controller
8: storage unit
9: information notification device
10: touch panel
29*a*, 29*b*, 29*c*, 29*g*, 39*a*, 39*b*, 39*c*, 39*g*, 59*b*, 79*a* to 79*g*, 89*a*, 89*b*, 99*a*, 99*b*, 109*a* to 109*e*, 121, 121*a*, 121*b*, 121*c*, 121*d*: display region
51: operating unit
51*a* to 51*h*: operation button
59, 69, 79, 89, 99: character information
61: location information acquisition unit
62: sensor
63: speed information acquisition unit
64: map information acquisition unit
91: information acquisition unit
92: notification unit
102: input unit 111, 112, 113, 121', 122', 123, 131, 131', 132, 133, 134, 134', 135, 136, 137, 252, 253: symbol
1000: vehicle
1002: notification device
1004: input device
1004a: first operating unit
1004b: second operating unit
1006: speaker
1008: wireless device
1010: driving operating unit
1020: detector
1021: location information acquisition unit
1022: sensor
1023: speed information acquisition unit
1024: map information acquisition unit
1030: autonomous driving control device
1031: controller
1032: storage unit
1033: I/O unit
1040: driving assistance device
1041: controller
1042: storage unit
1043: I/O unit
1050: operation input unit
1051: image output unit
1052: detection information input unit
1053: command IF
1054: action information input unit
1055: command output unit
1056: communication IF
1060: first detector
1062: second detector
1064: driver sensing unit
1066: passenger sensing unit
1070: first input unit
1072: second input unit
1100: detector
1102: travel history generator
1104: transmitter
1106: inquiry unit
1108: acquisition unit
1110: driver model generator
1112: determination unit
1114: confirmation unit
1116: screen generator
1118: instruction unit

The invention claimed is:

1. A driving assistance device comprising:
a travel history generator that generates, for each of drivers, a travel history associating an environmental parameter indicating a travel environment through which a vehicle has previously traveled with an action selected by each of the drivers in response to the environmental parameter;
an acquisition unit that acquires a travel history similar to a travel history of a current driver from among travel histories generated by the travel history generator;
a driver model generator that generates a driver model based on the travel history acquired by the acquisition unit and the travel history of the current driver: and
a determination unit that determines a next action based on the driver model generated by the driver model generator and an environmental parameter indicating a current travel environment of the vehicle.

2. The driving assistance device according to claim 1, further comprising a detector that detects presence or absence of a fellow passenger in the vehicle,
wherein the travel history generator generates a travel history, not only for each of the drivers but also for presence or absence of a fellow passenger which has been previously detected by the detector, and
the acquisition unit acquires a travel history similar to a travel history of a combination of the current driver and presence or absence of a fellow passenger at present detected by the detector.

3. The driving assistance device according to claim 2, wherein
the detector also detects information pertaining to a fellow passenger in the vehicle,
the travel history generator generates a travel history, not only for each of the drivers but also for the presence or absence of the fellow passenger and for each information pertaining to the fellow passenger which have been previously detected by the detector, and
the acquisition unit acquires a travel history similar to a travel history of a combination of the current driver, and presence or absence of a fellow passenger at present and information pertaining to the fellow passenger at present which have been detected by the detector.

4. The driving assistance device according to claim 1, further comprising an inquiry unit that makes an inquiry to a server based on the travel history of the current driver from among the travel histories generated by the travel history generator,
wherein the acquisition unit acquires a travel history similar to the travel history of the current driver from the server as a response to the inquiry made by the inquiry unit.

5. The driving assistance device according to claim 2, further comprising an inquiry unit that makes an inquiry to a server based on the travel history of the combination of the current driver and the presence or absence of the fellow passenger at present from the travel histories generated by the travel history generator,
wherein the acquisition unit acquires, from the server, a travel history similar to the travel history of the combination of the current driver and the presence or absence of the fellow passenger at present as a response to the inquiry made by the inquiry unit.

6. The driving assistance device according to claim 3, further comprising an inquiry unit that makes an inquiry to a server based on the travel history of the combination of the current driver, the presence or absence of the fellow passenger at present, and the information pertaining to the fellow passenger at present from the travel histories generated by the travel history generator,
wherein the acquisition unit acquires, from the server, a travel history similar to the travel history of the combination of the current driver, the presence or absence of the fellow passenger at present, and the information pertaining to the fellow passenger at present as a response to the inquiry made by the inquiry unit.

7. The driving assistance device according to any one of claim 1, further comprising a transmitter that transmits the travel histories generated by the travel history generator to a server.

8. The driving assistance device according to claim 2, further comprising a transmitter that transmits the travel histories generated by the travel history generator to a server,
wherein the transmitter assigns identification information for identifying the combination in each of the travel histories.

9. The driving assistance device according to claim 1, further comprising an image output unit that causes a notification device to display an image showing the next action determined by the determination unit.

10. A driving control device comprising:
- a travel history generator that generates, for each of drivers, a travel history associating an environmental parameter indicating a travel environment through which a vehicle has previously traveled with an action selected by each of the drivers in response to the environmental parameter;
- an acquisition unit that acquires a travel history similar to a travel history of a current driver from among travel histories generated by the travel history generator;
- a driver model generator that generates a driver model based on the travel history acquired by the acquisition unit and the travel history of the current driver;
- a determination unit that determines a next action based on the driver model generated by the driver model generator and an environmental parameter indicating a current travel environment of the vehicle; and
- an autonomous driving controller that controls autonomous driving of the vehicle based on the next action determined by the determination unit.

11. A vehicle provided with a driving assistance device, the driving assistance device including:
- a travel history generator that generates, for each of drivers, a travel history associating an environmental parameter indicating a travel environment through which a vehicle has previously traveled with an action selected by each of the drivers in response to the environmental parameter;
- an acquisition unit that acquires a travel history similar to a travel history of a current driver from among travel histories generated by the travel history generator;
- a driver model generator that generates a driver model based on the travel history acquired by the acquisition unit and the travel history of the current driver; and
- a determination unit that determines a next action based on the driver model generated by the driver model generator and an environmental parameter indicating a current travel environment of the vehicle.

12. A driving assistance method comprising:
- generating, for each of drivers, a travel history associating an environmental parameter indicating a travel environment through which a vehicle has previously traveled with an action selected by each of the drivers in response to the environmental parameter;
- acquiring a travel history similar to a travel history of a current driver from among the generated travel histories;
- generating a driver model based on the acquired travel history and the travel history of the current driver; and
- determining a next action based on the generated driver model and an environmental parameter indicating a current travel environment of the vehicle.

13. A non-transitory computer-readable recording medium containing a driving assistance program for causing a computer to execute:
- generating, for each of drivers, a travel history associating an environmental parameter indicating a travel environment through which a vehicle has previously traveled with an action selected by each of the drivers in response to the environmental parameter;
- acquiring a travel history similar to a travel history of a current driver from among the generated travel histories;
- generating a driver model based on the acquired travel history and the travel history of the current driver; and
- determining a next action based on the generated driver model and an environmental parameter indicating a current travel environment of the vehicle.

* * * * *